Nov. 8, 1932.    M. G. DE SIMONE    1,887,259
CALCULATING MACHINE
Filed Nov. 18, 1926    22 Sheets-Sheet 6
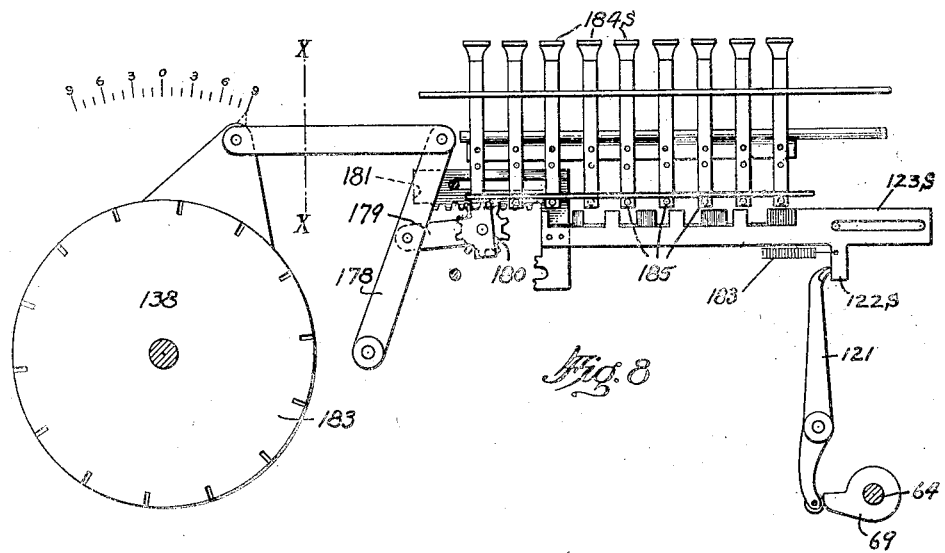
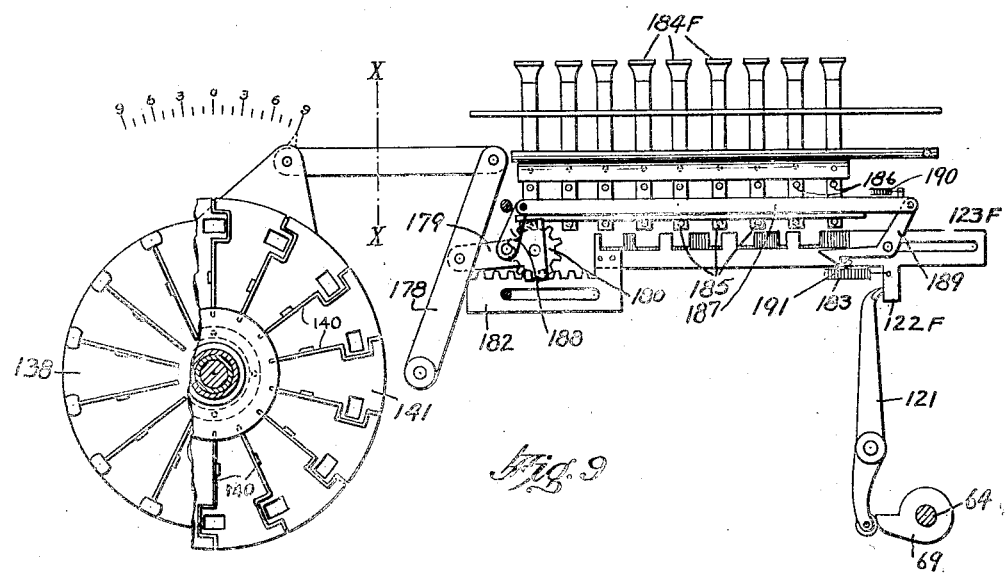

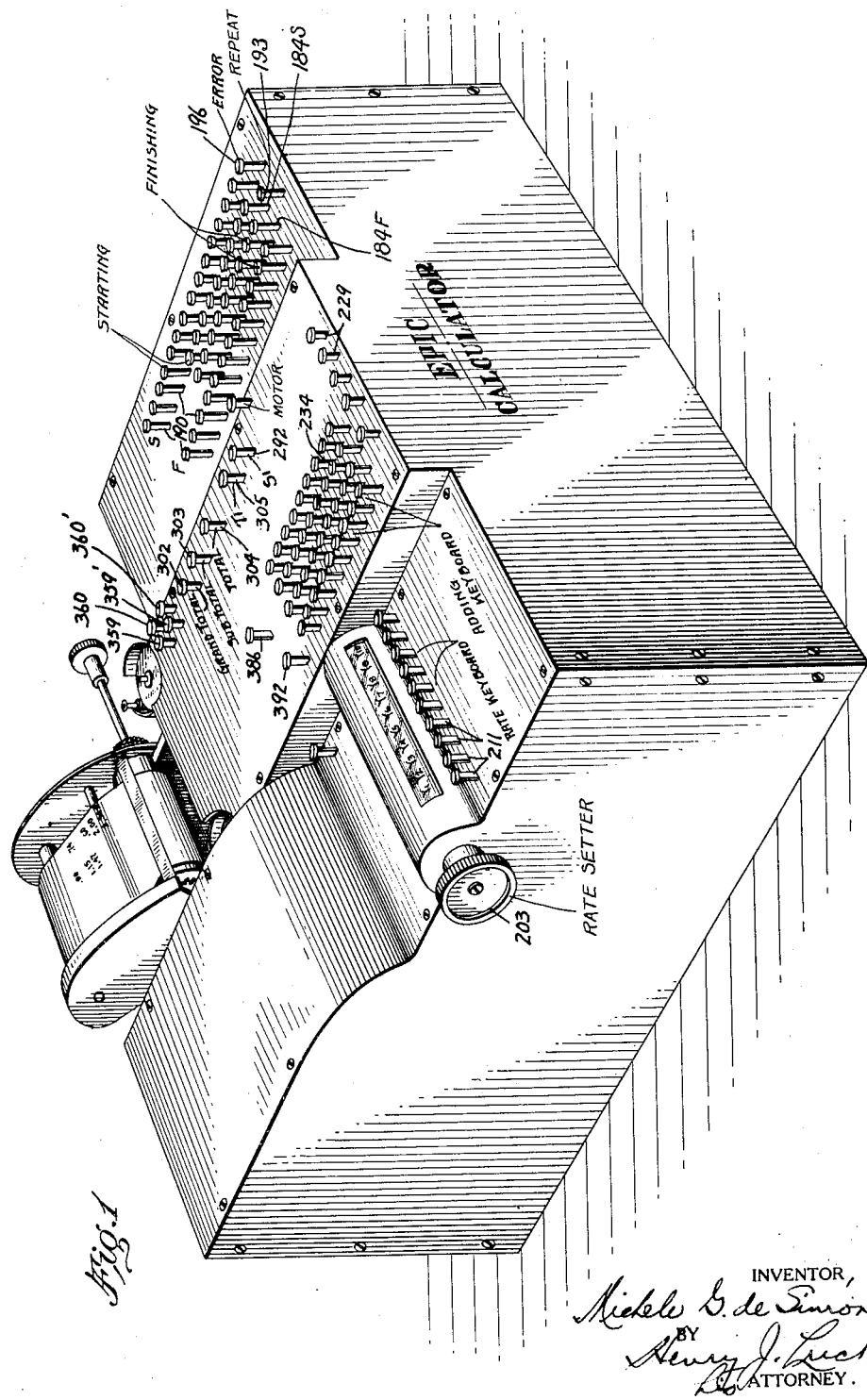

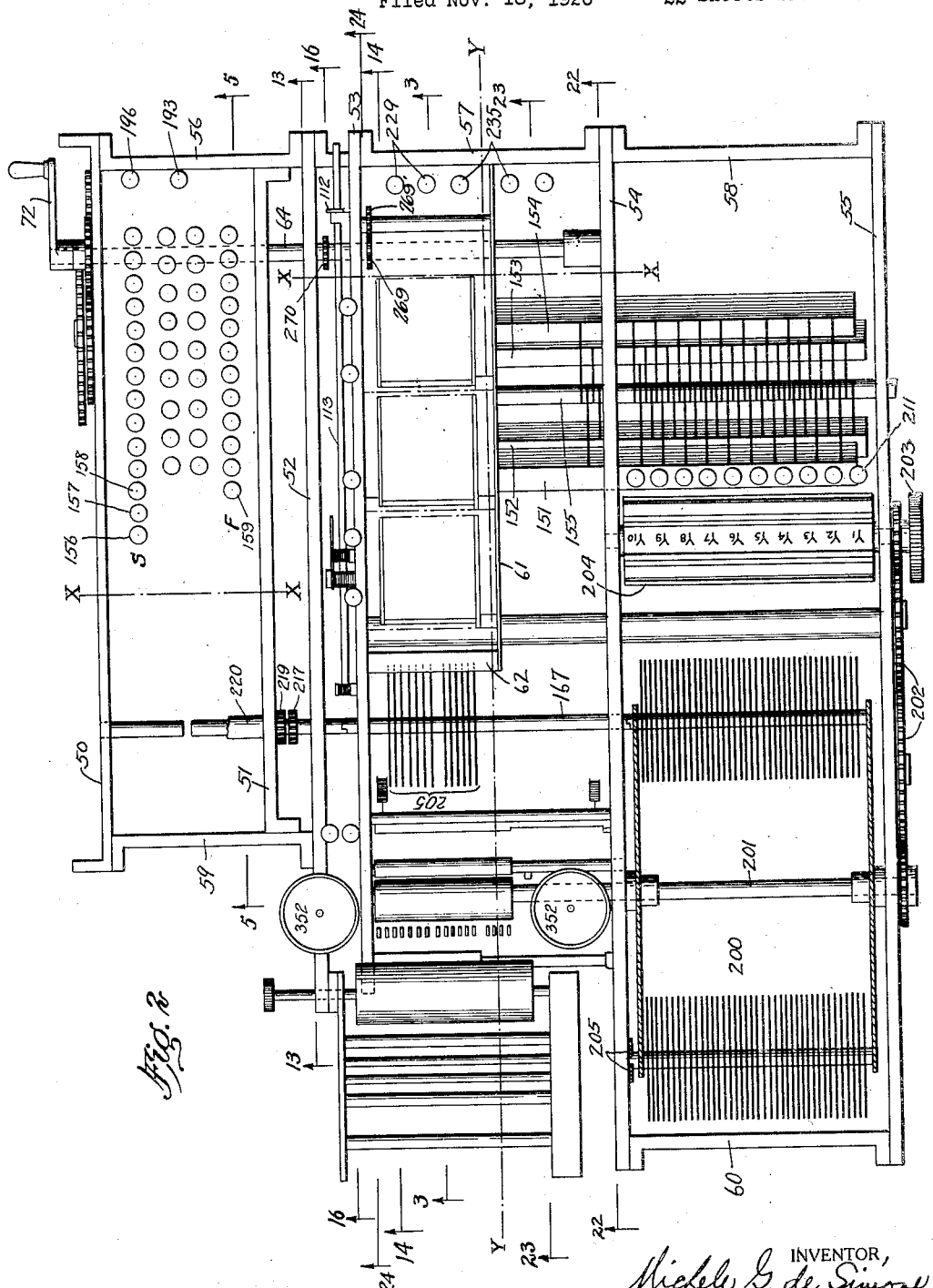

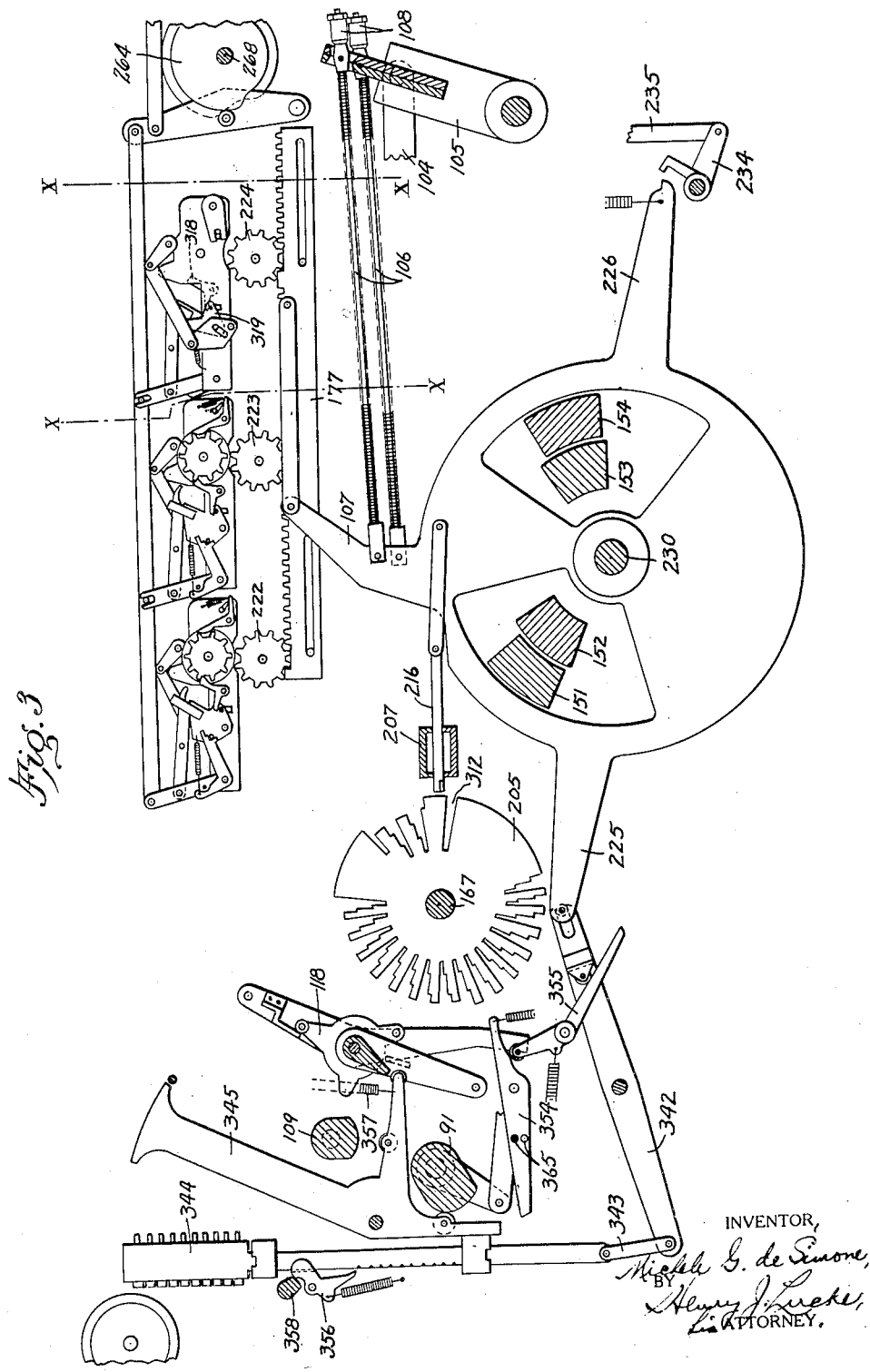

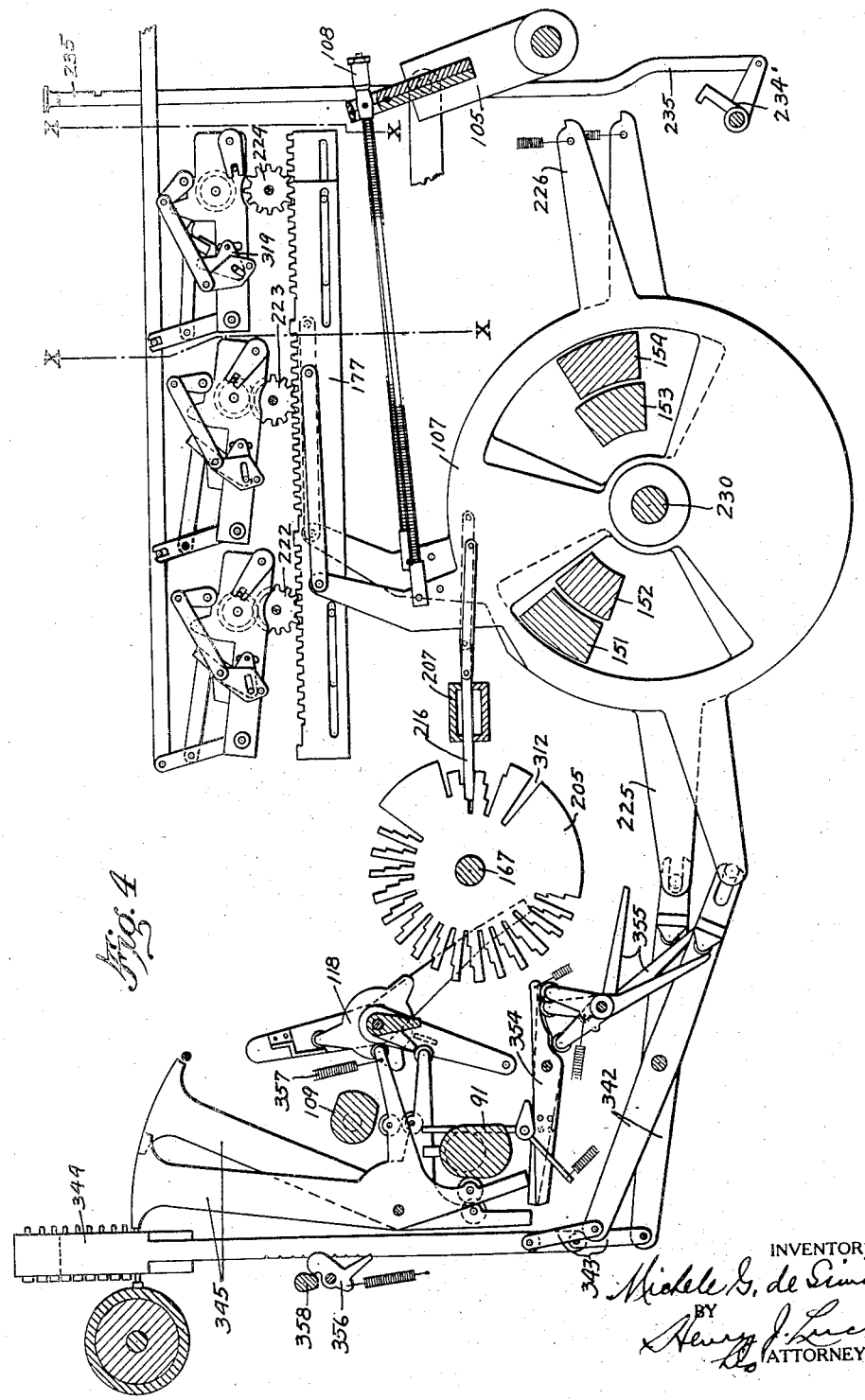

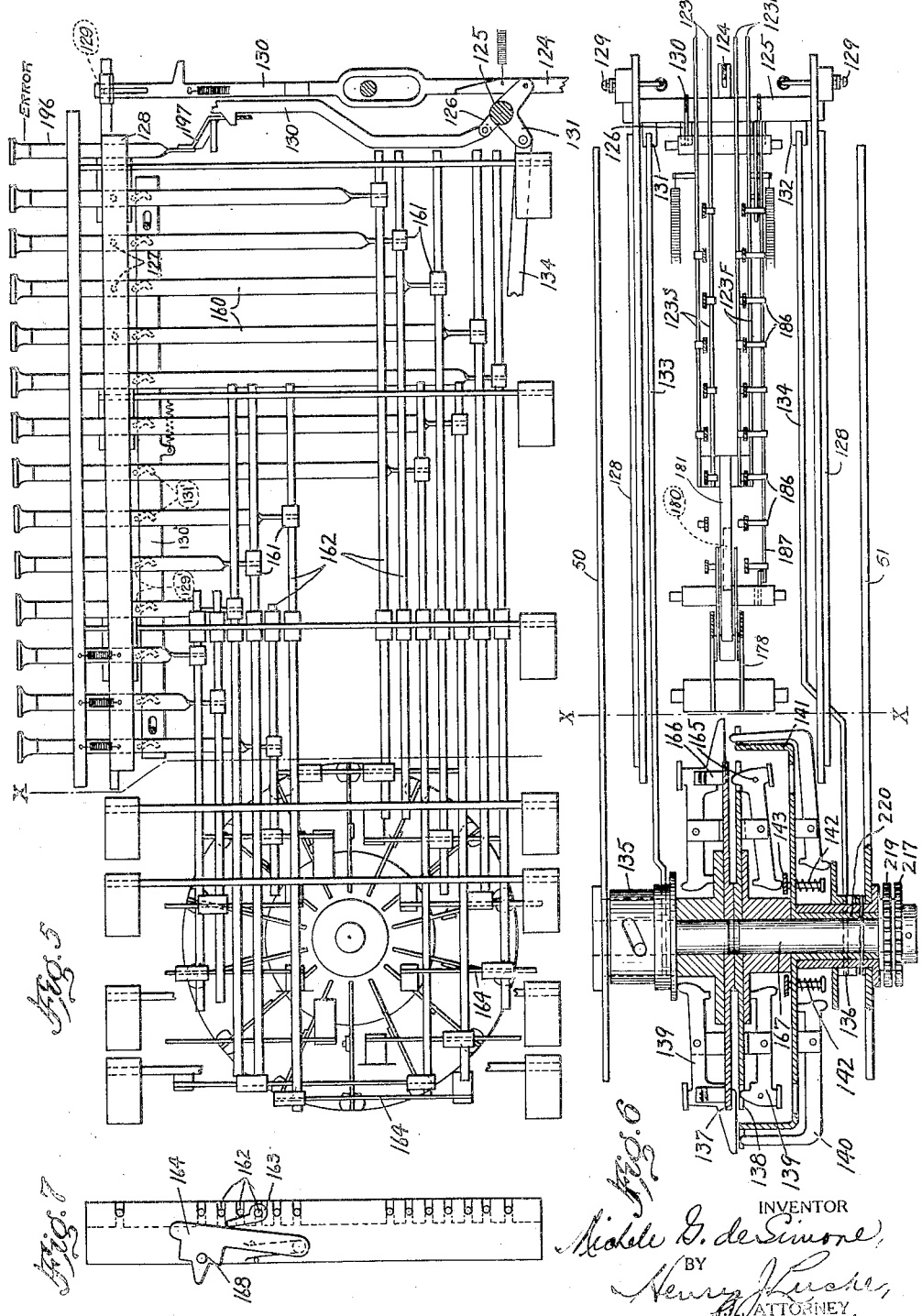

Nov. 8, 1932.   M. G. DE SIMONE   1,887,259
CALCULATING MACHINE
Filed Nov. 18, 1926   22 Sheets-Sheet 8
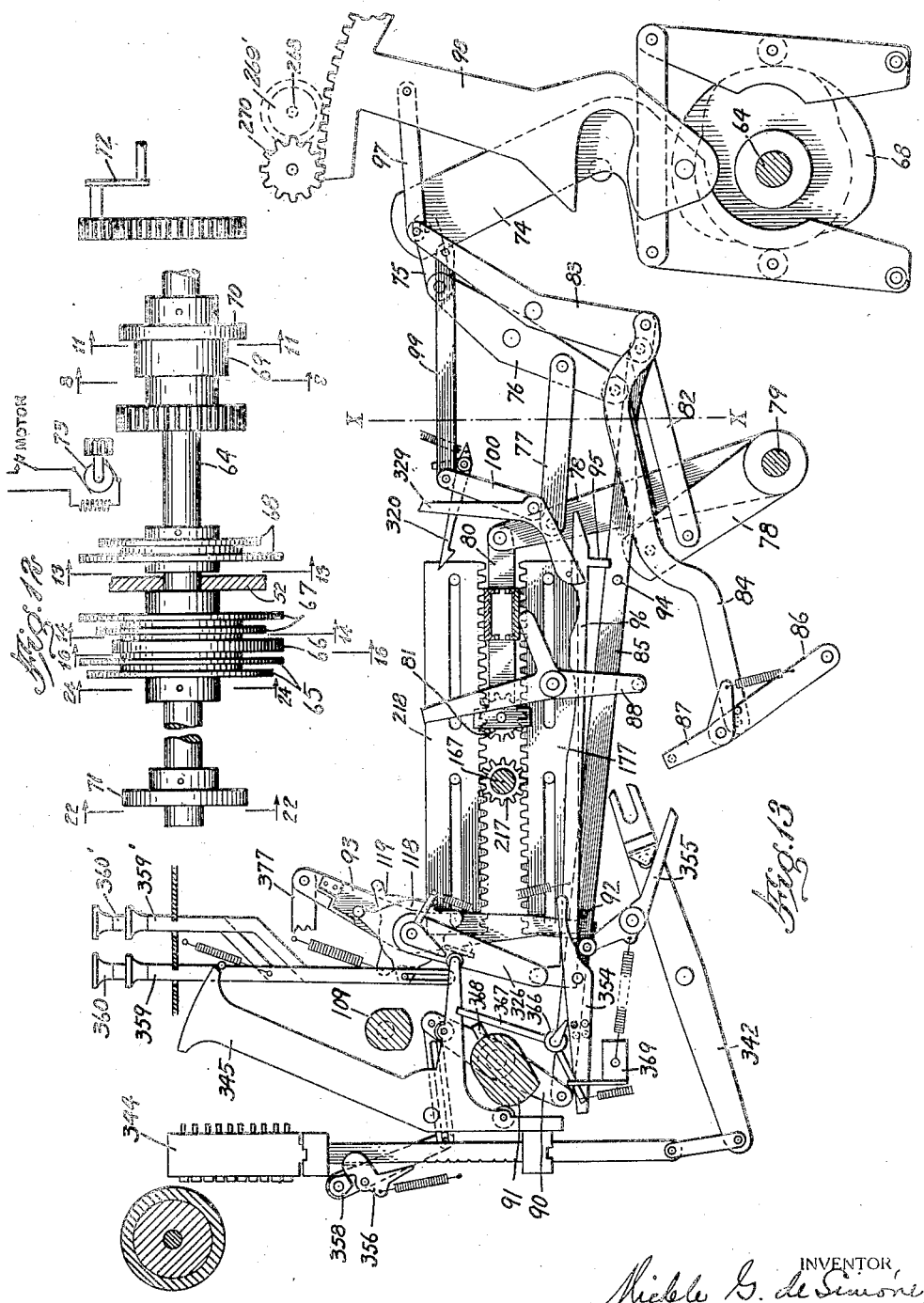
INVENTOR
Michele G. de Simone
BY Henry J. Lucke
ATTORNEY.

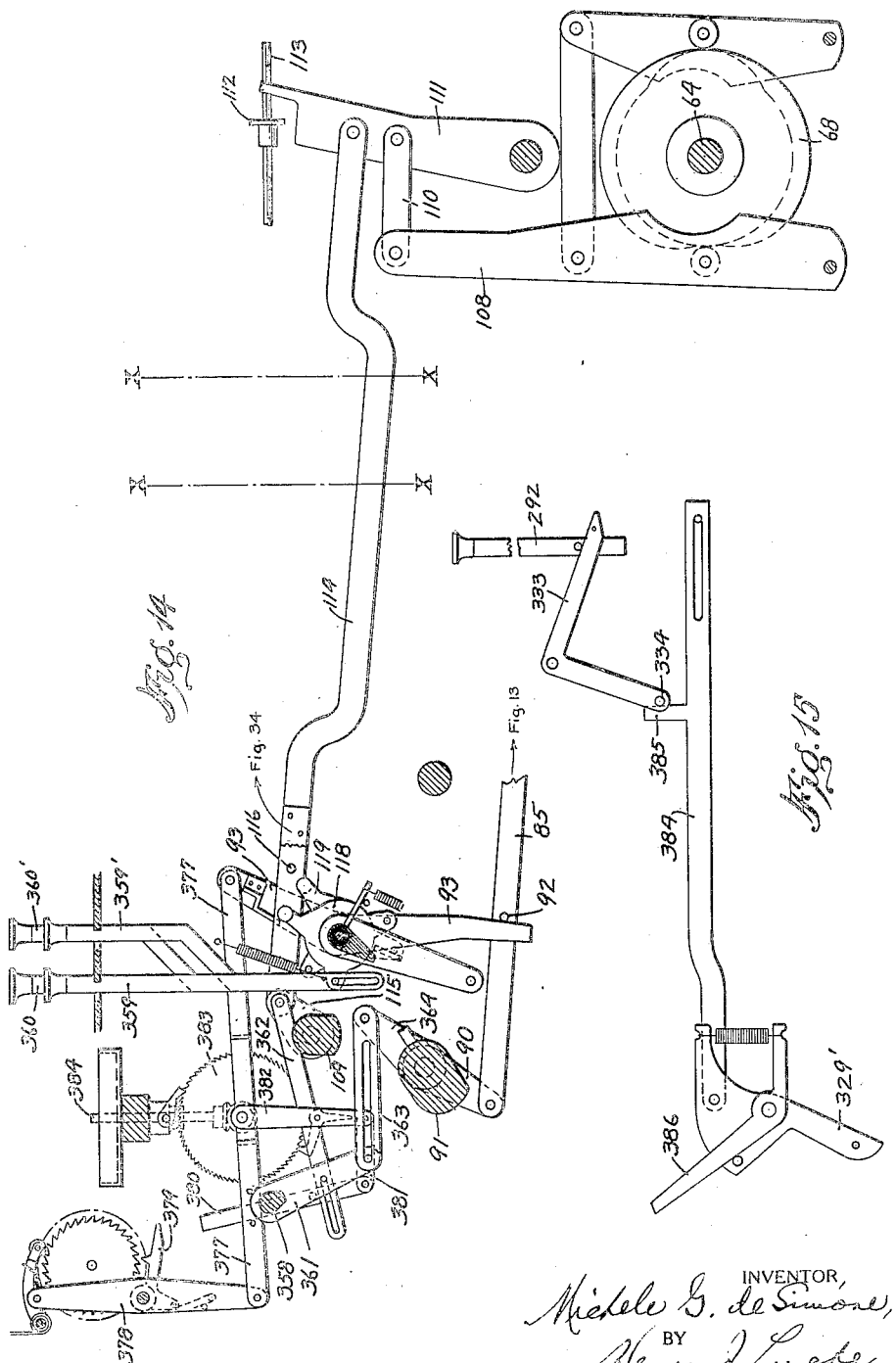

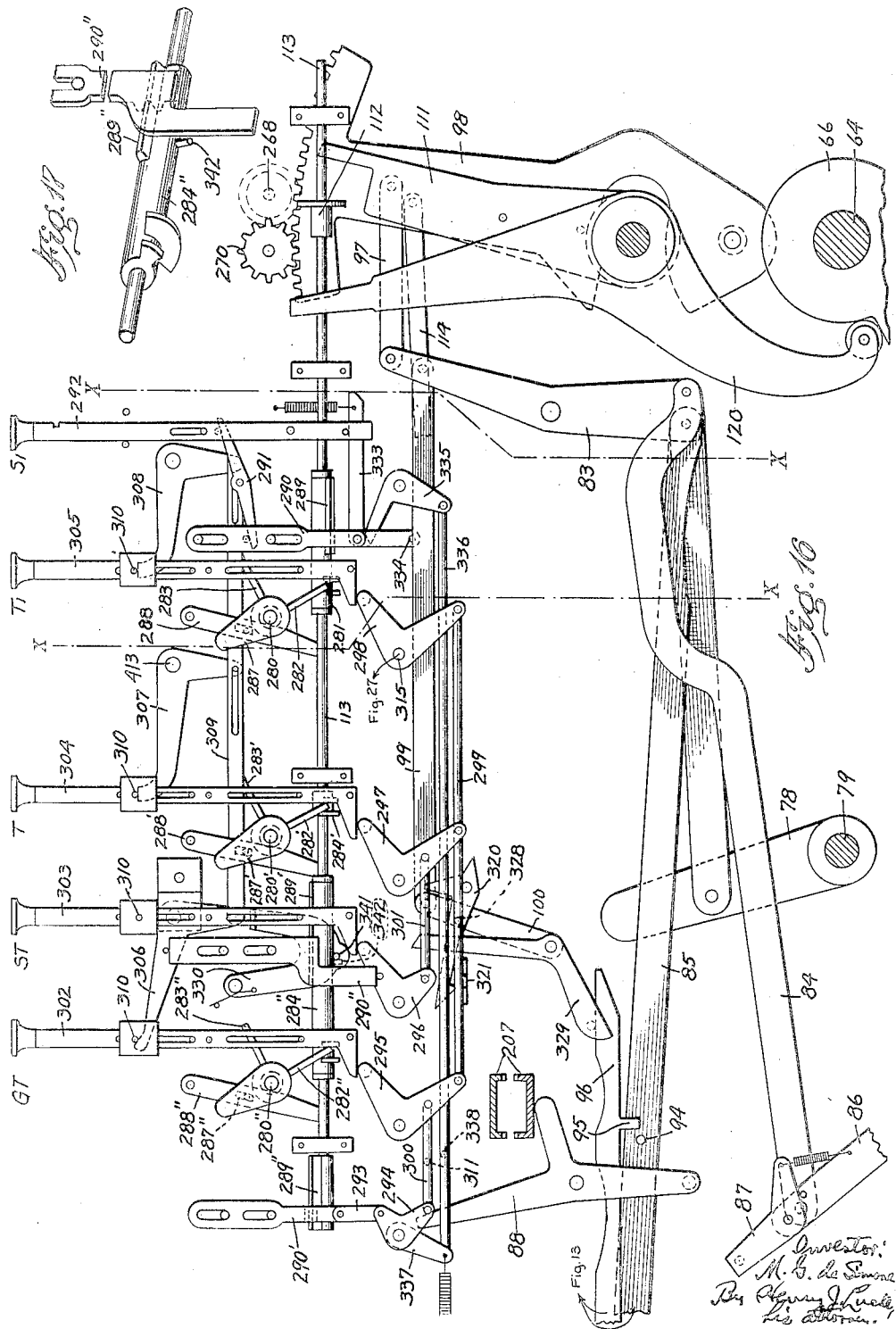

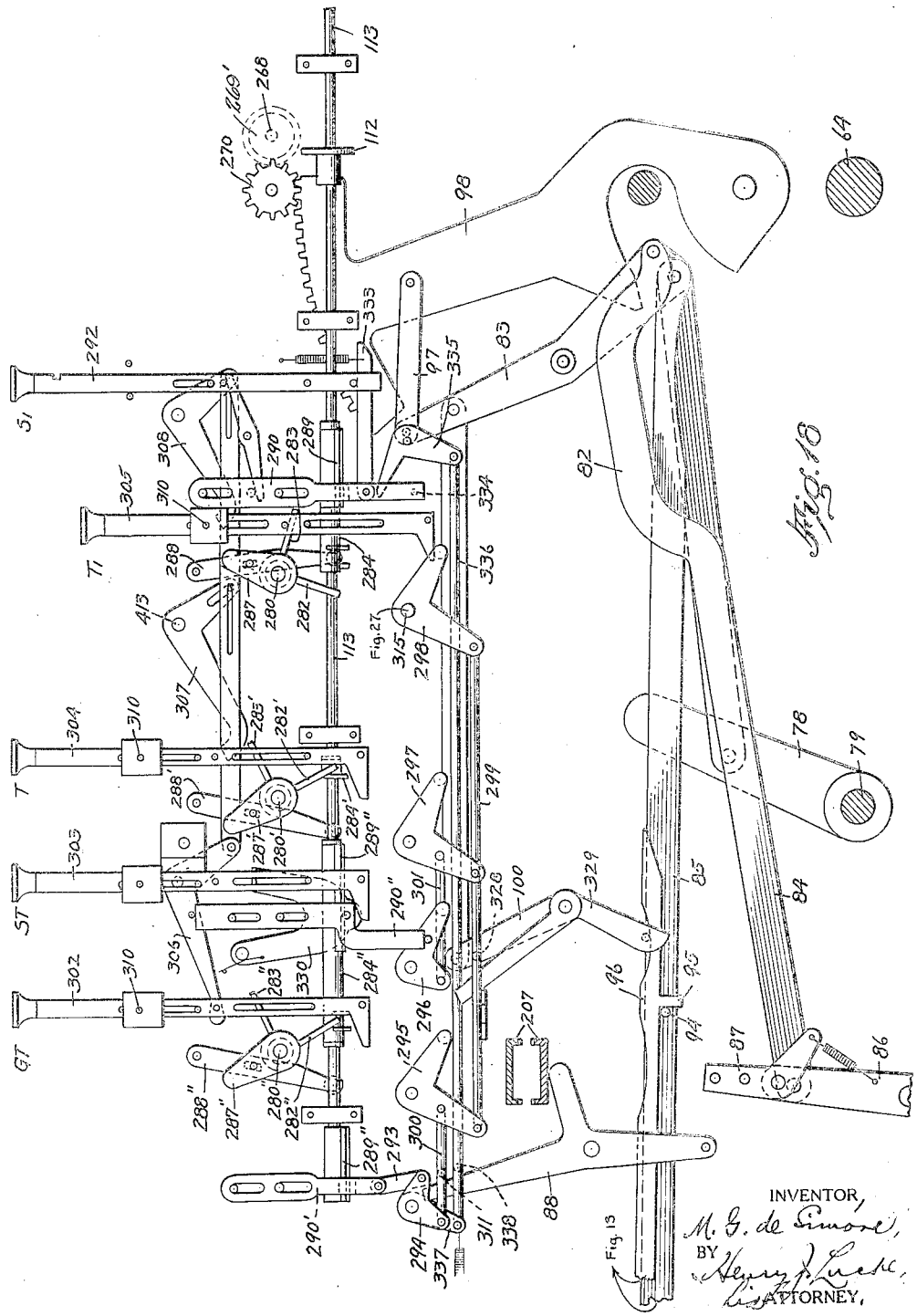

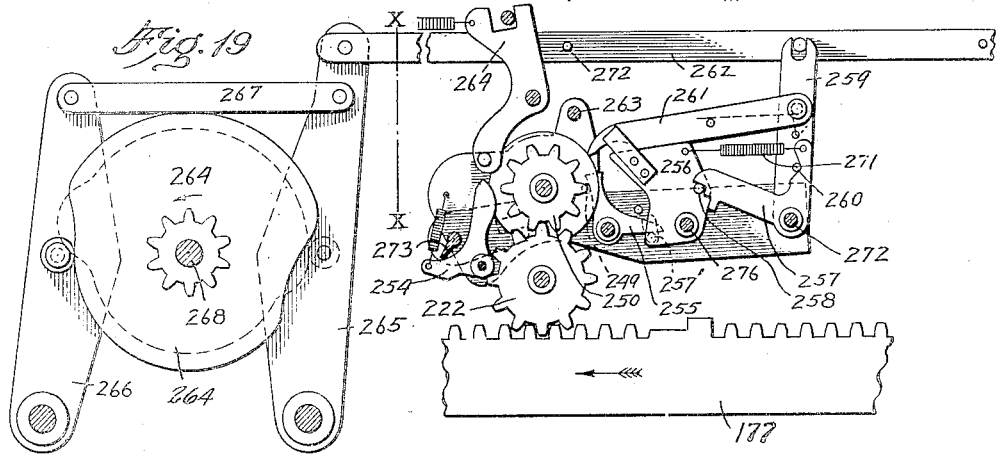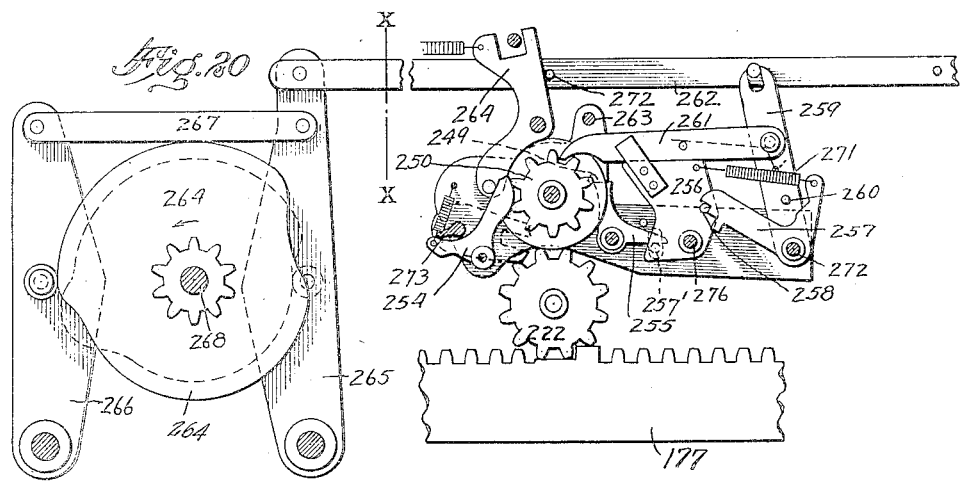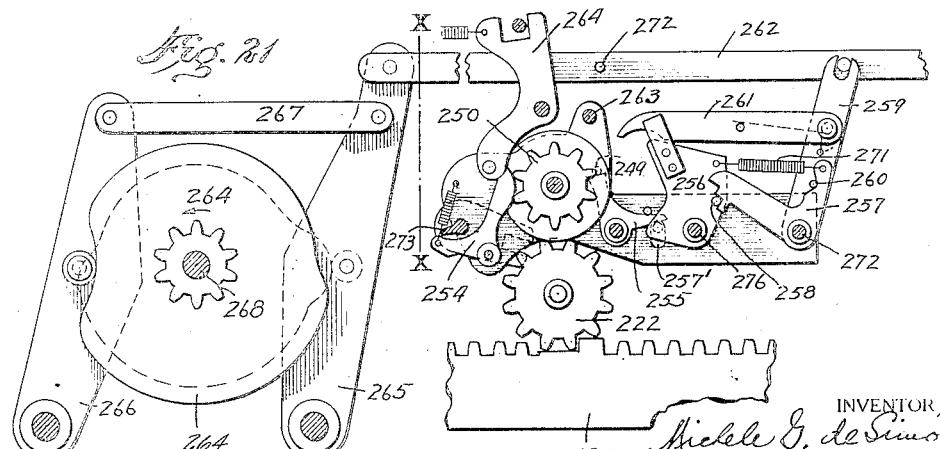

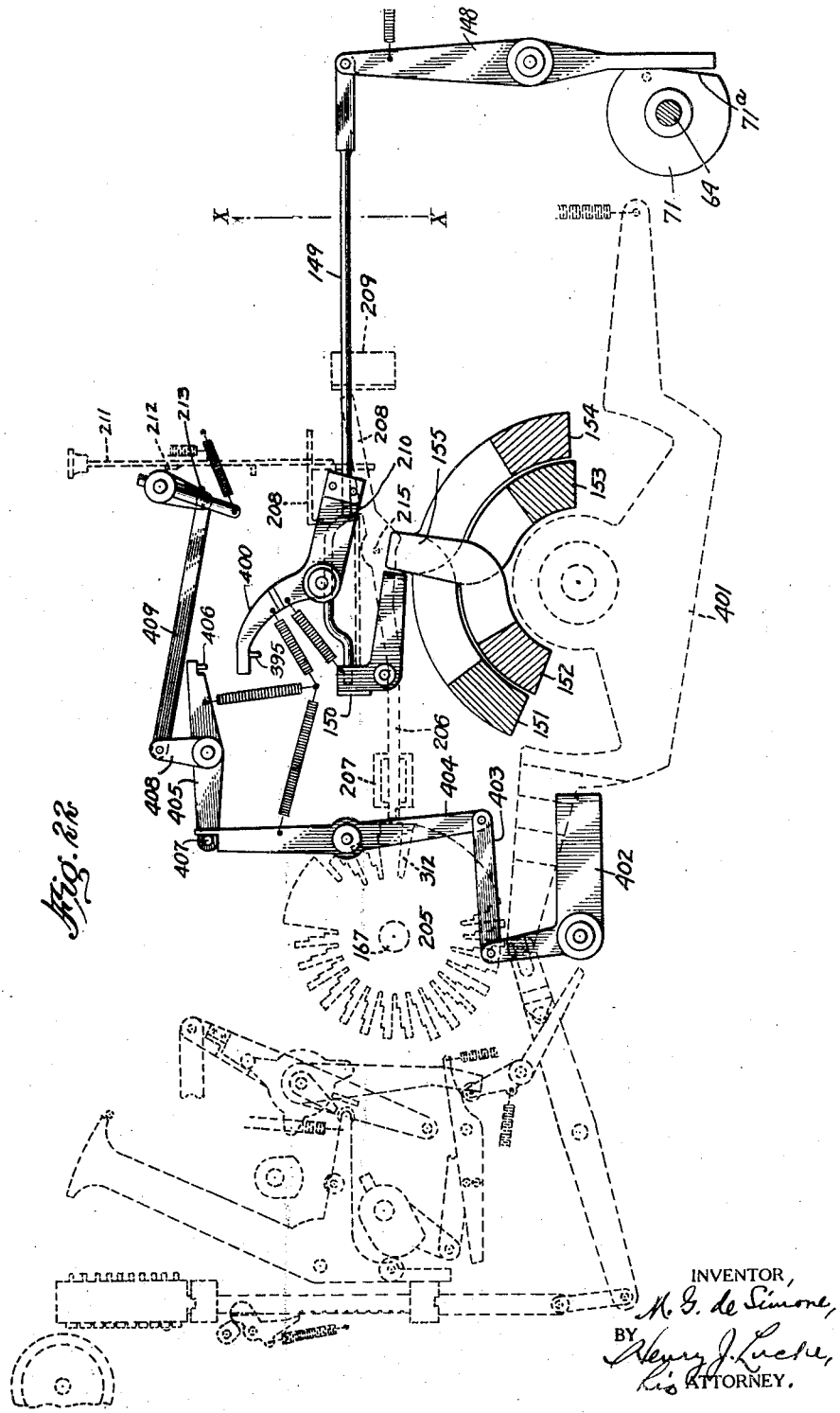

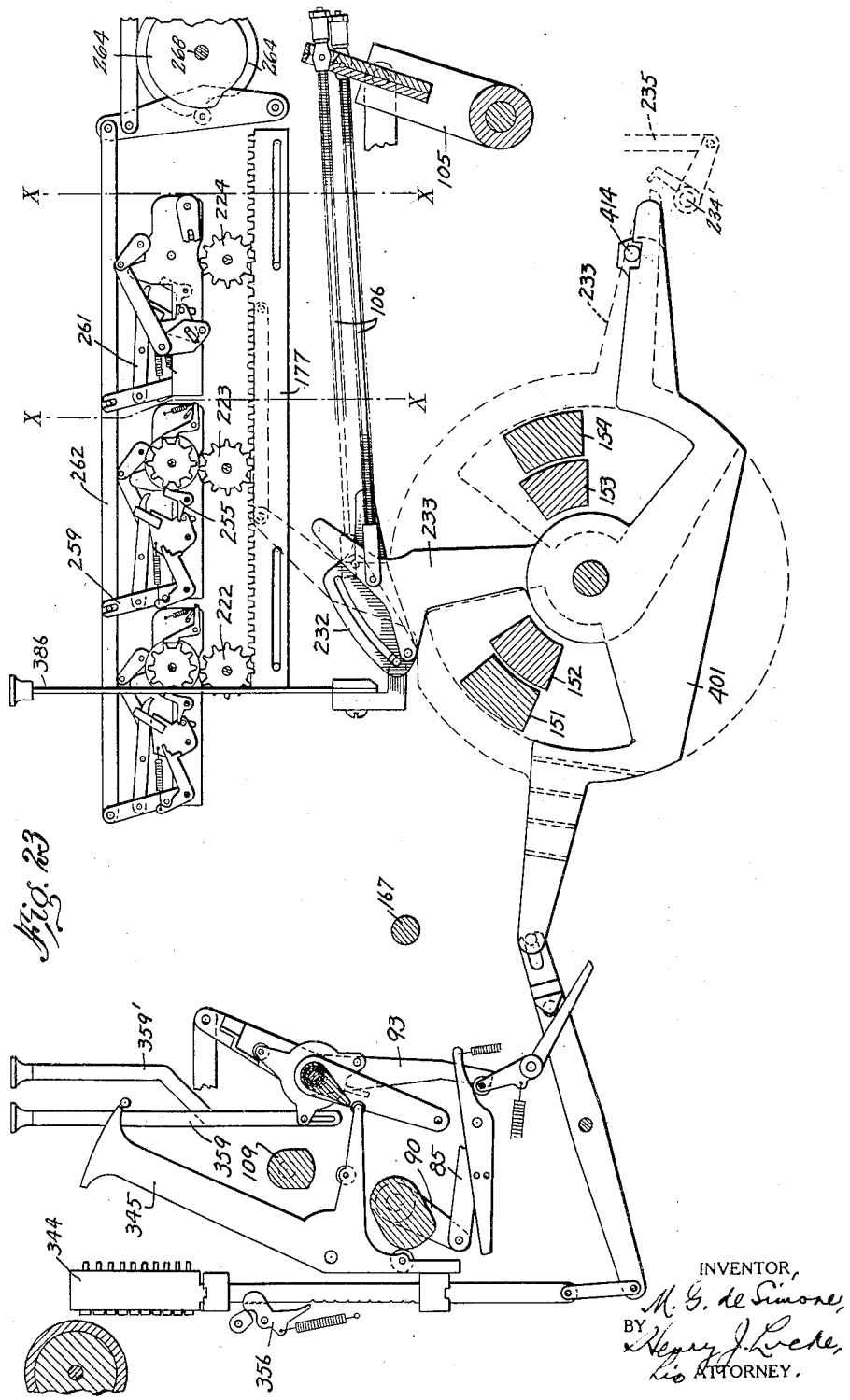

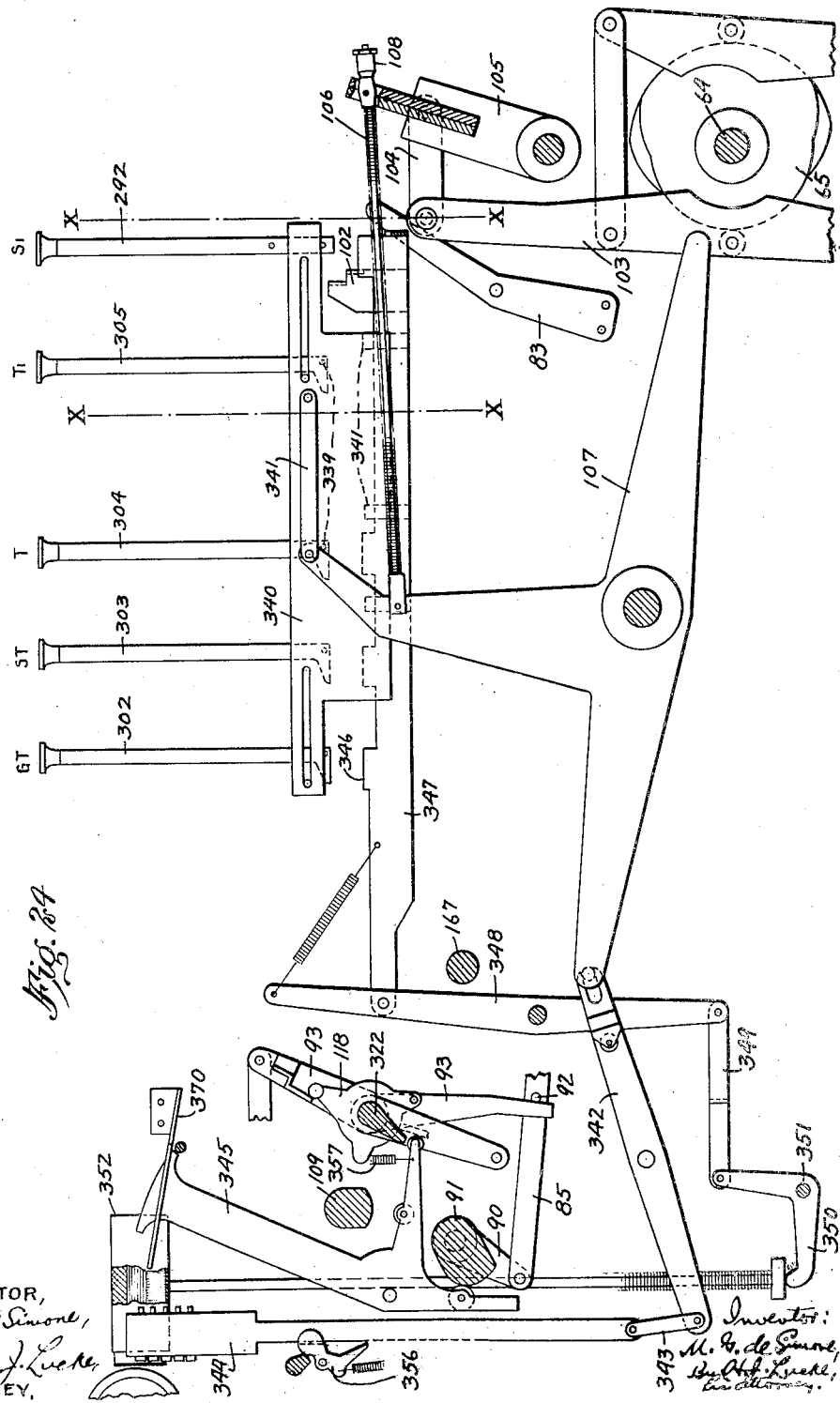

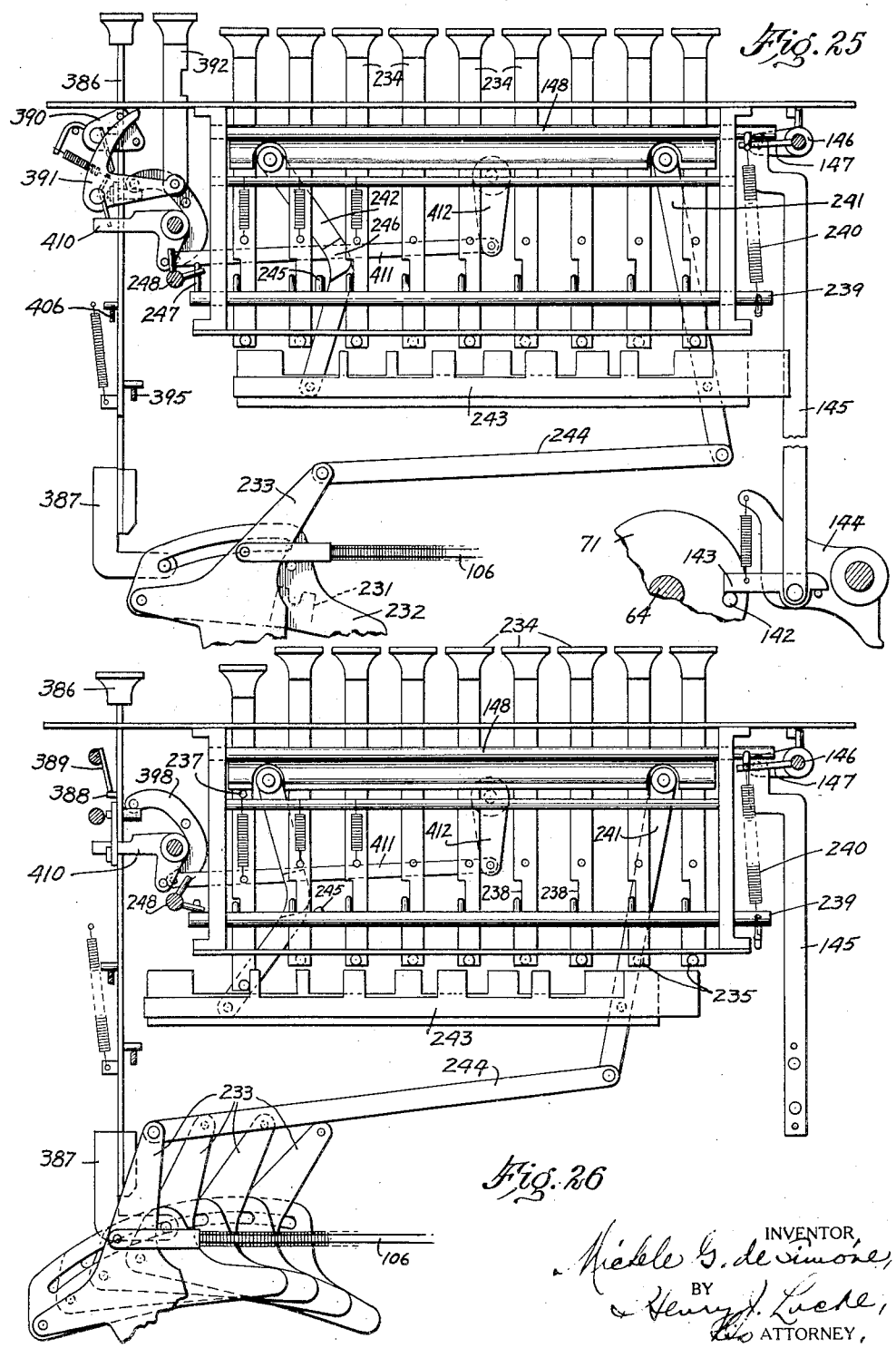

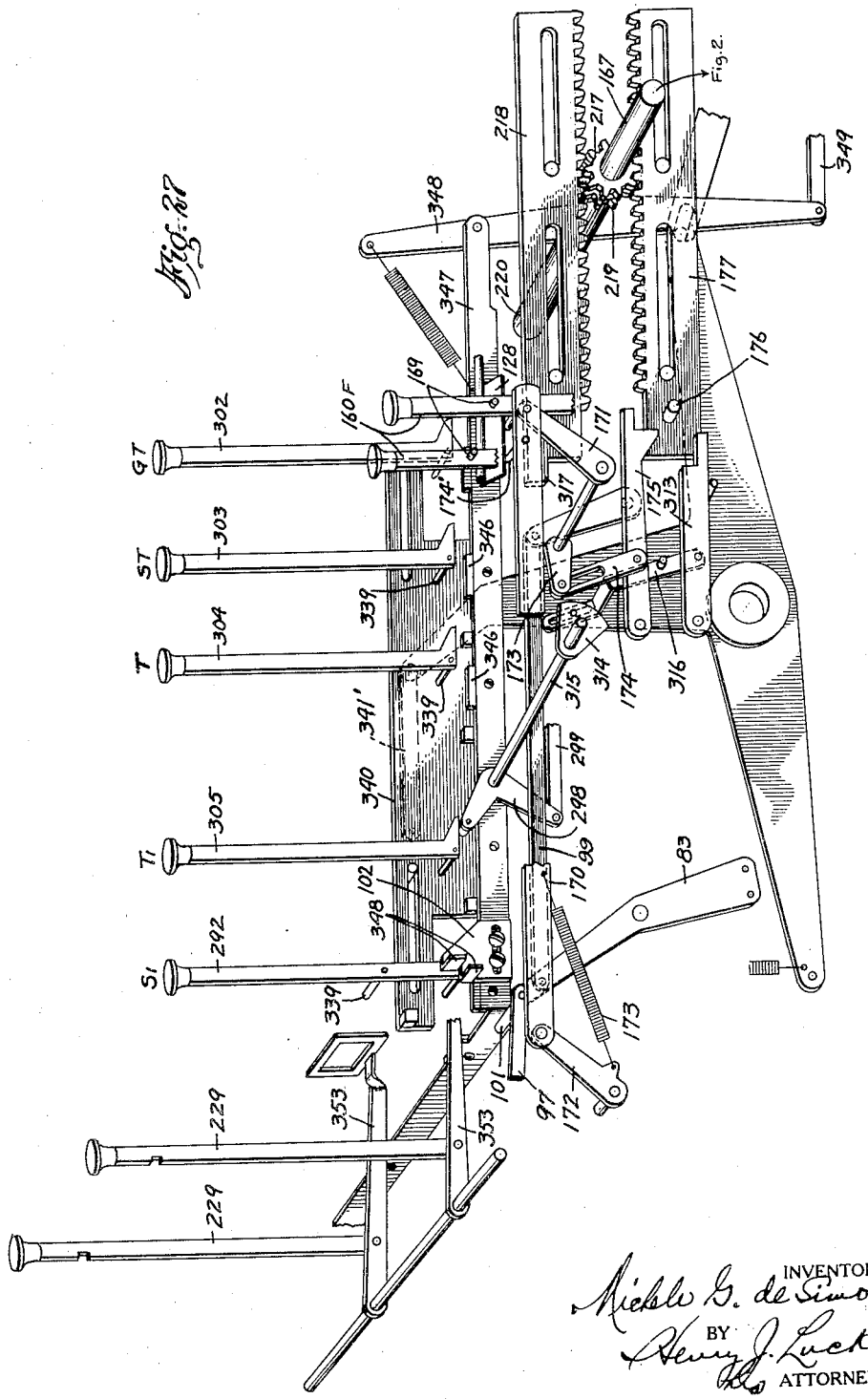

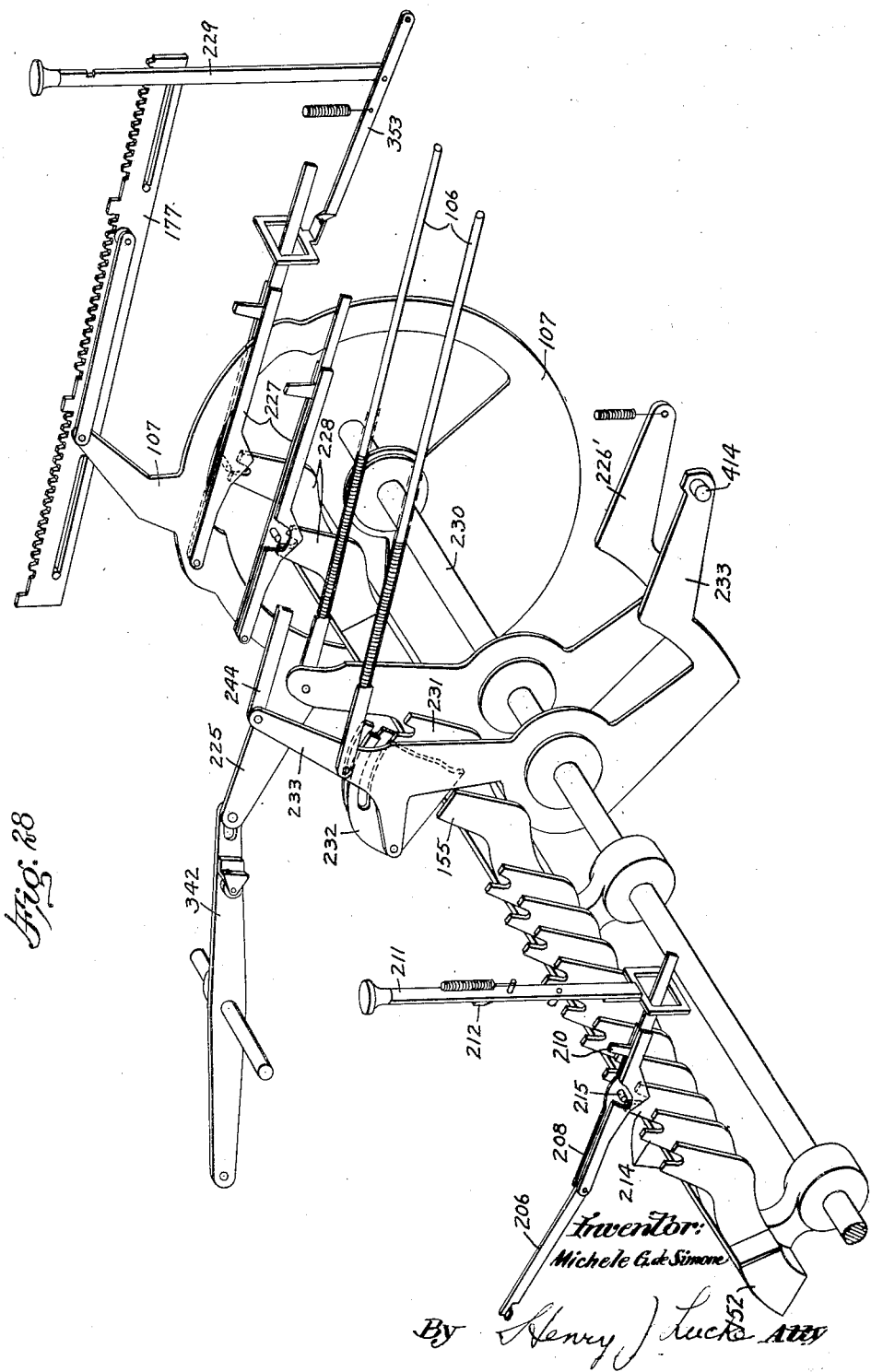

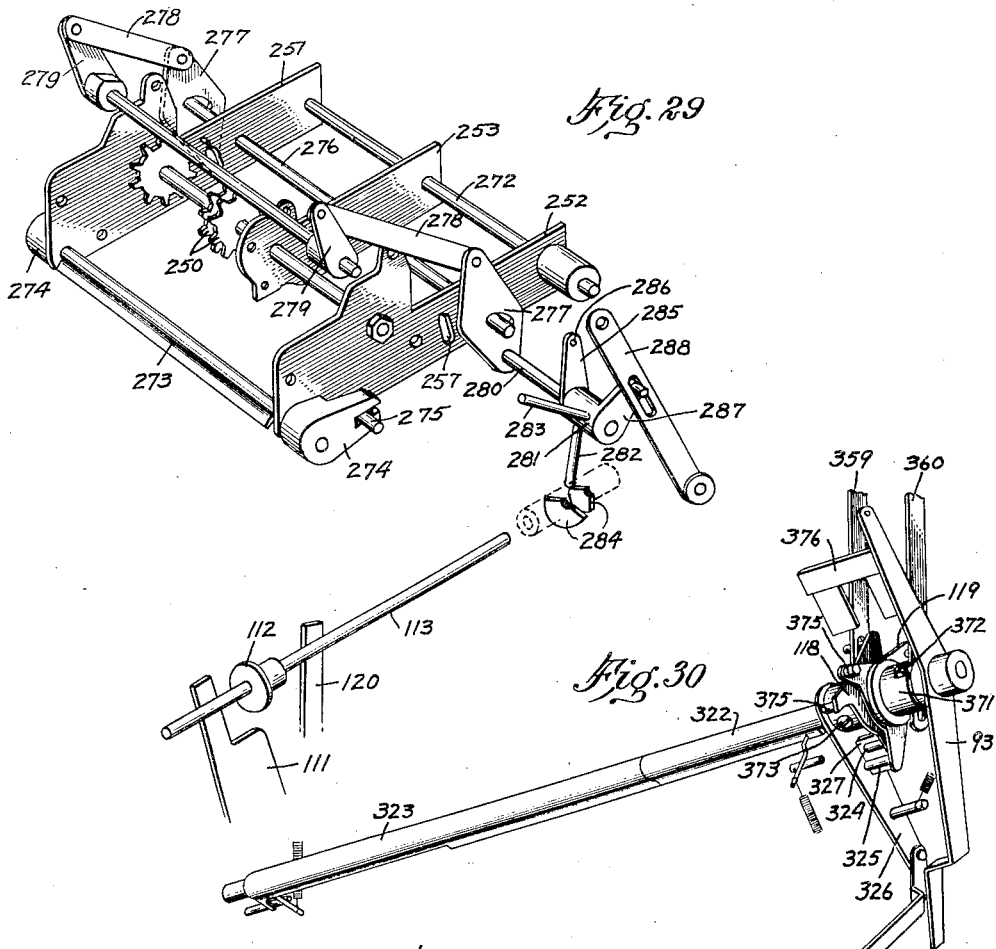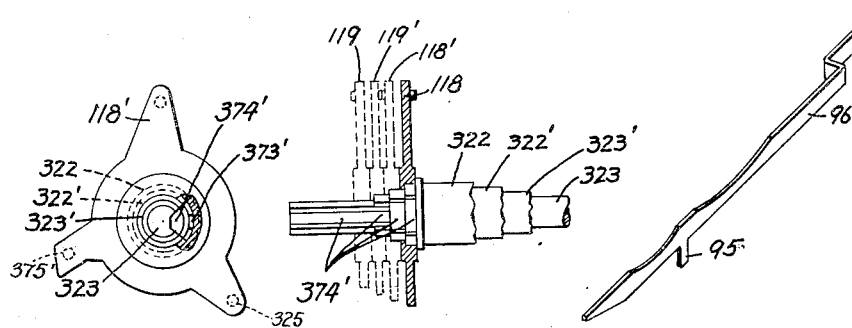

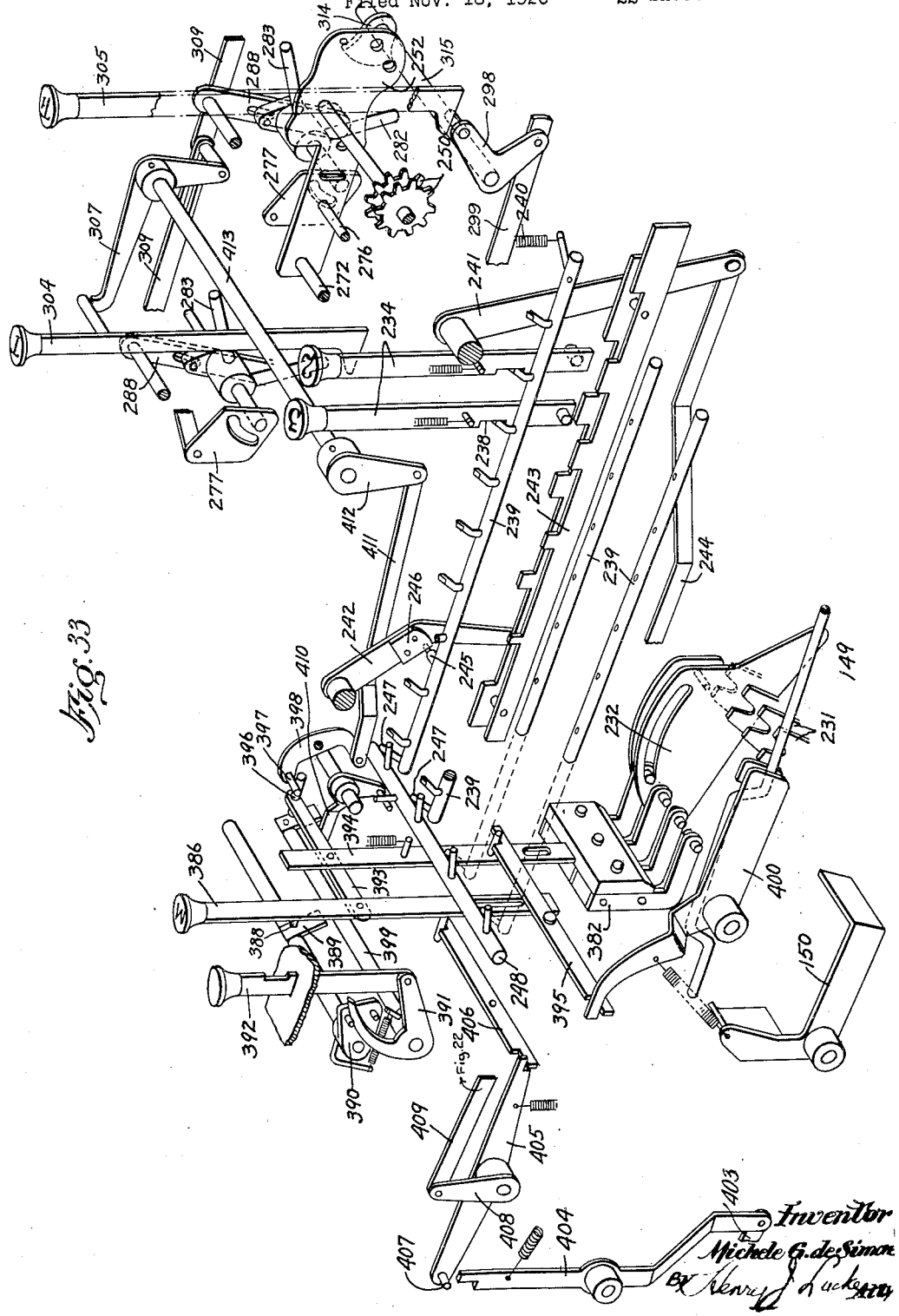

| | Ledger Numbers | Segregated Quantities | | | Segregated | Amounts | |
|---|---|---|---|---|---|---|---|
| ITEMS | * ( 43 | 12 | | | | .90 | |
| | * ( 94 | | 2 | | | .74 | |
| | * ( 107 | | | 5 | | 1.15 | |
| | * ( 84 | | | | 3.5 | 1.47 | |
| | † ( 43 | 8 | | | | .60 | |
| Arbitrary quantity | | | | | | 2.00 | |
| TOTALS | ( | 20 | 2 | 5 | 3.5 | 3.52 | 3.34 St |
| | ( | 12 | | | 3.5 | 2.37 | A |
| | ( | 8 | | | | | .60 B |
| | ( | | 2 | 5 | | 1.15 | .74 C |

*Optionally printed under various control of keys 359, 359', 360 & 360'
†Printed under control of a key 229

Colors of printing under control of keys in fig. 27

Selective non-print under control of group selecting keys.

INVENTOR,
Michele G. de Simone,
BY
ATTORNEY.

Nov. 8, 1932.                M. G. DE SIMONE                1,887,259
                              CALCULATING MACHINE
                         Filed Nov. 18, 1926      22 Sheets-Sheet 22
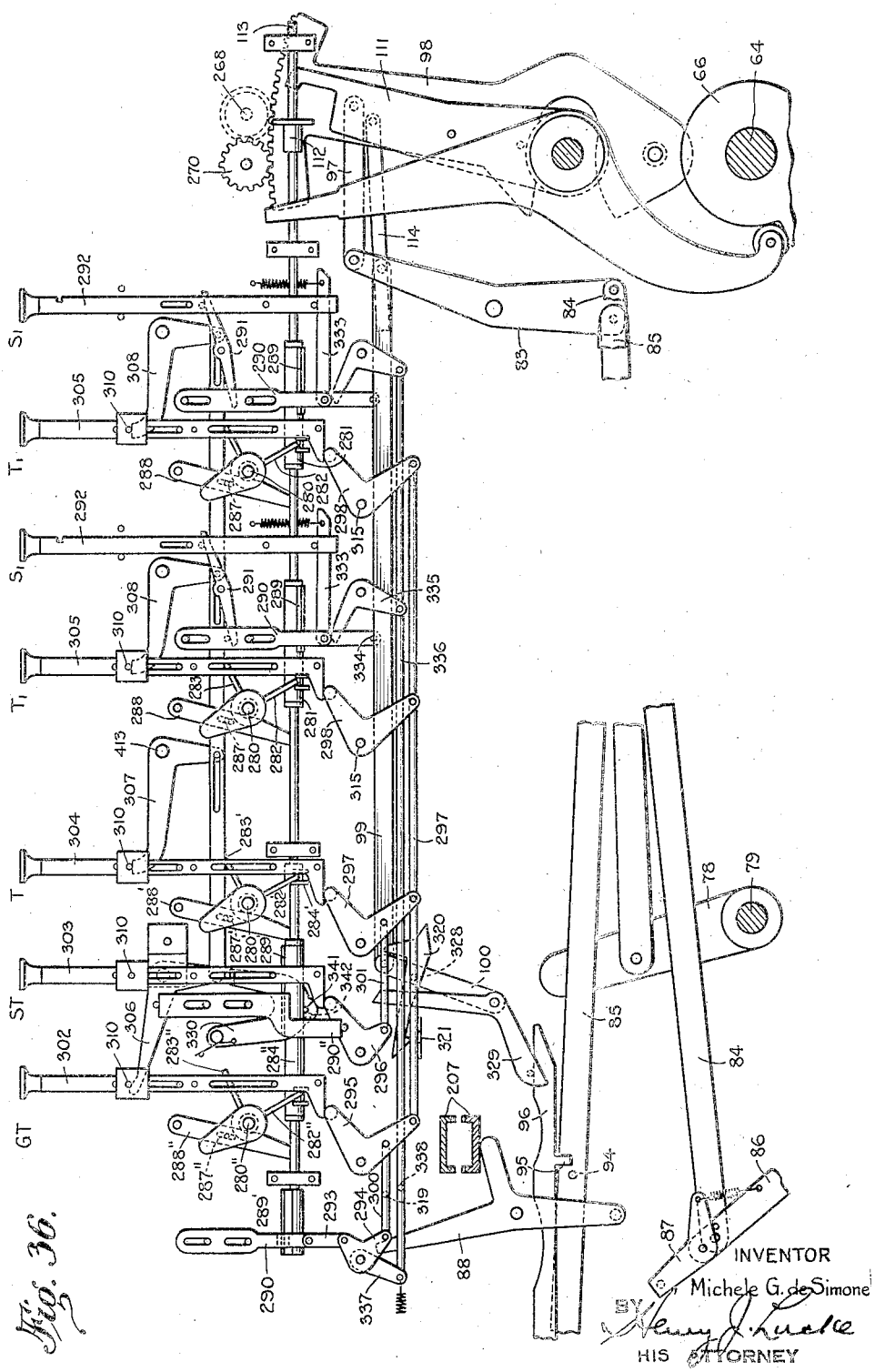

Patented Nov. 8, 1932

1,887,259

UNITED STATES PATENT OFFICE

MICHELE GUGLIELMO DE SIMONE, OF STAPLETON, NEW YORK, ASSIGNOR TO GEORGE B. AGNEW, OF NEW YORK, N. Y.

CALCULATING MACHINE

Application filed November 18, 1926. Serial No. 149,031.

This invention relates particularly to calculating machines. More particularly, the invention is directed to machines for ascertaining the value of an independently selected number, then finding a value of a determinable function of said independently selected number and to optionally indicate or otherwise record the computed value of the function.

For the sake of brevity, I use in the specification and in the claims the term "independent variable" to mean any number which is independently selected.

A particular aspect of this invention is a machine for ascertaining the product of two quantities, one of which is the aforesaid independently selected number and to optionally indicate or arbitrarily identify the product.

Another aspect of this invention is a machine for ascertaining the product of two numbers, one of which is the aforesaid independently selected number with means for optionally summing arbitrary numbers with the aforesaid product.

Another aspect of this invention is a machine which is adapted to accumulate a total of a series of products with means for transforming the machine into an ordinary adding machine.

Another aspect of this invention is a machine of the type commonly designated by the term adding machine with provisions in the form of keys for transforming it into a machine for calculating and totalizing a series of products.

Another aspect of this invention is a machine of the type commonly designated by the term adding machine with provisions in the form of keys for transforming it into a machine for calculating and totalizing a series of products and means for summing a series of multipliers entering into the aforesaid products.

In a common form of the invention, my calculating machine embodies mechanism for ascertaining the product of an optionally selected number when multiplied by a quantity which may be an unknown difference of a pair of quantities or a multiple of a known quantity and to optionally indicate or arbitrarily identify the computation.

One common form of the invention which my calculating machine embodies is a machine for ascertaining the product of an optionally selected value when multiplied by a quantity which may be an unknown difference of a series of quantities with provision of means for summing a series of products, and means for summing optionally selected quantities with such products.

The invention is capable of effecting the various computations in quantities representable by other than the decimal system, as for example the usual system of units employed to represent time, avoirdupois weights, linear measures in feet, inches, etc., etc., and to optionally and arbitrarily identify the computations.

A further feature of my invention is a mechanism for calculating a series of values of discontinuous functions as for example contents of packages identifiable by, say, catalogue numbers, weights of unit lots identifiable by store requisition numbers, etc., etc., and to identify the function by an arbitrary number.

A further feature of my invention is a mechanism for calculating a series of values of discontinuous functions as for example contents of packages identifiable by, say, catalogue numbers, etc., etc., and to accumulate with said values optionally selected quantities which may represent extras or additions new to different grades of goods, etc.

A further feature of the invention is the provision of means for selectively summing series of independent variables, dependent variables, or both at the option of the operator and if desired record certain sums in multiplicate.

A further feature of the invention is the provision of means for selectively summing a series of independently selected numbers, dependent variables, arbitrary quantities or any of them at the option of the operator and if desired, record certain sums in multiplicate.

A further feature of the invention is the provision of means for selectedly summing a series of products which may comprise a predetermined multiplier with a series of multiplicands where each of said multiplicands is an unknown difference and means for summing arbitrary quantities with said series of products.

A further feature of the invention is the provision of any desired number of totalizers in the machine with a minimum of changes in the principal operating elements.

A further feature of the invention is the provision of a plurality of totalizers in the machine any of which may be utilized as a totalizer for an ordinary adding machine.

A further feature of the invention is the provision of a plurality of totalizers any of which may be utilized for summing a series of dependent variables alone or to be included with said sum, a series of determinable arbitrary quantities.

A further feature of the invention is the provision of a plurality of groups of totalizers arranged in sets whereby any group of totalizers may sum a predeterminable segregated series of products and means for including arbitrarily determinable quantities with any or all of said sums.

A further feature of the invention is the provision of a single totalizer which may be utilized as a totalizer for summing a series of products or dependent variables with means for disabling said mechanism.

A further feature of my invention is the provision of a totalizer, which may at the option of the operator be utilized to sum a series of dependent variables or a series of arbitrary determinable quantities or both.

The manipulation of the various forms of the invention is facilitated by key boards having one or more sets of keys arranged to effect convenience in establishing a mechanical representation of the observations which constitute the data of a computation, the particular arrangement of the keys on the keyboards being determined by the nature of the computations and the relative character of the units in which the observations and computations are expressed.

The invention further provides means for printing or listing, in whole, in part, or in multiplicate, at the option of the operator the results of a computation during a normal adding cycle of the machine, with provisions for effecting such printing or listing during a totaling cycle irrespective of the optional condition during an adding cycle, and such printing will appear in the particular units in which the computations are to be expressed.

A further feature of the invention is the provision of a single key which according to its positions determines whether a group of totalizers which sum a series of dependent variables or a series of arbitrary quantities or both.

A further object of my invention is the provision of a key which is adapted to transforming a machine, adapted to calculating a series of products into a machine adapted to sum a series of arbitrary quantities.

Further objects and features of the invention, generally and particularly, will appear more fully in the following detail description and from the accompanying drawings forming a part hereof, in which—

Fig. 1 is a perspective view of a unitary machine embodying my invention;

Fig. 2 is a diagrammatic top plan view of the machine with the cover removed and many elements omitted in order to show the general arrangement of the various parts of the machine; said figure also shows certain elements which do not appear in any of the remaining figures;

Fig. 3 is a section of the machine along the line 3—3 of Fig. 2 showing certain parts in their normal or home position;

Fig. 4 is a section similar to Fig. 3 with many of the parts in an operated position;

Fig. 5 is a diagrammatic section along the line 5—5 of Fig. 2 with certain parts omitted showing one set of integral argument keys;

Fig. 6 is a plan view of Fig. 5 omitting certain parts of Fig. 5; showing parts of the key releasing mechanism;

Fig. 7 is a detail view of one of the key shaft supports for the integral argument keys;

Fig. 8 is a diagrammatic view of the S fractional argument keys in normal position;

Fig. 9 is a diagrammatic view of the F fractional argument keys in normal position;

Fig. 12 is a view of a portion of the main cam shaft with the attached cams and diagrammatic illustration of main driving mechanisms;

Fig. 13 is a vew of the mechanism controlled by cam 68 and is a section of the machine along the line 13—13 of Figs. 2 and 12 with certain parts omitted;

Fig. 14 is a view of the mechanisms controlled by cam 67 and is a section of the machine along the line 14—14 of Figs. 2 and 12;

Fig. 15 is a view of an optional form of mechanism to be used in lieu of certain mechanism shown in Figs. 16 and 18;

Fig. 16 is a view of the totalizer connecting and disconnecting mechanisms lying in approximately the plane 16—16 of Fig. 2 and illustrating elements of plan 16—16 of Fig. 12.

Figures 34, 35:
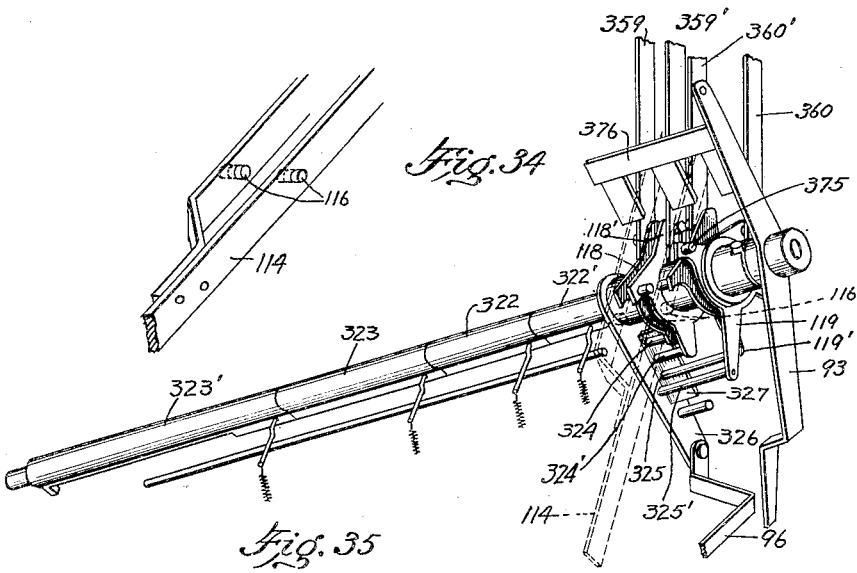

Fig. 17 is a detail perspective view of certain elements occurring in Figs. 16 and 18;

Fig. 18 is a view similar to Fig. 16 with many parts in an operated position;

Fig. 19 is a sectional view of a totalizer at the instant that the transfer mechanism is ready to be tripped;

Fig. 20 is a view of the mechanism of Fig. 19 at a later epoch;

Fig. 21 is a view of the mechanism of Fig. 20 at a later epoch;

Fig. 22 is a section of the machine along the line 22—22 of Figs. 2 and 12;

Fig. 23 is a section of the machine along line 23—23 of Fig. 2;

Fig. 24 is a view of the special character printing mechanism and is taken along the plan 24—24 of Figs. 2 and 12;

Fig. 25 is a sectional view of the arbitrary value keyboard when in normal position;

Fig. 26 is a view similar to Fig. 25 with certain parts in operated position;

Fig. 27 is a perspective of certain elements shown in Figs. 13, 16 and 24;

Fig. 28 is a perspective view of mechanism connected to an actuator with certain related and optionally cooperating elements;

Fig. 29 is a perspective view of a totalizer frame;

Fig. 30 is a detailed perspective of a mechanism connected with the printing keys;

Fig. 31 is a detail of Fig. 34;

Fig. 32 is a diagrammatic section through Fig. 31 showing the loose attachment between certain bell cranks and nested sleeves;

Fig. 33 is a perspective of elements associated with the arbitrary keyboard, the money key and the total keys;

Fig. 34 is an optional form of the mechanism shown in Fig. 30; and

Fig. 35 is a specimen of the work performed.

Fig. 36 is a view corresponding to Fig. 16, but showing a plurality of totalizer selecting keys and associated printing enabling totalizer keys, and controlled mechanism.

In many of the figures an arrow "points" to an identified figure, as for example Figs. 11, 14, 16, 18, etc. The identified figure contains a fuller showing of the element shown broken in the said figures.

As one form of the invention, assuming the independent variable to be a difference; such as for example elapsed time for computing wages, interest, etc.; and the function to be computed is a selectable constant quantity multiplied by the independent variable such as a wage rate, interest rate, etc., so that said function may represent a wage, interest, discount, etc., I shall set forth the essential features of the invention in such form and indicate certain modifications rendering it adaptable to other problems. In such form of the inventions, I provide a key-board comprising two sets of keys or their equivalents which in one form of the invention are adapted to mechanically represent two dates and from such pair of mechanical representations I mechanically compute the difference, which may then be multiplied by a constant selectable from another set of keys or their equivalent.

Additional keys are provided for effecting or controlling the printing of the total of selected groups of the independent variables, or periods of elapsed times, and also corresponding totals of the dependent variables. Such keys are generically denoted as total keys. Such grouping requires plural groups of sets of totalizers and means are provided for selecting a totalizer for actuation from certain of said sets and groups of totalizers; such key may be generically designated as totalizer selecting keys. By means of my mechanism a particular totalizer is selected for operation by the combined action of two keys, the total number of said keys being less than the total number of totalizers. Thus, suppose the existence of MN totalizers the selecting keys will be merely $M + N$ in number. At times it is desirable to be able to list or record a total without clearing certain totalizers, to effect such as least one subtotal key is provided for at least one set of totalizers though other subtotal keys can be provided if desired. In order to optionally disable the printing of certain items constituting a sum a plurality of printing control keys are provided. The usual repeat and error keys are provided.

The machine may be actuated either manually, by means of a suitable crank, or automatically by a suitably located and controlled motor. Such motor control may take the form of a starting key or button for causing the motor to be connected to the main cam shaft in any well-known manner. A machine embodying features embodied herein has been found to be practical.

*Outline of specification*

The machine of which this is a specification is somewhat complex and many elements are involved in the proper functioning of the machine. In order to clearly present the contents of this specification and of the various types of my machine as a whole it is stated that a suitable framework is provided which is designed to properly locate all centers and guiding means for all elements. A main cam shaft is provided with seven rigidly attached cams which are briefly described immediately following a brief description of the main shaft. The proper operation of the machine depends upon the manipulation of certain keys which in various combinations determine the amounts to be inserted into the totalizer or totalizers, including normally inactive sets of totalizers. Hence, following the brief description of the cams follows a description of, first, the argument keys which are utilized to mechanically represent a set of observations, then the arbitrary quantity keyboard, then the arrangement of a mechanical table controlled by various combinations of keys for computing a function of the variables derived from a setting of the argument keys. A discussion of various arrangements for reading the mechanical table follows, including a brief discussion of mechanical representation of precomputed functions. Next come the arrangement and operation of the totalizers actuators, including means for transsetting computed functions and arbitrary amounts, following is a generic description of a totalizer and its associated transferring mechanism. General arrangements of sets and groups of totalizers are then described. The totalizers are constructed so as to be connected with and disconnected from their actuators at various times for adding, totaling, etc.; a description follows including means for selecting normally inactive sets of totalizers. Such mechanism is intimately interwoven with the timing mechanism for causing the totalizers to receive accumulations and to exhibit the results of such accumulations so that such mechanism is described in part prior to a full description of the total keys which follows. Then follows a description of the printing hammer mechanism with means for optionally disabling certain of the hammers and the paper and polychrome ribbon feed mechanism. Thereafter follow a number of typical examples of computations with various totalizer arrangements. In conclusion, certain modified arrangements are described.

Framework of the machine

Throughout the specification which follows, numerous elements and parts are described as being carried by the framework of the machine. Very few of the drawings show any framework at all, for to do so would unnecessarily complicate the maze of lines which are inevitable in drawings illustrating machines of this class.

The plan and general arrangement of the main frame is best shown in Fig. 2. Generally the frame consists of six relatively thin longitudinally extending skeleton castings 50, 51, 52, 53, 54 and 55 held together and squared by the end castings 56, 57, 58, 59 and 60. From said Fig. 2, it is clearly seen that the machine is divided generally into four main parts, the one between frames 50 and 51 comprising the argument key section for initiating a mechanical representation of the independent variable; the second between frames 52 and 53 for supporting most of the elements for timing the totalizers and the elements associated with cams 66, 67 and 68; the third between frames 53 and 54 comprising the totalizers, the arbitrary quantity keyboard, the actuators and printing section, the totalizer actuator controlling mechanism, cradles for the totalizers, and the printing mechanism controlling device; and the fourth and final, that between frames 54 and 55 which contains the mechanical table and its controlling means, the said table includes a reel of sets of notched disks which are mechanical representations of pre-computed functions for various values of the independent variable which can be mechanically represented on the argument key board.

As stated, the greater part of the links, arms, levers, etc. controlled and operated by cams 66, 67 and 68 are mounted on and between the sides of frames 51, 52 and 53. Nearly all the links, levers, etc. associated with the various timing of the totalizers are carried by the sub-frame 53. Frame 61 is of comparatively thin sheet metal supported and carried in part by generously dimensioned studs 62 rigid with the sub-frame 53. If it should be desired to increase the number of totalizers in a set, such is readily done by increasing the width between frames 53 and 61, it being evident that sufficient space is allowed for such an increase, as is clearly indicated in Fig. 2. Similarly, the frames 50, 51, 52, 53, 54 and 55 can be of increased length to accommodate a larger number of groups of totalizers. Such increase in capacity with the necessary changes in dimensions is indicated throughout the drawings as will appear more fully hereinafter.

Main shaft

All movements of all elements effecting mechanical computation, recording, etc. are under control of a main cam shaft, which may be given a single rotation by any desirable means such as a manually operable crank or a suitably connected source of power. Mounted on said shaft are a series of cams which impart motion to various elements. For the purposes of this explanation, said cams may be conveniently considered as acting at different successive periods, although exigencies may demand that under certain forms of my machine certain of these cams may be effecting simultaneous movements of different elements.

The main shaft 64 is illustrated in part in Fig. 12. A manually operating system is diagrammatically indicated at 72 and a power source is diagrammatically indicated at 73. Rigidly mounted on the main shaft 64 are the cams 65, 66, 67, 68, 69, 70 and 71. Briefly these cams control the following operations:—

Cam 71 operates a lever which may release the transsetting bars to permit the accumulation of functions into the totalizers.

Cam 68 positively translates the keyboard set-up to a tabular actuator control; effects an idle movement of the transfer cams; conditions the printing hammers so that they can be subsequently fired; unlocks the paper and ribbon feed mechanism; locks all total keys against operation; operates means to change the normal color of printing; and positions a lever for elevating any depressed total keys.

Cam 65 controls the actuators in their movements to permit the amount represented on the previously positioned mechanical table to be transferred into a mechanical displacement.

Cam 67 locks the type carriers in positions assumed when the actuators determine the amount standing on the notched disks of the mechanical table; permits the actuators to determine which printing hammers are to be fired; operates to normally connect a set or group of sets of totalizers with actuators; releases the printing hammers for printing; prepares to feed the inking ribbon and the record strip; and withdraws the printing hammers a slight amount so that the type carriers can descend.

Cam 65 comes into action again to restore the actuators and type carriers to normal position.

Cam 66 operates to normally disengage a set of totalizers or a group of sets of totalizers; and unlocks any depressed total keys.

Cam 68 comes into action again to effect any necessary transference of tens; effects a feeding of the paper and inking ribbon; operates the lever to elevate any depressed total keys; restores the mechanical table to normal "no entry" position; operates the lock which normally holds the total keys at normal; releases the one way lock so that the type carriers can ascend on a subsequent operation; and recocks the printing hammers.

Cam 70 operates to release all argument keys, and restores their respective stops to normal.

Cam 69 operates to restore the argument key mechanism to normal.

Cam 71 comes into action again to permit locking of the transsetting bars and to release the arbitrary quantity keys.

In Fig. 2, a crank 72 is shown which is connected through suitable gearing (shown adjacent said handle) to the main cam shaft 64 for effecting a manual drive of the machine.

The elements of the machine come into operation in substantially the order indicated. As noted above, certain elements are moved to one position by certain cams and restored to normal by another, as for example, the platen and ribbon feed, the totalizer connecting and disconnecting mechanisms, etc.

The remainder of the specification comprises, in the main, an amplification of the brief statements collected in the last few paragraphs.

Cam 68

Cam 68, as pointed out under the heading Main shaft, is the first cam on the main shaft 64 to begin to move its connected parts. Said cam is preferably of the complemental or frog type and operates a parallelogram system of links including the long lever 74, see Fig. 13. Said long lever 74 is connected by a link 75 to a reversing idler lever 76, rotatably mounted on a framework supported stud; said idler lever in turn is connected by a link 77 to member 78, rotatably mounted on a stud 79, carried by the main framework. Said member 78 is connected through a link 80 to a floating pinion 81 which effects a positive setting of the notched disks as is more fully described under the heading Setting of notched disks. Said member 78 is connected by a link 82 to the idler lever 83. All elements so far described lie on the rear side of the main frame casting 52 which, if shown in Fig. 2, would lie in front of all the parts so far described, but the lever 83 is constructed in a manner which may be likened to a box without top or bottom with a side on each of the front and rear of the above mentioned frame. The pins or ends of said lever extend through suitable openings in the frame. The lower end of said lever 83 is connected to two links 84 and 85 extending generally rearwardly, the one 84 serving to actuate an arm 86, (see also Figs. 16, and 18 and headings Restoring disabled forks) carrying a spring urged wipe pawl 87 which is ineffective when traveling rearwardly i. e., toward the left as viewed in Figs. 16 and 18, but interferes with the lower ends of lever 88 when traveling forwardly at near the end of the operation of the machine. The link 85 extends rearwardly where it connects with a crank arm 90 rigid with the shaft of hammer recocking cam 91 (see heading Recocking of printing hammers). Said link 85 carries a stud 92 (see also Figs. 14 and 24) which releases the lever 93 for operation (see heading Platen and ribbon feed). Said link 85 also carries a stud 94 which may on occasion interfere with a downwardly extending projection 95 on the draw bar 96 (see heading Total keys enable printing mechanism). The upper end of lever 83 is also connected to two links the one 97 serving to oscillate the sector 98 (see heading Transfer cams) to effect rotation of the transfer controlling cams and the other link 99 which extends rearwardly to rock a stud carrying lever 100, to lock the total keys against depression after the machine starts to operate (see heading Machine locks total keys). Said link 99 also carries a stud 101 (see Fig. 27) which on occasion may contact with a plate 102 for changing the normal color of printing as is more fully described under the heading Polychrome printing.

Cam 65 and theoretical timing

Cam 65 (see Fig. 24) controls the oscillatory movement of the totalizer actuators. Said cam is of the complemental or frog type and operates arm 103 through a suitable series of arms and links. Said arm 103 is connected by a short link 104 to a general operator 105 pivotally carried by the main frames of the machine. Said general operator 105 is provided with a series of knuckles through which pass the respective rods 106 of adjustable length connected to members 107 of a totalizer actuator (see also Figs. 3, 4, and 28). The normal position of the member 107 can be accurately determined during assembly of the machine by means of the lock adjusting nuts 108 on rods 106.

All actuators 107 are resiliently permitted and in addition resiliently forced to assume differential positions under control of said cam 65 and the previously positioned notched disks and are restored to normal by said cam. Certain elements must be positioned prior to movement of the actuators and others can be conveniently positioned at such prior time. Such comprise the elements listed under the heading Main shaft in connection with the individual cams.

Manifestly an effective operation requires the setting of a set of observations on suitable keys or their equivalents and the setting of certain notched disks by the action of cam 68 to determine the extent of movement of the actuators. The remaining operations effected by cam 68 are the positioning of elements which will act later and to safeguard the mechanism against incompetent or negligent operators. Many of the movements occuring at this time are for convenience of construction and design only.

After the actuators have assumed their differential positions and before return to normal position is a convenient to effect printing, if such should occur, and to connect the totalizers with their actuators for partaking of their return movement for adding or disconnecting them during totaling.

The remaining time is really the completion of a computation, and transferring is then fully effected and the other movements are merely a "clean-up" for the next operation.

Cam 67

Cam 67 is one of the cams rigid with the main shaft 64, see Fig. 14, and it is utilized to:

Connect the totalizers with their actuators during adding or disconnect them during totaling;

Operate the shaft carrying the cam 109 (see Fig. 14) to partially withdraw the printing hammers from fired position; (see Fig. 4, when said cam is about to act on the printing hammers).

Trip the printing hammers when printing is to be effected; and

Initiate or position elements to feed both the paper and the inking ribbon.

Said cam 67 is of the complemental or frog type and operates a parallelogram of links and levers including lever 108 which is connected by a short link 110 to arm 111.

The upper end of arm 111 is adapted to cooperate with collar 112 on shaft or bar 113 to shift the same rearwardly to connect the totalizers with their actuators during adding or disconnect them during totaling.

Arm 111 is connected to long suitably offset link 114 which controls the partial re-cocking of the printing hammers by moving arm 115 rigid with the shaft carrying cam 109 as is more fully described under the heading Main shaft control of printing mechanism. Said link carries a pin 116 (or pins 116, see Fig. 34) which extends on both sides of the link 114 (see Fig. 14) to rock members 118 and 119 to release the printing hammers as is fully described under the heading Printing mechanism. Said pin 116 may indirectly operate lever 93 to position the elements to feed both the paper and inking ribbon as described under the heading Paper and ribbon feed.

Cam 66

Cam 66 (Fig. 16) is utilized to disconnect the totalizers from their actuators during adding operations. Said cam is rigid with the main shaft and is provided with single nose arranged to cooperate with an anti-friction roller at the lower end of the lever 120, (see Fig. 29). Said cam 66 acts on lever at near the end of the operation of the machine to rock said lever 120 clockwise as viewed in Fig. 16 and hence shift displaced shaft or bar 113 correspondingly after the totalizer actuators have reached home or normal position, by contacting with collar 112 rigid with said shaft or bar 113.

Cam 69

Cam 69 (see Fig. 8) is utilized to restore the elements differentially displaced under control of the fractional argument keys to normal position. Said cam is rigid with the main shaft 64 and cooperates with a lever 121 pivotally mounted on a frame supported stud. The upper end of said lever is in the path of movement of lugs 122 rigid with the bars 123 whose movements are controlled by the fractional argument keys. Before cam 68 can restore the displaced parts to normal, all the argument keys are released; such releasing is effected by cam 70, also fixed to the main shaft 64 (see Fig. 11). After the keys are released, lever 121 positively moves bars 123 to their normal positions.

Cam 70 and key release

Figure 10:
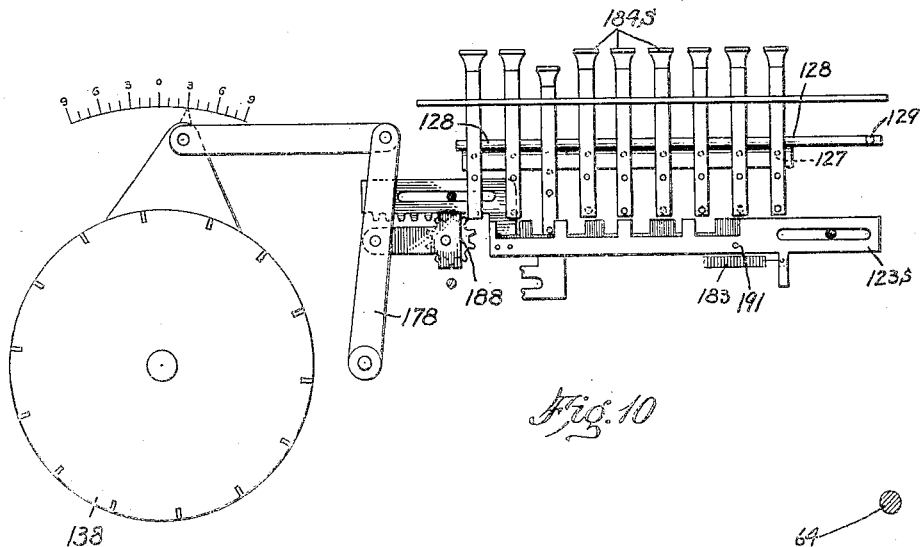
Fig. 10 is a diagrammatic view similar to Fig. 8 with an S key depressed.
Figure 11:
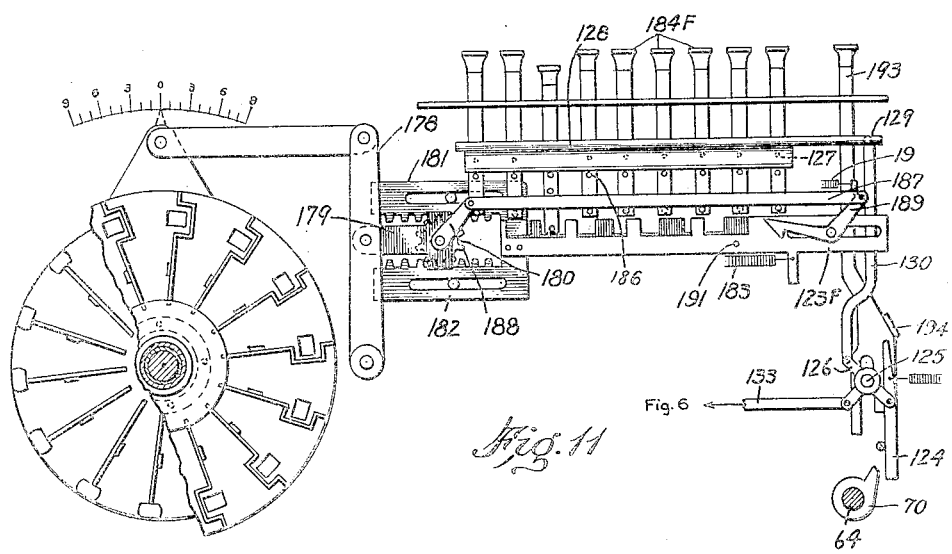
Fig. 11 is a view similar to Fig. 9 with an F key depressed and the machine partly operated.

Cam 70 is utilized generally to release all depressed argument keys. Cam 70, see Figs. 11 and 12, is rigid with the main shaft 64 and its nose or operating projection is adapted to cooperate with a pawl 124 pivoted to an arm rigid with the shaft 125 as shown in Figs. 5, 6 and 11. Rigid with said shaft are a plurality of arms 126, 131 and 132 one for said row of argument keys.

Each argument key is provided with a pin 127, (see Figs. 5, 8, 9, 10 and 11), which when said key is depressed passes below the lower edge of a resiliently urged shutter 128 individual to each row of keys and thus hold the said key in depressed position. Each shutter 128 is suitably rigidly affixed to a shaft or bar at its upper edge, and said shaft or bar is provided with a substantially horizontally extending projection 129 which is connected by a suitably contoured and slotted link 130 to an arm 126 rigid with the jack shaft 125. Hence partial rotation of said jack shaft 125 by said cam 70 causes a corresponding movement of all the connected shutters 128. Said corresponding movement of the said shutters is sufficient to cause the lower edge of the shutters to clear the pins 127 on the depressed keys and thus permit them to rise under the influence of their springs. Also attached to said jack shaft 125 is a pair of arms 131 and 132 from which extend links 133 and 134 respectively (see Fig. 6) to arms rigid with the collars 135 and 136 loosely mounted on the hubs of disks 137 and 138. Bosses rigid with the main frame work are provided with pins passing through short helical slots in said collars, hence rotation of said collars by forward movement of links 133 and 134 causes them to approach each other, and the flanges thereon restores any set stop members 139 or 140. see Fig. 11. Extending through the material of the cup shaped disk 141 are a plurality of pins 142 rigid with the spring pressed washer 143. Said pins 142 are in the path of the flange of collar 136 so that the said washer and collar move transversely as a unit thus providing means for restoring any set stop members 139 on disk 138.

Pawl 124 is pivotally mounted on its supporting arm and is at times swung about its pivot sufficiently to prevent movement thereof by cam 70 as is more fully described under Repeat key.

Shaft 125 may be manually turned, and thus release any depressed keys as is more fully described under the heading Error key.

*Cam 71 and arbitrary quantity keys*

Cam 71 is utilized to release all depressed arbitrary quantity keys and for the separate purpose of automatically unlocking the transsetting bars. Said cam is fast to the main shaft 64 and is provided with a pin 142 (see Fig. 25) which engages a resiliently urged pawl 143 mounted on a plate 144. Said plate is connected by a suitably contoured link 145 to a shaft 146 which is provided with arms 147. When said pin 142 rocks plate 144 at near the end of an operation cycle, the shaft 146 with its arms 147 rock the shutters 148, holding down the depressed arbitrary quantity keys, thus releasing them in a manner similar to that hereinbefore described.

Said cam 71 is provided with a flattened portion 71a, as shown in Fig. 22. A resiliently urged lever 148 lies against said cam and when the main shaft 64 rotates said lever 148 is swung about its frame supported pivot, thus shifting the bar 149 rearwardly toward the left as viewed in Fig. 22, and if said bar 149 is in the position shown in Fig. 22, and the lever 148 rocked, the rocking bell crank 150 is rocked thereby releasing the transsetting bars 151, 152, 153, and 154 to which the variously formed lugs 155 are respectively rigidly attached. If however the rearward end of bar 149 is raised as shown in Fig. 33 the locking lever 150 is undisturbed and therefore the movement of lever 148 and bar 149 is an idle one. The purpose of this mechanism will be fully set forth under the heading Money key. In many of the drawings only one end of a spring is shown it is to be understood that the other end of the spring is suitably anchored as exigencies of the location may determine.

*Argument keys*

The machine described and illustrated herein may be briefly described as a machine for mechanically accumulating amounts functionally related to an argument. Familiar examples are; wages corresponding to time worked; price for a given quantity; interest both simple and compound; meter service computations; weights for a given quantity of material; conversion of units, as feet to meters, pounds to kilograms, gallons to cubic feet, etc. etc.; various payroll systems including hourly rates, piece work, extra pay for overtime, etc. In general any computation which can be tabulated as "single entry". The mechanism for determining the "argument" will now be described. Frequently the argument is a difference such as; the difference between starting and finishing time; the difference between old and new readings; the elapsed time between two dates, etc. For convenience of illustration and description, a form of the machine is adapted to compute wages from elapsed time will be specifically described. The slight modifications, if any, for adapting the machine for other requirements such as above indicated will become apparent as the description proceeds.

Referring to Figs. 1 and 2 there are seen four rows of keys designated respectively by reference characters S and F. The first two rows, designated S, may represent the starting time (old date, old reading, etc.) and the last two rows, designated F, may represent the finishing time (present date, new reading, etc.). The first S and last F key rows may be conveniently considered as representing integral hours and the middle rows or remaining S and F key rows represent fractional hours. There are certain additional keys such as 156 157, which may completely change the normal values of the aforementioned keys as will be described fully hereinafter.

This mechanism is in principle analogous to that disclosed in my Patent No. 1,450,718 and will be described comparatively briefly herein dwelling particularly on the improvements in construction.

*Integral argument key*

All the keys relating to the integral part of the argument are identical in principle and very similar in structure. As shown in Fig. 5, each key is provided with a suitable finger piece suitably attached to a stem 160 guided by the frame, near its upper end and guided at its lower end by having its shank turned so that it can be readily supported by a pin through the keyshank and the prong of the bifurcated lever 161 rigid with the associated shaft 162. All the shafts are suitably supported by bearing plates, see Fig. 7, formed as coarse complemental combs. Near one end, each shaft 162 is provided with a rigid cam 163 which on occasion forces lever 164 towards a disk 137 or 138, as the case may be, against a suitable spring tending to hold it in normal ineffective position. Each lever 164 is provided with an extension which may cooperate with a stop lever 139 extending in a radial direction and pivotally mounted on disk 137. Said stop lever 139 may occupy either of two positions as may be seen by comparing adjacent stop members 139 in Fig. 6; said members are resiliently held in either position by the location of a pin 165 cooperating with formed portions on the springs 166. Obviously when any of said radial stop members 139 are set by the depression of the corresponding key, the end thereof nearest the center of the disk moves away from the said disk as is clearly shown in Fig. 6. Such movement is utilized in restoring said members to normal by transversely shifting the collars 135 and 136, as has been described fully hereinabove. Each key 160 is provided with a pin 127 which passes beneath the shutter 128 when said key is depressed, but the key returning spring caused the key to return almost to normal when the pressure on the key head is relieved, thus giving a visual indication of the key depressed. It may be added that the function of a key is completed when its corresponding stop lever 139 is rocked to a position causing its end to project beyond the face of a disk 137 or 138 to form set stop, so that the partially depressed key is merely a signal.

The above description particularly fits the mechanism connected with the S group of keys, and a portion of the F keys. Referring particularly to Figs. 6, 8, 9, 10 and 11 it is seen that each F key is adapted to displace two stop members instead of a single one as above described. A cup shaped disk 141 is rigidly mounted on a sleeve carried by the shaft 167 to which the disk 138 is rigidly attached. Said disk 138 is provided with suitable lugs for supporting a series of stop members 140 in a manner similar to that hereinabove described. Each stop member 140 is preferably curved so as to permit the nose of the lever 164, see Fig. 9, to pass through openings in the said disk to set the aforesaid stop members 139. Each lever 164 is provided with suitable cheeks 168 and a pin so that a cheek or the pin will engage the bent portion of the stop member 140 carried by the plate 141 and thus each F key sets stop members instead of only one as in the case of the S keys. Reference to Fig. 6 shows that the stop portion of the stop members 139 associated with the S keys are somewhat elongated so that it may be contacted by both stops set by the F keys. The provision of two sets of stops for the F keys permits a positive setting of the associated notched disks as will be more fully set forth hereinafter under the heading Setting notched disks. The stop members 140 are held in ineffective positions in a manner similar to that described in connection with the stop members 139.

The F keys must release a zero stop. Each F key is provided with a pin 169 as shown in Fig. 27 which is adapted to cooperate with the upper bar of a parallelogram linkage comprising bar 170 levers 171 and 172 and spring 173. Said bar 170 is provided with a pin 174' which passes beneath the shutter 128 when an F key is fully depressed and thus holds the parallelogram in a distorted condition until the keys are released either manually or automatically. Arms 171 and 173 move in unison because both are fixed to the same shaft, hence distortion of the said parallelogram raises slotted link 174 and hence pawl 175 to disengage pin 176 on the slidable rack 177; thus permitting shaft 167 to be adjusted differentially by cam 68 (see Fig. 13) under the influence of the depressed keys as is more fully set forth under the heading Setting notched disks.

*Single key mechanism*

As indicated hereinabove certain of the integral argument keys 160 are adapted to set stop members 139 and 140. As will appear hereinafter the shaft 167 and sleeve 220 thereon are positively rotated extents whose sum is a complete rotation. It is therefore necessary that one and only one broad stop member 139 on disk 137 be in set position. Such single setting can be readily effected by means of a locked key board construction for the integral argument keys refer particularly to Fig. 5. It will be seen that each integral argument key 160 is provided with an integrally attached pin 129' which normally lies in a position to permit it to be carried into a V shaped slot in the resiliently urged sliding bar 130' when an integral argument key is depressed. Said bar 130' is provided with slots through which extend suitable frame-supported pins. When an integral argument key 160 is depressed its full extent it does not remain in such position but returns part way, therefore the V shaped slots 131' are shaped so that when an argument key 160 is held depressed by the shutter 128 cooperating with a pin 127, then a pin 129' is in a position to hold the resilient bar 130' in an extreme position thus placing a solid part of said bar 130' in the path of any pins 129' on undepressed keys thereby locking them in normal position.

An error or correction key 116 is provided as more fully described herein below for correcting errors in the argument key-board.

*Fractional argument keys*

Two of the rows of keys desnignated generically as S and F in Fig. 1 have been called fractional argument keys, these keys need not, as heretofore, be operated in a prescribed order. As heretofore, the integral argument keys determine comparatively larger divisions on the disks 137 and 138 and the fractional argument keys determine fractional parts of such larger divisions. The disk 138 is connected by a link to a lever 178, loosely mounted on a frame supported pin. Connected to said lever 178 is a pair of links 179 with a gear wheel 180 between them. Meshing with said gear 180 are a pair of racks 181 and 182. The rack 181 may move amounts commensurate with a digit of the S fractional part of the argument and the rack 182 may move an amount commensurate with the digit of the F fractional part of the argument. Hence the wheel 180 and therefore disk 138 can be caused to move through an angle commensurate with the difference of the fractional part of the quantities set up on the S and F keys.

In order to more readily effect a positive mechanical representation of the difference of the fractional part of the argument, the disk 138 is normally held in a position which is a full unit less than its true position as is indicated in Fig. 8. The disk 138 is positively held in this position by lever 121 cooperating with cam 69 (see cam 69). Said lever cooperates with a projection integral with frame 123 which in turn is integral with racks 181 and 182; therefore when cam 69 releases said lever spring 183 extending between a fixed stud and said frame 123 causes rack 182 and hence disk 138 to rotate an amount commensurate with the allowed movement of frame 123. The S keys 184 are provided with pins near their lower extremities which project in alternate directions to co-operate with alternate lugs on the corresponding frame 123 as is indicated in Fig. 6. Hence said keys determine the extent of movement of said frame 123. Similarly, the F keys 184 are provided with pins which extend in alternate directions to co-operate with corresponding lugs on their frame 123 to determine the extent of movement thereof. Further, the movement of both frames are combined through floating wheel 180 and are thereby transmitted to disk 138 to determine the fractional part of the argument, as indicated in the series of Figures 8, 9, 10 and 11.

Each of the S and F keys are resiliently urged upwardly by suitable springs; each is provided with a pin 127, which when the key is depressed passes below resiliently urged locking shutter 128 to hold said key depressed; and such depression brings a pin 185 into the path of the corresponding lug on the corresponding frame 123 to govern the extent of movement of the said frame. Each of the F keys are provided with an additional pin 186 which overlies the top of a deformable parallelogram composed of link 187 arm 188 bell crank pawl 189 and spring 190. Said pawl 189 normally latches over pin 191 on the frame 123f to prevent movement thereof unless an f key is depressed. Hence said pawl is a zero stop.

The drawings illustrate a fractional argument division of tenths, but manifestly other fractional divisions may be used if desired as is indicated in my copending application Seral No. 115,660, filed June 12th, 1926.

*Repeat key*

Occasionally it is desirable to keep the argument keyboard set up for a plurality of operations. Manifestly if the pawl 124 cooperating with cam 70, (see heading Cam 70), is moved from the path of the nose of said cam, the jack shaft 125 will not be turned and the keyboard set up will be retained. Key 193, (see Fig. 11), is provided for this purpose. Said key is guided at its upper end by the main casing and at its lower end by a fork straddling shaft 125, supported by the main framework. Said key has a flange 194 which may co-operate with the upper end of pawl 124 to rotate said pawl, so that rotation of said shaft 125 which carries said pawl 124 out of the range of action of the said cam 70, thereby preventing rotation of the said jack shaft 125 and preserving the keyboard set up.

*Error key*

Occasionally, it happens that a wrong amount is set up on the keyboard, and in order to clear the keyboard so that the right quantity can be set up, an error key is provided. Manifestly the keyboard will be cleared if the jack shaft 125 (see Figs. 5, 6 and 11) is manually rotated. Such manual rotation is readily effected by the key 196 (see Fig. 5). Said key is guided near its upper end by the upper case of the machine and at its lower end by being connected by a pin to the pivoted lever 197 mounted on a suitable frame supported stud. The other end of said lever is suitably connected to a link such as 130 which is connected to an arm rigid with the said jack shaft 125. Hence, said key 196 serves as a manual means for turning said jack shaft and thereby clearing the keyboard.

Mechanical table

The argument keys are provided for the purpose of initiating a mechanical representation of an independent variable ($x$) suitable mechanism is provided for determining a dependent variable ($y$) or function of the independent variable ($x$). Such means may be visualized as a "mechanical table" whose tabular values are located when the independent variable is mechanically represented by positioned elements. For purpose of illustration assume that a series of functions of the independent variable as herewith tabulated are to be computed.

Table I

| $x$ | $y$ | $\frac{11x}{4}$ $y_1$ | $\frac{100x}{32}$ $y_2$ | $\frac{5}{8}x_3$ $y_3$ | $2\frac{1}{2}$ $y_5$ | $16x_2$ $y_6$ | $J(x)+1$ $y_7$ | $y_8$ |
|---|---|---|---|---|---|---|---|---|
| 0 | 0.00 | 0.00 | 0.00 | 0.00 | 0.00 | 0.00 | 2.00 | 1.00 |
| 1 | 0.25 | 2.75 | 3.12 | 0.62 | 2.50 | 0.05 | 1.77 | 0.75 |
| 2 | 0.50 | 5.50 | 6.25 | 2.50 | 3.54 | 0.20 | 1.22 | 0.60 |
| 3 | 0.75 | 8.25 | 9.38 | 5.62 | 4.33 | 0.45 | 0.74 | 0.65 |
| 4 | 1.00 | 11.00 | 12.50 | 10.00 | 5.00 | 0.79 | 0.60 | 0.60 |
| 5 | 1.25 | 13.75 | 15.62 | 15.62 | 5.59 | 1.23 | 0.82 | 0.00 |
| 6 | 1.50 | 16.50 | 18.75 | 22.50 | 6.12 | 1.77 | 1.15 | 1.25 |
| 7 | 1.75 | 19.25 | 21.88 | 30.62 | 6.61 | 2.10 | 1.30 | 4.00 |
| 8 | 2.00 | 22.00 | 25.00 | 40.00 | 7.07 | 3.14 | 1.17 | 0.23 |
| 9 | 2.25 | 24.75 | 28.12 | 50.62 | 7.50 | 3.97 | 0.40 | 8.00 |
| 10 | 2.50 | 27.50 | 31.25 | 62.50 | 7.91 | 4.10 | 0.75 | 12.00 |
| 11 | 2.75 | 30.25 | 34.38 | 75.62 | 8.29 | 5.93 | 0.83 | 1.77 |
| 12 | 3.00 | 33.00 | 37.50 | 90.00 | 8.66 | 7.06 | 1.05 | 1.83 |
| 13 | 3.25 | 35.75 | 40.62 | 105.62 | 9.01 | 8.29 | 1.21 | 1.02 |
| 14 | 3.50 | 38.50 | 43.75 | 122.50 | 9.35 | 9.62 | 1.17 | 9.43 |
| 15 | 3.75 | 41.25 | 46.88 | 140.62 | 9.68 | 11.04 | 0.99 | 7.19 |
| 16 | 4.00 | 44.00 | 50.00 | 160.00 | 10.00 | 12.57 | 0.81 | 6.07 |

This table could of course be indefinitely extended. For the sake of illustration a small variety of functions of a single variable have been listed. The use of such a table is obvious, yet in order to understand the operation of the described machine its use will be described in detail.

First, find some value of the independent variable $x$ (depress the proper argument keys); second, choose the function or dependent variable column whose value is desired (depress the proper function key such as rate key, interest key, etc.) third, locate the value of the independent variable in the $x$-column (operation of the machine at the time that a certain shaft is differentially positioned to mechanically represent the independent variable set on the argument keys in co-operation of the sets stops 139 and 140; fourth, pass in a straight line across the page to the dependent variable column previously chosen (operation of the machine at the time that certain preselected reading fingers under control of the last mentioned keys have traveled forwardly differentially, see Fig. 4; fifth, write down the chosen value $x$ and the located value of $y$ (operation of the machine at the time the values of $x$ and of $y$ are printed or computed, that is the position of Fig. 4. This description of the use of the above table at once suggests a mechanical construction of a table, thus a set of notched disks may be rigidly mounted on a shaft which may be turned through angular distances corresponding to the value of the independent variable $x$; obviously the set of notched disks will be notched to certain depths at each angular position of the disks corresponding to values of $x$ commensurate with the significant denominational digits of the function represented by the set of notched disks. Different functions will be represented by different sets of notched disks on the said differentially settable shaft. Different functions may be selected by connecting certain sets of reading fingers to the totalizer actuators, or by shifting the sets of notched disks or by both.

For the sake of generality several classes of functions are shown tabulated above including algebraic all except $y_7$ and $y_8$, transcendental ($y_7$), linear ($y_1$, $y_2$ and $y_3$), single valued, ($y_1$, $y_2$, $y_3$, $y_4$ and $y_6$) multi-valued ($y_5$) and discontinuous ($y_8$). In practice a single valued linear algebraic function finds the greatest range of applicability as such includes most of those listed under the heading

Argument keys

Referring to Fig. 4, there is seen a disk with a certain number of equal divisions, (the illustration shows 80, the foregoing description, however does not limit the dimensions to such a number, and any convenient number could be used depending upon the type of problem to which the machine is to be adapted) each of these divisions may be identified with each of the values of $x$ in the preceding table. If desired, certain of the divisions may not find response in the said table for a purpose to be explained hereinafter. The integral argument keys, as has been explained, project certain stops on the said disk so that a differential angular movement of shaft 167 as determined by a pair of co-operating stops will determine a value of the argument or independent variable measured as an angular displacement, and hence a function set of notched disks may have their notches representing a precomputed value brought to a reading line by turning them through an angle corresponding to the independent variable used in computing such a value.

Special values and interpolation

Hereinabove the mode of arranging a set of notched disks having precomputed functional values corresponding to integral values of an independent variable have been described. Fig. 2 illustrates means for tabulating functional values corresponding to fourteen or less integral values of the argument, but such can manifestly be considerably increased as to twenty or more if it should be so desired. Such a comparatively few divisions of the circumference of a disk such as that shown in Fig. 3 under the conditions of some applications of the mechanism may be too small, hence the provision for an increase such as suggested. Hereinabove, means has been described for adjusting the shaft 167 through the agency of disks 137 and 138 fractional amounts of the arc between consecutive stops under control of the fractional S and F argument keys. Such fractional adjustment may be utilized to locate functional values lying between any two of the quantities listed in Table I.

Herewith is reproduced a portion of Table I with representative intermediate values filled in.

Table II

| x | $y_1$ | $y_2$ | $y_3$ | $y_4$ | $y_5$ | $y_6$ | $y_7$ | $y_8$ |
|---|---|---|---|---|---|---|---|---|
| 3.0 | 0.75 | 8.25 | 9.38 | 5.62 | 4.33 | 0.45 | 0.74 | 0.65 |
| 3.2 | 0.80 | 8.80 | 10.00 | 6.40 | 4.47 | 0.51 | 0.68 | 1.00 |
| 3.4 | 0.85 | 9.35 | 10.62 | 7.22 | 4.61 | 0.57 | 0.64 | 3.41 |
| 3.6 | 0.90 | 9.90 | 11.25 | 8.10 | 4.74 | 0.64 | 0.61 | 0.42 |
| 3.8 | 0.95 | 10.45 | 11.88 | 9.02 | 4.87 | 0.71 | 0.60 | 1.40 |
| 4.0 | 1.00 | 11.00 | 12.50 | 10.00 | 5.00 | 0.79 | 0.60 | 0.60 |
| 4.2 | 1.05 | 11.55 | 13.12 | 11.02 | 5.12 | 0.86 | 0.62 | 0.43 |
| 4.4 | 1.10 | 12.10 | 13.75 | 12.10 | 5.24 | 0.95 | 0.66 | 3.47 |
| 4.6 | 1.15 | 12.65 | 14.38 | 13.22 | 5.36 | 1.04 | 0.70 | 6.41 |
| 4.8 | 1.20 | 13.20 | 15.00 | 14.40 | 5.48 | 1.13 | 0.76 | 0.73 |
| 5.0 | 1.25 | 13.75 | 15.62 | 15.62 | 5.59 | 1.23 | 0.82 | 0.00 |

This portion of extended Table I indicates that each interval between the integral values has been subdivided into five equal intervals, such subdivision is really an optional one for the machine constructor, as such interval may be divided at pleasure into any convenient subdivisions as is well known by suitable interpolation formulæ and such subdivision will be dictated by the use to which the machine may be put. Thus if the machine is to be used for pay roll wage computation the subdivision may be quarters corresponding to an "undivisible" time of fifteen minutes; similarly, for other practical uses.

For the sake of illustration let it be assumed that the disk 138 shown in Fig. 8 has twenty equal spaces for stops, and further that Table I with its sixteen integral values of the independent variable were to be utilized for such a machine in the form of suitable notched disks if desired it may be assumed that the said table is completely subdivided as indicated in Table II and is so represented on the sets of notched disks there are nevertheless four integral divisions with the potential subdivisions which could be represented on the functional disks by blank or zero spaces. If desired, since it has been assumed that a further extension of Table I would be useless, an entirely new set of functions may be tabulated on the remaining unoccupied integral divisions. Taking a pay roll machine as an example, a table similar to Tables I and II may contain the wages for full and fractional hours of a working day then the remaining spaces may be utilized as follows:

First extra space located by a special key in the set of keys assigned to the integral argument which may be utilized for calculating wages for a full week's work by setting a stop on disk 151 which may co-operate with a stop set on disk 152 by a suitable Zero key such as 159 as shown in Fig. 2, the depression of any fractional argument key may then be used to determine a subdivision of the said selected integral space for say multiples of a weekly wage. Thus the said special key may be called a "Weekly key" (see members 156 and 157 in Fig. 2) then the fractional argument keys will determine the wages for a plurality of weeks corresponding to a numerical indicia assigned to said key.

Again the second unused integral space may be located by a key similar to the Weekly key 156 for say monthly salaries, (see members 157 in Fig. 2) and the fractional argument keys may then determine multiples of months in a similar manner.

Perhaps some men may be employed for a standard "Short week" then use can be found for a "Short weekly key" 158 in combination with the fractional keys as before.

Again certain computations often require the use of certain constantly recurring constants, such as certain simple functions of the ratio between the circumference and diameter of a circle, the base of the natural system of logarithms, etc. Such may be optionally controlled by key 158 in certain adaptations of the machine described.

The flexibility of the mechanical tables is so great that only a few uses or possible uses can be catalogued here, others will naturally occur to the alert reader of the foregoing description.

Certain functions are of a nature such that their properties facilitate interpolation. A linear function is especially adaptable to interpolation. Suppose it is desired to calculate 9743A where A is any constant whatever, ¼, say, Table I would give $$43a = 10.75$$

Special values under control of keys such as 156, 157, 158 and 159 in combination with the fractional argument keys may cause the machine to record $$700\ A = 175.00$$
$$9000\ A = 2250.00$$

Then we would have, by virtue of the fundamental property of linear functions $$43\ A = 10.75$$
$$700\ A = 175.00$$
$$9000\ A = 2250.00$$
$$\overline{9743\ A = 2435.75}$$

A somewhat more general problem would be to find $9743A + B$ where, for sake of illustration $B$ will be set equal to 7.79 and $A$ equal $\frac{1}{4}$. Then tables similar to Tables I and II would give $$43\ A + B = 18.54$$
$$700\ A\ \ \ \ = 175.00$$
$$9000\ A\ \ \ \ = 2250.00$$
$$\overline{9743\ A + B = 2443.54}$$

Other obvious solutions of the above problem will occur to the alert reader, thus the notched plates can manifestly be arranged to cause the machine to record after a series of plural operations.

$$3\ A + B = 8.54$$
$$40\ A\ \ \ \ = 10.00$$
$$700\ A\ \ \ \ = 175.00$$
$$9000\ A\ \ \ \ = 2250.00$$
$$\overline{9743\ A + B = 2443.54}$$

A practical application of such an example would be an allowance of $7.79 for setting a tool and a wage of $\frac{1}{4}$ for each of 9743 parts.

The examples given fully illustrate one form of interpolation dependent upon the properties of a particular function. In the case of other functions other interpolations formula dependent upon the functional properties can be derived, such may usually be found in treatises on the particular function, such being usually designated as the "addition theorem" for the particular function.

*General problems capable of solution*

In the description of the mechanical table its has been tacitly assumed that, either the independent variable is known ab initio or that it is automatically determined prior to an operation of the actuators. Many problems of frequent occurrence are of the former type, as for example conversion of one set of units of measurement to another, or entities connoting quantity to entities representing mass, weight, etc. as for. example, converting English system units to metric units, converting number of article of given dimensions to units of weight, value, etc. Such problems can be represented by a general formula such as: $y = f(x)$. Further in certain cases the fractional argument keys may vary the value of the independent variable as set upon the integral argument key so that the machine will compute $y = f(x+z)$ where $x$ may be interpreted as representing the integral part of the argument and $z$ an additional or fractional part. Again the above description shows the capability of the machine to find the dependent variable in the case $y = f(nx+z)$ as is described in connection with linear interpolation.

As has been indicated herein, and as is described in my Patent No. 1,450,718, the independent variable may not be known ab initio but must be determined prior to a movement of the actuators, the keys denoted generically as S and F are interconnected to effect such a determination so that the independent variable may be a quantity which is invariant with respect to the origin of measurement, such as a difference. Hence the machine is capable of solving a problem represented by $y = f(x-z)$. When combined with the fractional argument keys this formula takes the more general form $$y = f[(x+z) - (z+u)].$$

Following the same reasoning as above the functional form may be $$y = f[(nx+t) - (mz+u)].$$

Since the machine is provided with totalizers a sum of any set of the functions may be obtained. Hence the mechanism herein described is of very wide application in solving a multitude of otherwise complicated problems.

Another variation is a case where the function computed is of the form $$y = f[(nx \pm t) - (mz \pm u) \pm A].$$

Further an arbitrary quantity or a series of arbitrary quantities may be added to any of the above listed functions, or any of the said functions may be arbitrarily designated by suitable indicia indicative of the origin of the data combined in a calculation.

A practical example of the latter may, for properly chosen values of the constants, represent wages per fractional day where a certain time has been omitted for the lunch hour, or in calculating interest and discounts when allowing for the usual "grace days".

Again the machine is capable of printing and calculating quantities connected with a discontinuous set of independent variables as for example weights or prices per unit quantity associated with stock or catalogue numbers. Thus such identifying numbers may be set up on the argument keys and the function reel will during an operation of the machine position the function disks so as to cause the machine to list the corresponding weights, prices, etc.

It is not intended to limit the practical application of the machine to merely the few examples cited in this specification as the machine can be used for any computation falling within any of the above listed general formulae.

Function reel

As indicated in Table I under the heading Mechanical table a large variety of values of independent functions, either continuous or discontinuous may be mechanically represented by notched disks in the machine. Ordinarily each of the series of values for the various functions can be represented by a few notched disks such as three or four; even if the functions had large values five or six disks would for all practical purposes suffice; the aggregation of disks representing a particular function is herein called a function set. If the function sets are quite large such as for example forty to one hundred a random arrangement of such function sets might be quite bulky. Applicant has found a convenient and practical mode of storing such a group of function sets and yet have any function set readily available for reading. By way of example a convenient number of sets (say ten) may be mounted on shaft, and a plurality of such shafts may be mounted on a reel as is indicated somewhat diagrammatically in Fig. 2. The reel 200 is fast on a shaft 201 which is connected by a series of gears 202 to a manually controlled shaft 203 to which is affixed an indicia bearing drum 204 having suitable indicia representative of the location of the various function sets carried by the reel 200. Hence manual rotation of shaft 203 will bring a group of the ten (say) function sets into a position to be differentially rotated by the shaft 167.

Each shaft carrying a function set is feathered at one end for co-operation with a slot in the end of shaft 167 as indicated in Fig. 2. Suitable means such as a groove or track may be affixed to frame 54 to prevent accidental rotational movement of the group of function sets when out of control of the shaft 167 as is indicated in fragmentary section by reference character 205.

The construction and arrangement is such that the reel 200 is readily removed from the machine so that a different reel may be inserted therein to provide for an additional set of functions; or as an alternative a shaft supporting a series of function sets may be substituted for any one or more of those occurring on the reel.

Reading function disks

The arrangement of the function sets of notched disks was described under the heading Function reel, after the reel has been positioned it is necessary to read the precomputed value of the function for insertion into at least one totalizer and for optional listing or printing. After the shaft 203 and the selected function sets have been differentially set under control of the argument keys through shaft 167 the machine then automatically reads the precomputed functional value, such reading is effected by a series of denominationally arranged rectilinearly guided reading fingers 206 as shown in Figs. 22 and 28. Said fingers 206 are guided by the frame supported guides 207 and their forward ends are connected to the pin carrying element 208 which may be optionally connected to the totalizer actuators through the transsetting bars 151, 152, 153 and 154, as is indicated in Fig. 22. Hence said fingers 206 are resiliently forced to the bottoms of the notches of the functional set by the springs surrounding rods 106, (see Figs. 3 and 4) acting on the actuators under control of the general operator 105, and since they are connected to the actuators, the said actuators may therefore be said to read the functional values through the transsetting mechanism and reading fingers 206. Normally the said reading fingers 206 are disconnected from the actuators, and are held in the position shown in Fig. 22 by means of a frame supported plate 208 co-operating with lugs 210 and a similarly supported plate 209 co-operating with their extreme forward ends, thus guarding against accidental displacement when not connected to the actuators.

Function selecting keys

Under the heading Function reel, it was intimated that any particular function could be selected for reading under the combined control of the manual reel adjusting shaft 203 and certain function selecting keys. The function selecting keys 211 (see Figs. 2 and 28) correspond in number to the number of function sets on a positioned shaft. Each function selecting key is guided so as to have substantially rectilinear movement by being guided near one end by the top cover of the machine and near the lower end by frame supported bracket and locking member 208. Said keys 211 are normally urged upwardly by a suitably located spring, and each is provided with a suitably located attached lug 212 which, when the key is depressed, may under certain circumstances rock the resiliently urged shutter 213 which then snaps over the top of said lug locking the key in depressed position. The arrangement is such as is commonly known as flexible, hence the depression of any key results in releasing any other depressed key, as is exemplified in the well known patent to Selling.

Each key 211 is provided with an opening at its lower end through which passes the denominational set of members 208 connected with the reading fingers 206 as is indicated in Figs. 22 and 28 each of said members 208 consists of a pair of side plates which are held in spaced relation by suitably located spacers as that said side plates always straddle the tips of the arms 214 on the transsetting bars 151, 152, 153 and 154. This construction insures a proper alignment so that the depression of a key 211 will insure an engagement of pin 215 between said plates with the bifurcated upper end of the corresponding arms 214 as is clearly illustrated in Fig. 28.

Independent variable notched disks

It is frequently desirable to list and sum the independent variable along with the functions thereof. In order to effect such listing, and summing the shaft 167 (see Figs. 2, 3, 4 and 28) may carry a set of notched disks 205 to be read by fingers 216 connected with the actuators 107. As has been noted the said shaft 167 is moved through an angle commensurate with the setting determined by the S and F keys hence the notches in said disks 205 represent the independent variable.

In some instances it is desirable, as will be explained hereinafter, to have a plurality of sets of disks 205 which are identical or which may differ somewhat for certain problems. In such an event there would be provided a plurality of sets of actuators for reading the independent variable notched disks 205.

If the machine is used for piece work wage computations one set of disks 205 may be utilized for governing the summing and listing of differing classes of manufactured articles, such as for example sub-assemblies of a more complex machine. Again for wage computations it may be sometimes convenient to accumulate the total time actually spent on productive labor for those individuals who have time out for lunch, whereas other employees will work through the noon hour as for example gate keepers, watchmen, firemen, etc. etc. In such an event the readings of one set of disks will differ from the corresponding readings of another by the length of the noon hour.

In the event that the device is used for a quantity and value register multiple sets of disks 205 may be used to segregate unrelated quantities as for example differing grades and kinds of goods such as boots, shoes, findings, etc. etc.

Means are provided, as is fully described under the heading Trapping keys for disabling, or enabling, the actuators corresponding to any set of independent variable disks.

In some cases the independent variable disks may be notched to govern the printing of numbers such as stock or catalogue numbers, whose sum would be meaningless, in the case of certain discontinuous functions as has been explained hereinabove.

Setting notched disks

The sets of notched disks as mentioned hereinabove comprise a series of mechanical representations of the precomputed numerical values of dependent variables in terms of an independently selected number. Shaft 167 can assume a series of consecutive angular positions a certain number of which correspond to a series of consecutive values of the independently selected number, such as for example those values of $x$ corresponding to integral values under heading Mechanical table, (see Table I) and the remaining positions corresponding to the values of $x$ indicated in the table under the heading Special values and interpolation (see Table II). Said shaft is under control of the argument keys for the purpose of determining the extent of the rotation and hence a mechanical representation of the independently selected number $x$. Associated with said shaft are the sets of notched disks 205 certain of which are shown in Figs. 2, 3, 4 and 22 so that when the shaft is positioned under control of the argument keys the notched disks moving therewith are correspondingly positioned. Fixed to said shaft 167 is a gear wheel 217 meshing with rack 177 arranged to slide on suitable supporting studs (see Figs. 13 and 27). A similar rack 218 similarly supported meshes with a gear 219 rigid with sleeve 220 which has been hereinabove stated to be fixed to cup shaped member 141. If pawl 175 is raised as hereinabove described and racks 177 and 218 are moved amounts commensurate with a full rotation of the gears 217 and 219 a positioned stop member 139 (see Fig. 5) will be pinched between positioned stop members 139 and 140, thus effecting a differential positioning of shaft 167 and a corresponding complemental movement of sleeve 220. Under the heading Cam 68 it was described that member 78 travels forwardly due to the action of said cam 68 during the operation of the machine, and that the normal position of the elements is that illustrated in Fig. 13. When cam 68 begins to move arm 78 effects a translatory movement of gear 81 and such translation is transferred to rocks 177 and 218 which thus tends to rotate said shaft 167 and does rotate it until stopped by cooperating positioned stop members on the disks 137 and 138 shown in Fig. 6. Thus differentially positioning said shaft 167 with a corresponding complemental movement of sleeve 220.

Actuators

For the purpose of driving the totalizer wheels a series of elements known as actuators are provided. The actuators may have either of two forms, both of which are quite similar in function and operation. However only one form is shown herein. An alternative form is shown and fully described in copending application Serial No. 115,660, filed June 12th, 1926. The actuators are best shown in Figs. 3, 4 and 28, the forms shown in Figs. 23 and 28 are slightly modified. The former shows an optional form of idler wheel lock and the latter includes a series of suitably formed and contoured members 107 loosely pivoted on a supporting shaft 230. Each member 107 is provided with a suitably guided reading finger 216 attached by suitable connecting links at some convenient location thereon as illustrated. Said reading fingers are adapted to enter notches of precomputed depth in a series of notched disks denoted generally by character 205. Said reading fingers are preferably a short distance away from the outermost periphery of the notched disks when the actuators are in normal or home position. Certain of the actuators are connected by transsetting bars 151, 152, 153 and 154 so that other notched disks may be read by other reading fingers. Each member 107 is provided with an upstanding portion carrying a link pivoted to a slidably guided rack of special construction meshing with a plurality of series of intermediate idlers such as 222, 223 and 224. In normal position which is that illustrated in Fig. 3 it is seen that said idlers are locked against turning by certain mutilated teeth. Said mutilated teeth are a special form of a Geneva lock which is provided to permit the racks connected to members 107 to travel a distance commensurate with the distance between normal position of the reading fingers and the highest reading position on the notched disks. Therefore said Geneva lock prevents such extraneous motion being carried to the totalizers through the said intermediate gears and thus guard against turning the totalizer wheels through a distance which is meaningless when interpreted as a calculation. Each member 107 may be provided with substantially horizontal projections 225 and 226, the one 225 being an arm to connect with the type carriers (see Figs. 3 and 4) and the other 226 to suitable springs to normally resiliently urge the reading fingers 216 into reading position. The elements 107 combined with the plurality of idlers 222, 223 and 224 and the transsetting bars in the case of members 107 being so provided are called actuators.

A second form of actuators is shown in Fig. 28. This form of actuator is similar in all substantial respects except that they may be optionally connected in sets to the transsetting bars as is more fully described under the heading Transsetting bars. The second form of actuators is more readily adaptable to operate controlled selective driving of a large group of sets of totalizers in view of the operator controlled connections to the transsetting bars.

In the form of actuator shown in Fig. 28 are members 107 are each provided with an extension 225 for governing the printing type. Each member 107 is suitably and loosely mounted on the supporting shaft 230 and each is provided with a pin connector 227, which is similar in all respects; as to normal locking and connecting to the transsetting bars; to the hereinabove described members 208. Said connectors can be optionally connected to the arms 228 rigid with the transsetting bars. The connectors 227 are under control of certain totalizer group selecting keys 229.

A plurality of actuators constitute a set which may actuate one or more totalizers connectable therewith, so that a set of actuators will be common to a group of totalizers. Manifestly, a plurality of sets of actuators may be employed to actuate a set of groups of totalizers. Different arrangements of totalizers in sets and in groups will be further described hereinafter.

The above description taken in connection with the showing in Fig. 2 makes it clear that any desired plurality of sets of actuators can be utilized to read the independent variable from the notched disks mounted on shaft 167, for purposes which will be described in detail hereinafter.

Transsetting of readings

The function reel is towards one side of the machine whereas the totalizer actuators are near the center of the machines as is illustrated in Fig. 2. The readings from a function set must be transset to the actuators so as to effect computations, and printing if the latter should be desired. Referring to Figs. 2 and 28, the set of actuators nearest the frame 53 is ordinarily used to effect accumulations of the readings of the function values. Connectable to certain of said actuators, viz, the units, the tens, the hundreds and the thousands are a series of independently movable transsetting bars 151, 152, 153 and 154 shown partly in Figs. 2, 3, 4 and 28. Each of said bars are provided with suitably located arms of such size and shape as to avoid interference with each other in all possible positions and yet form generously dimensioned parts for supporting said bars 151, 152, 153 and 154 loosely on shaft 230. Each of said transsetting bars are provided with a plurality of suitably contoured forked arms 214, and 228 as best seen in Fig. 28. Said arms 224 and 228 are attached in any suitable manner to the corresponding transsetting bar so that their bifurcated ends when in normal position lie in a position to receive a pin 215 or a pin for a member 227 respectively connected to the corresponding denominational order function reading finger 216 of actuating member 107 under control of a function selecting key 211. Each transsetting bar is provided with as many forked arms as there are function selecting keys 211 as shown in Fig. 2 and with as many fork arms 228 as there are sets of connectable actuators. Hence when a function selecting key is depressed the function reading fingers 216 are connected to the corresponding denominational transsetting bars 151, 152, 153 and 154 which in turn may be optionally joined to corresponding totalizer actuators so that the actuators may assume differential positions during an operation of the machine commensurate with the precomputed value of the selected function. Also attached to each transsetting bar is special bell crank lever 226' having a spring extending to a fixed support to resiliently urge said bars in a direction to read the notched disks. The upper end of said bell crank lever 226' is joined by a headed rod 106 surrounded by a compression spring to the general operator 105 so that movement of said general operator 105 permits the said spring to act and forces the compression spring to aid in turning the transsetting bars to rotate to disk reading position. Said transsetting bars are also provided with certain unnotched arms 155 which may be prevented from moving if member 150 is in and remains in the position shown in Fig. 22, thus preventing any movement of the said transsetting bars. Again another set of notched arms 231 are provided which may be connected by latches 232 (see Figs. 25, 26, 28 and 33) to the bell cranks 233, which in turn are connected to the differential mechanism of the Arbitrary quantity keyboard.

In resumé the transsetting bars:—
1. are normally urged to travel to reading position; 2. may be restrained from movement by member 150; (Fig. 22) 3. may be connected to any set of reading fingers 206; 4. may be connected to the arbitrary quantity keyboard; 5. may be connected to one or more sets of special actuators; 6. may have any one or more of the above mentioned connections which are not mutually incompatible.

If additional capacity for reading a larger number of functions disks of a set is desired other transsetting bars can be utilized in the lower part of the actuators, as may be readily seen by an inspection of Figs. 2, 4 and 28.

It has been pointed out that there may be plural sets of actuators as is shown in Fig. 2 for operating different totalizers which may be mounted in a common frame as will be more fully described hereinafter. The different sets of actuators will be associated with different sets of notched disks carried by the shaft 167 as has been pointed out under the heading Independent variable notched disks. Sometimes it is desirable to permit only one set of actuators to operate a group of totalizers, in such case the remaining sets of actuators are disabled irrespective of their potential ability to read the values on the settable mechanical tables contained within the machine, such disabling of certain sets of actuators is herein called trapping. A series of trapping keys 235, four of which are diagrammatically illustrated in Figs. 1 and 2, are provided to trap corresponding sets of actuators. The mechanism associated with the trapping keys is substantially identical for all of them hence description of one will suffice for the remainder. Referring to Figs. 1, 2, 3, 4 and 28 it is seen that each trapping key is suitably guided near one end by the top cover of the machine and at the other end by an arm rigid with trap 234 which is loosely pivoted on a suitably located frame supported shaft. Each trap 234' is in the form of an elongated latch which when the corresponding key is in raised position, latches over the ends 226 of a set of actuators. Hence when a trapping key is up the corresponding set of actuators is disabled and therefore the totalizers cooperating with said actuators will not be actuated during an operation of the machine.

As has been hereinabove described keys 229 are normally urged upwardly and when in normal position a locking plate substantially identical to plates 208 and 209 (see Fig. 22) holds the pin carriers 227 locked in normal position thus effectively trapping the form of actuators shown in Fig. 28. Each key 229 may, if desired, be provided with a notch to lock it in depressed position.

*Arbitrary quantity keyboard*

Sometimes it is desirable to add quantities which are not functions of an argument yet are quantities which should occur in a total. An example of such a case occurs in pay roll work where a workman should have reimbursements for moneys expended in pursuance of his work. Referring to Figs. 25, 26 and 28 it is seen that each key 234 of the arbitrary quantity keyboard is guided near its extremities by suitable plates to insure a substantially rectilinear movement. Each key 234 is resiliently urged upwardly by a suitable spring and its upward movement is limited by a suitable pin 235 near its lower end. Each key is provided with a suitably located pin 237 (see end key in Fig. 26) which, when the key is fully depressed passes below the lower edge of a resiliently urged locking shutter 148 so that a depressed key will remain depressed until said shutter is moved sufficiently to release said pin as has been described under the heading Cam 71. Each key 234 is provided with a notch 238 into which extends a pin rigid with a shaft 239 which normally tends to hold its pins upward under the influence of a suitable spring 240 extending between a pin on said shaft 239 and a pin on the shaft supporting the shutter 148. Supported by the arms 241 and 242 is a frame 243 provided with alternate upwardly extending abutments which may contact with the alternately directed pins 235 integral with the keys to determine differential extents of movement of the said frame 243. The arm 241 is connected by an offset link 244 to an irregular bell crank shaped member 233 (see Figs. 25 and 26). Said member 233 is connected by a rod 106 surrounded by a compression spring to the general operator as shown in Fig. 23 and which is more particularly described under the heading Actuators.

The shaft 239 is provided with a pin 245 which when the machine is at normal is in the path of a lug 246 rigid with arm 242 supporting one end of frame 243, hence preventing movement of said frame until a key 234 has been depressed. Said shaft 239 is also provided with a pin 247 lying in the path of a pin rigid with shaft 248 so that when said shaft 248 is turned by suitable means such as a total key the zero stop pin 245 is disabled as is more fully set forth under the heading Total keys release zero stops.

Totalizers

The essential computing units of machines of this class are commonly called accumulators or totalizers. The machine herein described is constructed to accommodate a plurality of sets of totalizers, one set of totalizers are adapted to move as a unit during certain operations. A totalizer includes of a series of toothed wheels arranged in consecutive denominational order, and a wheel of any particular denominational order has a number of teeth which is an integral multiple of the radix of its denomination. Thus if the totalizer is adapted to compute in the familiar decimal system each wheel has ten teeth or an integral multiple thereof; if the totalizers are adapted to compute in say, the British monetary system, certain wheels will have an integral multiple of twelve, and certain others an integral multiple of two; similarly for other systems, such as time comprising hours, minutes, etc. At this point a catalogue of the elements, substantially regardless of function will be given; the function of most these elements will appear under transfer mechanism.

Each totalizer wheel element consists of a disk (see Figs. 19, 20, 21, 29 and 33) to one side of which is attached at least one pin 249 and to the other side a gear wheel 250 so that the pin, the disk and wheel move as a unit. The main elements are carried in suitable spaced relations relative to each other by suitable hubs or collars on the supporting shaft which in turn is supported by two main side frames 251 and 252. Arranged between said frames are a series of intermediate frames 253 one for each denominational order for guiding and locating a series of elements for each of said denominational orders. Each of said intermediate frames is provided with suitable openings through which a series of shafts or rods may be passed; thus a rod supports the spring urged aligning pawls 254 for each denominational order; a rod supports the tripping bell crank levers 255, for each order; a shaft carries a series of resiliently urged plates 256 having a limited extent of movement, which movement is limited by the length of a slot 257 in the companion intermediate frame through which extends a pin rigid with said plate; a shaft carries a series of resiliently urged latches 257 adapted to cooperate with pins 258 on the aforesaid plates 256, said rod also supports a series of levers 259 each provided a pin 260 for cooperating with a portion of the said latches 257 and also a resiliently urged transferring pawl 261 whose forward end is guided by a pair of flat prongs integral with said plates 256. Certain of the upper ends of the said levers 259 are bifurcated to straddle a companion pin rigid on the associated cam controlled rail 262. A bar 263 is provided to limit upward movement of pawls 261 when in a forward position. A series of locking members 264 are supported by a suitable frame carried rod.

Transfer cams

The transfer or tens carrying mechanism is of a type which is well described by the term positively actuated. Such a transfer mechanism must, unless unduly complicated, be arranged to effect a transfer in the lowest order first, then in the adjacent higher order, etc. progressively through the consecutive denominational orders in each totalizer. A representative cam has three levels; the first or intermediate level corresponds to a setting of the elements adjacent the totalizer wheels in either their tripped or their cocked position dependent upon the amount the said wheels have been turned, the highest position corresponds to a positive drawing forward of the universal transfer rail to cause the transferring pawl, if tripped, to advance a wheel one tooth space, and the lowest position corresponds to the final restoration of the elements adjacent the totalizer wheels to cocked position, but not to a position where a revolving totalizer wheel can set the mechanism for a potential transfer. The transfer cams are of the type known as complemental or frog cams 264 and each is arranged to act upon a pair of arms 265 and 266 (see Figs. 19, 20 and 21) loosely pivoted upon shafts suitably supported by the main frame work of the machine. The said levers 265 and 266 are jointed near their upper ends by a link 267 loosely supported on studs rigid with the said levers. The centers of the said studs and the centers of the lever supporting shafts are always at the vertices of a parallelogram thus generating a rocking motion for the movable sides of the parallelogram which can be more readily freed from undesirable accelerations due to necessary quick action and the consequent slow action on returning. Further this type of motion transmission is more nearly free from undesirable back lash or lost motion after the parts have been slightly worn after long usage. There are several instances of similar motion transmitting mechanisms in this machine so that this description will serve for all. One of the levers 265 has an extension to which is attached a universal rail 262 for actuating a series of denominational order of transfer mechanism for a group of totalizers to which the said transfer mechanism is connected by pins cooperating with arms 259.

All the transfer cams are rigidly mounted on a shaft 268 which is driven by a gear wheel 269′ rigidly attached thereto. Meshing with said gear wheel is a second or idler gear 269 rigid with a short frame-supported-jack shaft. A second gear 270 (see Figs. 2, 13, 16 and 18) is also rigid with said jack shaft and meshes with the oscillatory segment 98. At near the beginning of the operation of the machine the said sector travels rearwardly thus turning the transfer cams relatively backward. Such backward turning is an idle movement and has no effect on the transfer mechanism except to operate it idly for all transfer elements have been restored to normal cocked position previously. At near the end of the operation of the machine the said sector travels forwardly. During such forward travel of sector 98 the transfer cams first effect any necessary carrying and then recocks the elements as is fully described under the heading Transfer mechanism.

Transfer mechanism

In machines of this class it is necessary to provide means for advancing a totalizer wheel one step or two when a totalizer wheel of adjacent lower order completes an angular distance of movement corresponding to its radix. The transferring operation may be conveniently described as consisting of four steps or phases viz:—tripping or conditioning elements to effect a transfer; effecting the movement of the wheel to receive the transfer; recocking or reconditioning the elements to prepare for subsequent tripping; and normalizing or completely resetting the elements of a subsequent tripping.

Each totalizer wheel 250 (see Figs. 3, 4, 19, 20 and 21) is provided with a single tooth or pin 249 commonly called the transferring tooth or pin. During an adding operation member 250 may travel an angular distance corresponding to the denominational radix of its associated wheel from its normal or zero position, and in so doing it will interfere with an arm of the bell crank lever 255 and in so doing the said bell crank lever will be slightly rotated on its shaft and the horizontal arm thereof will depress the pin on plate 256 which passes through slot 257 associated with the adjacent higher denominational order as shown in Fig. 19. Such movement of plate 256 moves pin 258 against the tension of spring 271 towards wheel 250 whence latch 257 locks plate 256 in the position shown in Fig. 19 under the action of said spring 271. As soon as pin 249 passes beyond arm 255 the plate 256 is revolved by spring 271 slightly to take up the predesigned clearance and the described elements assume the positon shown in Fig. 20. The described rotation of plates 256, due to the shape of its upper edge, permits the pawl 261 to fall or drop (compare Fig. 4 with Fig. 19) because of its weight and in addition thereto the resiliency of a suitably positioned spring anchored to said pawl 261 and to the lever 259 and coiled about the pivot between the said pawl and lever. The transfer elements are now tripped and the next higher denominational totalizer element will receive an added increment of movement at a predetermined time, as a consequence of the lower denominational wheel completing an angular movement commensurate with its radix.

At near the end of the computing cycle the cam shaft 268 with its rigidly attached complemental frog cams 264 will oscillate the parallel links 265 and 266 about their pivots through the antifriction rollers attached to said links. The said cams are traveling in the direction indicated by the arrows in Figs. 19, 20 and 21 during this period thus causing the rail 262 to first move in the direction towards said cams as is indicated most clearly in Fig. 20. Such movement of the rail 262 and attached pins moves the bifurcated lever 259 in the same direction carrying the attached transferring pawl 261 along correspondingly. The shape of the cams 264 is such that the said pawl 261 is moved a sufficient distance to cause the said pawl to engage an interdental space of the totalizer wheel of adjacent higher order from the tripping wheel and move said higher order wheel a distance of one tooth space against the aligning action of the associated resiliently urged aligning pawl 243 as is indicated in Fig. 20. The bar 263 is so located as to prevent over-rotation of the moving wheel and is yet in a positon not to interfere with the withdrawal of the pawl 261 from the moved wheel after transferring has been effected. The rises on the cams 264 which cause the described movement are progressively delayed so that the lowest or tens order totalizer wheel will receive a transfer, if one should properly occur; and when said wheel has reached about the position shown in Fig. 20 the next higher order wheel, the hundreds, will then be in readiness to receive its transfer, and so on to the highest order. Transferring has now been effected, the parts are ready to be recocked or repositioned for a subsequent tripping.

At near the extreme end of the computing cycle the above-mentioned cams 264 assume the position shown in Fig. 21 that is, the rail 262 is shifted away from the said cams in an amount corresponding to the extreme difference in level between the highest and lowest parts of the periphery of said cams, as indicated by a comparison of Figs. 19 and 21. Such movement is of an extent to always insure a sufficient elevation of the forward end of latch 257 to permit pin 258 to travel under the influence of spring 271 from tripped to normal position as determined by the steps at the forward end of latch 257, the movement of said latch is effected by an interference between pin 260 rigid with lever 259 and the upstanding arm of the said latch 257. The pawl 261, the plate 256, and bell crank trip lever 255 are now latched in their normal or locked positions, but a turning totalizer wheel could not cause plate 256 to be latched in tripped position because spring 271 cannot move latch 257 due to the interference between pin 260 and arm of latch 257.

Further movement of the cams 264 causes arms 265 and 266 to move the rail 262 towards said cams to the position shown in Fig. 19 thus freeing latch 257 for a necessary downward movement under influence of spring 271 when tripping subsequently occurs. By means of the mechanism described applicant provides an essentially positive and an extremely reliable and simple mechanism for performing a necessary and difficult operation required for successfully effecting computing.

*Overthrow preventors*

The transferring pawls 261 are given a very quick transferring movement during the operation of the machine. In order to guard against any possibility of overthrow during such transferring, a series of levers 264 are loosely pivoted upon a frame supported shaft are resiliently urged anticlockwise as viewed in Figs. 19, 20 and 21. A pin at the lower end of said lever 264 engages the upper end of the aligning pawl 254 and thus supplement the holding power of the aligning pawl spring. At about the completion of a transferring of a unit a pin 272 integral with the rail 262 engages the said lever 264 and positively locks the aligning pawl 254 in engagement with a totalizer wheel thus effectually blocking any tendency to overthrow. At normal position as shown in Fig. 19 the pin 272 is not in engagement with lever 264 so that the pawl 261 can effect a transfer prior to the locked condition shown in Fig. 20.

*Totalizer aligning pawls*

When the totalizer wheels are out of control of the actuators it is necessary to securely hold them in their adjusted position, and when the actuator control is reestablished, it is necessary or desirable to remove the said holding means.

Figs. 3, 20 and 21 illustrate the wheels of one set of totalizers out of mesh or control of their actuators. All said figures illustrate resiliently urged pawls 254 mounted on a suitably located shaft or rod; said pawls cooperate with an interdental space of the totalizer wheels thus securely holding them against accidental or inadvertent movement. When the wheels are under control of the actuators as shown in Figs. 4 and 19 the said pawls are shown withdrawn from cooperation with said wheels.

The method of establishing and disestablishing control of the totalizers with their actuators is to rock the frame carrying a set of totalizers about the rod 272 as a pivot thus meshing and unmeshing the totalizer wheels with the intermediate gears 222 of the actuators. The mechanism for moving the totalizer frame is fully described under the heading Rocking totalizer frame herein. The side plates of the totalizer frame have bearings for an eccentrically mounted rectangular shaft 273 to which is fixed a pair of bifurcated arms 274 each of which straddle a fixed pin 275 (see Fig. 29) on the main framework frame 53. Movement of the totalizer frame therefore causes a relative turning movement of the rectangular shaft 273, hence if the tails of the pawls 254 are suitably proportioned and contoured the said pawls will be withdrawn from the wheels on downward movement of the totalizer frame and reengaged on upward movement of the same. The said tails of the pawls 254 are preferably formed so that disengagement does not occur until the totalizer wheels have been lowered an extent such as to be fully under control of the said intermediate wheels of the actuators. Thus the totalizer wheels are never free to be subject to accidental uncontrolled movements.

*Totalizer arrangement*

The machine herein described is provided with a plurality of groups of sets of totalizers. Each totalizer frame carries a set of totalizers and there are a plurality of totalizer frames. One set, the rearmost set shown in Figs. 3 and 4, may be conveniently designated as the grand total set, the intermediate set may be designated as the itemizing set, and the forward groups may be designated as the special sets. It is to be understood that the designations assigned to the sets of totalizers are arbitrary and that any set may have any of the assigned designations.

Manifestly, the machine may be provided with only a single set of totalizers, two sets of totalizers, three sets of totalizers or more if desired. Further, each set may consist of a single totalizer, two totalizers, three totalizers or more if desired (see heading Some typical accounting problems).

Assuming the machine to be equipped for calculating a simple payroll which should show the total hours credited to each employee and the renumeration to be received by each with the added results of total hours and total renumeration. In this case the machine would be provided with two groups of sets of two totalizers or four all together. The itemizing set would be used to compute the total hours and renumeration credited to each man from the data on his time cards and the grand set would compute the grand total of both time and renumeration.

Again assume the machine to be equipped for calculating raw stock orders in a production department. In this case the production department would find it necessary to order two classes of raw stock, the one in "shapes" such as bar iron, steel, brass, etc. and the other certain completely assembled subcomponents such as for example—in factory for manufacturing machines of the class described herein; ribbon mechanisms, cam assemblies, or other such subcomponents as may be supplied by the trade. The production department makes its orders to show price of the different sizes of raw stock and also the weight thereof. Such an order or rather series of orders would be computed from the production requirements of customers orders. In this case the order to each jobber supplying raw stock must show totals of weight and price of raw stock and weights and price of completed subcomponents. The raw stock totals would be computed in the itemizing set of totalizers; the special totalizers would compute the similar quantities for the subcomponents; and the grand set would compute the grand total for the entire group.

Manifestly, a legion of other adaptations between the two examples assumed including those indicated hereinabove can be readily solved by a choice in the number of totalizers in each set and the number of groups of sets of totalizers.

In each case certain totals are necessary or desirable, thus the machine should be capable of furnishing totals from the special set of totalizers, from the itemizing set of totalizers, and from the grand set of totalizers.

*Provisions for increasing the number of totalizers*

Hereinabove the device of this application has been described as comprising an indefinite number of sets of totalizers, and an indefinite number of groups of totalizers. Such indefiniteness has been premeditated inasmuch as the mechanism is capable of containing as many sets and groups of totalizers as may be useful in practical applications. Certain of the drawings have been made as from a machine containing only two groups of totalizers whereas others have been drawn as from a machine having three groups of totalizers. The drawings having a single line X—X are of the former class and those having two X—X lines are of the latter class. In case a machine is desired with a greater number of groups of totalizers the elements cut by such lines are to be understood as lengthened at about such a cut or as lengthened substantially the extent between such cuts. It is of course understood that the main frames are to be included in such cuttings, as indicated in Fig. 2. Similarly the number of totalizers in a set can be increased by adding the necessary mechanism between the lines Y—Y in Fig. 2. A perusal of the drawings will show that a relatively small number of parts need be altered in passing from one size of machine to another. Further the mechanism included between a pair of X—X lines is substantially independent of the mechanism of a smaller sized machine, as can be seen by a perusal of the figures containing mechanism between such lines. Hence applicant has shown and described means for easily changing from one size of machine to another without effecting a complete redesign of substantially the entire mechanism as is so frequently necessary in machines of this class.

*Rocking totalizer frame.*

For effecting computations the totalizer wheels must be connected at certain periods with the actuators as has been pointed out herein. In order to effect such connection the frame carrying the totalizer wheels must be raised and lowered. Further it is desirable that such lowering be positively determined in extent and also that the extreme positions be accurately determined. The mechanism for effecting such movement is shown diagrammatically in Fig. 29. Said figure may be considered generic for the different sets of totalizers of the various groups of sets which occur in the machine. Certain of the elements in said Fig. 29 have been distorted somewhat in size for the purpose of more clearly exhibiting the operations of the parts. The totalizer wheels 250 mounted on their supporting shaft are carried by the pivoted side frames 251 and 252 rocking about trunnions near the extreme ends of shaft 272. Said side frames support a rod or bar 276 somewhat longer than the distance between the said side frames, and its extreme ends pass through cam slots in the pivoted members 277. Said cam slots are of such form and shape as to provide dwells at their ends and a sloping intermediate section. When members 277 are in the position shown in the said Figure 29 the wheels are disconnected from their actuating elements as a consequence of the fact that the rod 276 is supported by the pair of the dwells of the said cam slots furthest from the pivots of the said members 277 and when the said members 277 are shifted so as to cause the rod 276 and therewith the totalizer unit frames 251, 252, to be supported by the other pair of dwells which are further from the pivots of members the totalizer wheels are in cooperation with their respective actuating elements. Members 277 are constrained to move in unison by means of the pair of links 278 connected to cranks 279 rigid with a jack shaft suitably supported in a convenient manner by the rigid framework of the machine. One of the camming members 277 is rigid with a short shaft 280 suitably supported by the rigid framework; also rigidly connected with said shaft 280 is a hub 281 having a pair of arms 282 and 283. The arm 282 is adapted to be straddled on occasion at one end by a specially constructed fork 284 carried by the movable shaft or rod 113. Hence transverse movement of said shaft or rod 113 will rock cam members 277 so as to lower and raise the totalizer frame 251—252. Similarly arm 283 can be moved downward on occasion to lower the totalizer frame. Such use of arm will be more fully considered under the various total key headings. Flat spring 285 is provided with a suitably formed protuberance 286 cooperating with suitably located depressions in a main frame to resiliently hold the above described elements in the positions corresponding to connected and disconnected positions of the totalizer wheels. By virtue of the dwells at the end of the cam slots the extent of movement of the totalizer wheels into and from either position is accordingly determined irrespective of a certain amount of lost motion or back-lash of the elements cooperating with arms 282 and 283 on hub 281.

*Automatic rocking of totalizers*

As has been noted elsewhere herein computing requires the operation of connecting and disconnecting the wheels of a totalizer with its actuators. Further such connecting and disconnecting must occur at different times according to the type of computation effected. Two cases will be considered, the first is the automatic connecting and disconnecting which occurs during totaling after a totalizer or set of totalizers have been manually connected with their actuators. Case 1 will be described first.

It has been pointed out herein (see Rocking totalizer frame) that stub shaft 280 (see Figs. 16, 18 and 29) may receive oscillatory movement to cause the wheels of a totalizer to be connected with and disconnected from their respective actuators. There are provided a plurality of such stud shafts designated as 280, 280' and 280'' in Figs. 16 and 18, each shaft being identified with a particular set of totalizers mounted in a common frame. Each shaft 280, 280' and 280'' provided with downwardly extending arms 282, 282' and 282'' respectively which on occasion are straddled by specially constructed forks 284, 284' and 284'' respectively supported variously on a shaft or bar 113. Said shaft or bar 113 is shifted rearwardly by an arm 111 driven by cam 67, see Fig. 14, after the actuators have assumed definite predetermined differential positions. Such movement of the variously supported special forks 284, 284' and 284'' rotate the stub shafts clockwise, as viewed in Fig. 16, if said forks are straddling the corresponding downwardly extending arms. If certain of the forks are not straddling the corresponding downwardly projecting arms, the corresponding set of totalizers will of course remain in disconnected position. After the totalizer wheel actuators have returned to neutral or normal cam controlled arm 120, Fig. 16, moves forwardly and pulls the shaft or bar 113 to home or normal position thus disconnecting that set or those sets of totalizers which may have been automatically connected with the actuators. It is thus seen that to and fro movement of member 113 admirably effects the necessary connection and disconnection of those sets of totalizers corresponding to a straddling of a special fork with the corresponding downwardly extending arm.

The second case will be now described. In this case a set of totalizers have been manually connected with the actuators in any convenient manner such as the depression of a suitable key and the machine automatically disconnects them. Each shaft 280, 280' and 280'' is provided with an arm 287, 287' and 287'' respectively, each of which is provided with a pin which extends through an elongated slot in the associated lever 288, 288' and 288''. Each of said levers is loosely mounted at its upper end on a stud rigid with the main framework of the machine. At the lower end each of said levers is provided with an antifriction roller. When a set of totalizers are manually connected with their actuators the specially formed fork associated therewith is disconnected from the associated downwardly extending arm by suitably constructed means described elsewhere herein. (See for example Disabling fork A 284''.) A selected set of totalizers is manually engaged by rotating the associated shaft 280 (say) such rotation causes the lower end of connected lever to travel forwardly thereby positioning its antifriction roller in proximity to the longer flange of the corresponding fork 284. Hence when the member 113 is shifted rearwardly by the cam operated lever 111 the manually connected set of totalizers will be automatically disconnected from their actuators when the said actuators have assumed definite predetermined differential positions. The return movement of member 113 is idle because the set of connected totalizers has been disengaged on the first movement of the said member.

Special forks 248, 248' and 248"

Under the heading Automatic rocking of totalizers mention was made of certain special forks 284, 284' and 284" (see Figs. 16, 17 and 18) supported variously on a shaft or bar 113. As indicated, these forks are important means for connecting and disconnecting the corresponding sets of totalizers with their actuators. All the said forks are of similar construction which may be briefly described as a hub with spaced flanges both of which are mutilated, the one flange comprising approximately one third of an annulus and the other approximately one sixth of a similar annulus, as is illustrated in Fig. 17. Normally certain of said forks straddle the associated arms as is illustrated at 284' and 284"; the third fork is normally disengaged as indicated at 284. Occasionally all three forks are straddle the associated arms, again only one of them straddles its companion arm, and, finally none of them straddle their companion arms. The fork 284' is rigid with member 113 and therefore partakes of all of its movements. Fork 284" normally straddles its companion arm 282" and is rigid with a sleeve carried by member 113 so that it must partake of the translational movement of member 113 but not necessarily of its rotational movement. Fork 284 does not normally straddle its companion arm 282 and is rigid with a sleeve carried by member 113 so that it also partakes of the translatory movement of said member but does not necessarily partake of its rotational movement.

The contemplated relative adjustments of the forks are indicated in the following table.

| Fork 284"<br>Arm 282" | Fork 284'<br>Arm 282' | Fork 284<br>Arm 282 | Type of calculation |
| --- | --- | --- | --- |
| Cooperating | Cooperating | Disabled | Adding on two sets of totalizers. |
| Cooperating | Cooperating | Cooperating | Adding on all sets of totalizers. |
| Cooperating | Disabled | Disabled | Subtotaling. |
| Disabled | Disabled | Disabled | Totaling. |
| Disabled | Disabled | Cooperating | Transferring a total. |

The means for effecting cooperation between the different forks and corresponding arms, and also the means for occasionally disabling such connections is under control of a plurality of special keys and their associated mechanism.

Enabling fork 284

As has been described herein fork 284 is on a sleeve carried by shaft or rod 113 but does not normally straddle the companion downwardly extending arm 282; hence the associated totalizers are not connected with the actuators during the translatory movements of shaft or rod 113. In order to cause said fork 284 to straddle its companion arm 282 the sleeve which said fork is rigidly attached is rotated an extent sufficient to effect such straddling. Said sleeve is provided with an elongated tooth 289 meshing in an interdental space on the rear (as viewed in Fig. 16) of member 290. (See Fig. 17 which clearly illustrates similar mechanism.) Said member 290 is constrained to move substantially rectilinearly by two headed studs rigid with the framework passing through elongated slots therein. Said member 290 is also provided with a pin overlying a lever 291 loosely pivoted on a stud also fixed to the main framework. A stud rigid with key 292 also overlies said lever 291. Hence depression of said key rocks the lever 291 and elevates member 290 thus rotating the sleeve carrying fork 284 to straddle the companion arm 282 for enabling the associated set of totalizers to be connected and disconnected with the actuators during the translation of member 113.

Disabling fork 284'

Occasionally it is necessary to disable fork 284' and hence the associated set of totalizers. Since said fork 284' is rigidly affixed to member 113 a rotation of said member will disable said fork; accordingly member 113 is provided with an element 289' rigid therewith having a long tooth cooperating with an interdental space on the rear (as viewed in Fig. 16) of member 290". Said member is constrained to move substantially rectilinearly by a pair of headed studs rigid with the main framework passing through elongated slots in said member. The member 290' is connected by a link 293 to a bell crank lever 294. Hence rocking of the said bell crank 294 by any means will draw member 290 downwardly, thus rotating member 113 and disabling fork 284'.

There are a series of bell crank levers rotatably mounted on studs fixed to the main frame work, including the above mentioned, connected together by links, they are the levers 294, 295, 296, 297 and 298. Bell crank levers 295, 297 and 298 are connected by the link 299 at their lower ends. A short link 301 connects bell crank levers 296 and 297. The link 300 connects bell crank 294 with bell crank 295. In view of the described link connections the five mentioned bell cranks move in unison so that if any of them are moved by any means the member 290' will rotate member 113 and disable fork 284'. Each of the bell crank levers 295, 296, 297 and 298 are provided with suitably located studs so as to be contacted by the feet of the keys 302, 303, 304 and 305, respectively. Hence depression of any of said keys will disable fork 284' by the mechanism described.

Disabling fork 284"

Occasionally it is necessary to disable fork 284" and hence the associated set of totalizers.

Since the said fork 284" is rigidly affixed to a sleeve member a rotation of said member will disable said fork 284"; accordingly said member is provided with a long 289' cooperating with an interdental space on the rear (as viewed in Fig. 16) of member 290". Said member is constrained to move substantially rectilinearly by a pair of headed studs rigid with the main framework passing through elongated slats in the said chamber 290". Hence the downward movement of member 290", however effected, will rotate sleeve and thus disable fork 284". Member 290" is adapted to be forced downwardly by a stud rigid with bell crank lever 306 loosely pivoted on a stud fixed to the main framework of the machine. Two other similarly mounted bell crank levers 307 and 308 are connected at their lower ends by a pin and slot means to the link 309 pivoted at the lower end of the first mentioned bell crank 306. The extreme horizontal ends of the bell cranks 306, 307 and 308 underlie pins 310 respectively rigid with the keys 302, 303 and 304 respectively. Hence depression of any of said keys will rock bell crank lever 306 and force member 306 downwardly to rotate sleeve thus disabling fork 284"

Restoring disabled forks to normal

Hereinabove, means have been described for rotating the members to which certain forks are rigidly affixed. After the occasion for necessitating such rotation has passed it is necessary to restore the rotated forks to normal straddled position.

It has been pointed out herein that bell cranks (see Fig. 16) 294, 295, 296, 297 and 298 are so connected as to move in unison. hence if any part of the system, such as link 300 is moved to normal all elements connected therewith will also move to normal. Such movement is effected by providing said link 300 with a pin 311 lying in the path of movement of the upper end of lever 88 loosely pivoted on a stud rigid with the main frame. Said lever is provided with a downward extension provided with a suitable antifriction roller lying in the arcuate path of movement of the wipe pawl 87 mounted on oscillatory lever 86, which lever is oscillated by cam 68 (see heading Cam 68) when the said wipe pawl 87 travels rearwardly it interferes with and rocks lever 88 and hence link 300 connected to the bell crank lever system. Bell crank 296 of the said system is provided with a pin underlying slidable member 290" hence raising of said pin will rotate the associated sleeve and return fork 284" to normal, at the same time bell crank lever 295 through link 293, will return to normal elevated position the member 290' thus restoring fork 284' to normal. Since the studs in the bell crank system or chain underlie the feet of the keys 302, 303, 304 and 305, said keys will also be returned to normal position.

Totalizer timing

In order to effect the desired forms of computation the totalizer wheels must be connected with their respective actuators at different periods relative to the directions of excursions of the said actuators. Thus for the purpose of adding amounts predetermined by the angular positions of the notched disks on shaft 167 the sets of totalizers; or groups of sets of totalizers, as the case may be; are held out of connection with the actuators while the latter move to positions determined by the prepositioned notched disks during the first half of a cycle of operation of the machine. At about the beginning of the second half of a cycle of operation of the machine the said set of totalizers or groups of sets of totalizers are connected with the actuators and they remain connected therewith during the time that the actuators move to normal position. After said actuators have reached normal position the said set of totalizers or groups of sets of totalizers are disconnected from the said actuators, thus causing said set of totalizers or groups of sets of totalizers to measure the extent of displacement of the actuators from their normal position.

In taking totals, one and only one set of totalizers may be connected with the actuators during the first half of a cycle and such set must be one such that only one totalizer wheel is in engagement with an actuator, and the periods of connection with the said actuators are exactly the reverse of those for adding. Thus the set of totalizers are connected with the actuators during the first half cycle of movement and disconnected during the second half cycle. Hence the actuators move forward distances commensurate with the angular displacement of the corresponding totalizer wheels from their normal positions, and since the said totalizer wheels are turned to normal position and then disengaged they remain at normal or zero position.

In taking a subtotal the same restriction as to connection of sets of totalizers with their actuators holds as in taking totals. In this case the set of totalizers are connected with the actuators and remain in connection therewith during the time that said actuators are under a constraint to move during an operation of the machine. Hence even though the wheels of the set of totalizers have been moved to normal or zero they are brought back to their original positions.

In a non-add operation the totalizer or set of totalizers remain in the normal disconnected position while the actuators are under a constraint to move during an operation of the machine. A description of the mechanism for effecting the above recited operations follows.

Total keys

In order to print totals from the groups of sets of totalizers there are provided a series of total keys, a total key for each set of totalizers and a subtotal key for at least one set of totalizers. The total keys are shown in Figs. 16, 18, 24 and 27. Key 302 is for convenience designated the Grand total key and as the name implies it is associated with the set herein denominated as the grand totalizers. Key 303 is also associated with the grand set of totalizers and is utilized for recording subtotals from the grand set of totalizers. Key 304 is a total key associated with the set herein denominated as the itemizing set of totalizers, and key 305 is total key associated with one of the sets herein demoninated as the special set of totalizers. Key 292 is a key for selecting a special set of totalizers for calculating operations.

The term total key implies, and it is so intended herein, that when such a key is depressed it causes the associated set of totalizers to tend to yield its total and that the wheels of said set of totalizers will tend to return to zero and remain in such zero position at the end of the operation. The word tend has been used in the preceding sentence for mechanism will be described herein which will prevent one or more pre-selected totalizers of a set from yielding its total (see Selective actuator trapping).

The term sub-total key implies, and it is so intended herein, that when such key is depressed it causes the associated set of totalizers to tend to yield its total and that the said sets of wheels will retain their totals after the completion of an operation.

Certain of the total keys operate certain mechanisms which are universal to each of them, these universal mechanisms are the chain or system of links and bell crank levers described under the heading Disabling fork 284'; the system or chain of bell cranks described under the reading Disabling fork 284''; releasing the "zero stops" described under the heading Total keys release zero stops; enabling the printing mechanism described under the heading Total keys enable printing mechanism; and set certain mechanism to cause a distinctive sign to be printed in juxtaposition with the total printed. The specific mechanism of the total keys will now be described.

Total keys release zero stops

Normally the feelers are stopped by the outside periphery of the notched disks 205 when the machine is operated idly (see Figs. 3, 4 and 27). When it is desired to take totals provision must be made to permit the feelers to move rearwardly free of all obstruction.

The series of notches 312 in the notched disks is provided for this purpose; therefore when taking totals said slots must be positioned in the paths of the said fingers. This is accomplished as follows—the rack 177 is provided with a pin 176 (see Fig. 27) which is normally obstructed by pawl 175, but when any total key is depressed the pawl 175 is displaced and pawl 313 is set so that only a limited amount of rotation of the shaft 167 is permitted, and such limited amount of rotation is such as to position the aforesaid notches 312 in the path of the actuator controlled feelers. Said pawl 313 is loosely mounted on a suitably located frame supported stud and biased normally to the position shown in Fig. 27 by a suitable spring connected between a part of said pawl and a suitably located stud on the main frame or by its own weight. Turning of said pawl is effected by a sector 314 rigid with the short frame of the system or chain of bell cranks 294, 295, 296, 297 and 298 shown fully in Figs. 16 and 18. Hence depression of any total key, by virtue of the movement of the said system or chain of bell cranks moves sector 314 and therefore elevates slotted pin carrying link 316 to disable pawl 175 and position pawl 313 in the path of pin 176 on rack 177; complemental movement of rack 218 is provided by virtue of an interference between the periphery of sector 314 and extension 317 on rack 218 thus causing the notches 312 on the notched plates to be positioned in the path of the actuator controlled fingers 216 so that the actuators will be stopped when and only when the totalizer wheels reach their zero or normal positions.

Highest order zero stop

During totaling the wheels of a totalizer are rotated backwardly with the said wheels are stopped on the upper square edges of the tripping levers 255 of the transfer mechanism. The highest order totalizer wheel does not need a transfer mechanism for there is no wheel to which a transfer can be stored yet such wheel must be stopped at zero position when the machine is totaling. In order to provide for such stoppage the said highest order wheel is provided with a lever 318 (see Fig. 3) similar to levers 255, shown in Figs. 19, 20 and 21. Said lever 318 cooperates with a pin rigid with the dummy spring urged plate 319 and with a pin on the disk of the highest order wheel. Hence the movement of lever 318 is in all respects similar to that of the corresponding lever 345 shown in the said Figures 19, 20 and 21. Hence the highest order totalizer wheel will be arrested in zero position the same as the remaining wheels.

Machine locks total keys

If a total key were depressed at such an inopportune time as sometime after the main shaft begins its movement, the proper sequence of operations of the normal cycle might be deranged. To guard against such a contingency the total keys are locked against operation shortly after the machine starts to operate. Under the heading Cam 68 it is stated that said cam (see Fig. 12) causes the stud carrying arm 100 to oscillate. Said arm 100 controls the movement of resiliently urged latch 320 which is normally held in the position shown in Figs. 13 and 16. When said arm 100 travels rearwardly, i. e., to the left very shortly after the machine starts operating, a suitable spring causes the rearward end of latch 320 to descend and engage projection 321 rigid with link 299 (see Fig. 16) which link is described as an element of a chain of bell crank levers movable by any total key under the heading Disabling fork 284'. Hence if this chain of bell cranks is locked the keys which are adapted to operate said chain are locked also.

Total keys enable printing mechanism

As described elsewhere herein (Printing keys) the printing mechanism may be disabled so that a series of individual items entered into the totalizers will not be printed, inasmuch as such individual items do not necessarily form a desired part of the permanent record, it being desired to record the total of such items only, therefore means are provided to automatically effect printing when any total key is depressed.

Under the heading Printing mechanism there is described means for rotating the sleeve 322 and shaft 323 (see Fig. 30) for releasing the hammers for permitting them to strike the positioned type a percussive blow. Such mechanism includes a rotatable member 118 connected with said sleeve 322 which is provided with a short pin 324 and a similar rotatable member 119 provided with a long pin 325. Loosely mounted on the said sleeve is an arm 326 provided with a flange 327 which may interfere with said pins 324 and 325 associated with members 118 and 119 respectively so that if said arm 326 is moved forwardly said flange 327 will interfere with said pins and rotate the said members 118 and 119 to a position which will ensure the automatic release of the printing hammers and feeding of the record sheet and inking ribbon. In order to cause the said arm 326 to move forwardly any total key operates mechanism which will cause resiliently suspended latch 96 pivoted on the lower end of said arm 326 to engage pin 94 on forwardly moving link 85 which has been described under the heading Cam 68 and thus ensure a rotation of the said members 118 and 119. Under the heading Disabling fork 284' there is described a system of links and bell cranks shown in Fig. 16 which move in unison. The link 299 of said system is provided with a pin 328 which when moved rearwardly rocks bell crank lever 329 loosely pivoted on a conveniently frame supported stud to rock anticlockwise as viewed in Figs. 13, 16 and 18 and thus cause a pin carried thereby to lower the resiliently supported latch 96 so as to connect arm 326 with the forwardly moving link 85, thus insuring a release of the printing hammers during a total printing cycle.

Totalizing the special totalizers

The total key 305 (see Figs. 1, 16 and 18) tends to cause the set of special totalizers to yield their total when the machine is operated after said key is depressed. Said key is provided with elongated slots through which pass suitably located frame supported studs to insure substantially rectilinear motion. Rigid with said key is a stud which when the key is depressed rocks bell crank lever 308 of the system including bell cranks 306, 307 and 308 to rotate sleeve carrying fork 284'' and hence the grand set of totalizers. Another stud rigid with said key during its downward movements, contacts with and rocks arm 283 rigid with shaft 280 to rock the special set of totalizers into connection with their respective totalizer wheel actuators so that the totalizer wheels are connected with the said actuators during the first motion thereof as required by the theory and practice of taking totals as set forth under the heading Totalizer timing. The foot of said key is broadened so as to rock bell crank 298 of the system or chain including members 294, 295, 296, 297 and 298. The bell crank 298 which is fast to a stub shaft 315 releases the zero stop to permit the actuators to assume differential positions commensurate with the adjustment of the special set of totalizers. Said bell crank also causes the shaft or bar 113 to rotate thus disabling fork 284' and hence the itemizing set of totalizers. Link 300 and pin 311 moving therewith come into the range of action of lever 88 so that the elements displaced by the depression of key 305 will be returned to normal at near the completion of the operation of the machine. Moved link 297 causes a pin thereon to rock bell crank 329 to cause the printing hammers to be fired.

After the types have been positioned cam driven arm 111 causes the type carriers to be locked in adjusted position and then moves shaft or bar 113 rearwardly, the said set of special totalizer wheels have now been turned to normal or zero position, such movement of shaft or bar 113 causes prong of fork 284 to contact with the antifriction roller at the lower end of arm 283 and thereby releases the normalized or zeroized set of totalizers from their actuators.

After the return of the actuators to normal or home position cam driven arm 120

Totaling the itemizing totalizers

The total key 304 (see Figs. 2, 16 and 18) tends to cause the set of itemizing totalizers to yield their total when the machine is operated after said key is depressed. Said key is provided with elongated slots through which pass suitably located frame supported studs to insure approximate rectilinear motion. Rigid with said key is a stud which when the key is depressed rocks bell crank lever 307 of the system including the bell cranks 306, 307 and 308 to rotate sleeve carrying fork 284″ thus disabling it and hence also the grand set of totalizers. Another stud rigid with said key during its downward movement, after the disabling of said fork 284″ contacts with and rocks arm 283′ rigid with shaft 280′ to rock the itemizing set of totalizers into connection with the respective totalizer wheel actuators so that the totalizers wheels are connected with the said actuators during the first motion thereof as is required by the timing of totalizers for causing them to yield their totals, as set forth under the heading Totalizer timing. The foot of said key is broadened so as to rock bell crank 297 at about the time the first mentioned pin acts on the above described system of bell cranks of the system or chain including bell cranks 294, 295, 296, 297 and 298 and the links 297 and 300. The bell crank 298 which is fast to a stub shaft 315 releases the zero stop to remove all obstructions from the actuators so that they will be limited in differential positions corresponding to the adjustment of the itemizing set of totalizers. Said bell crank 297 also causes the shaft or bar 113 to rotate thus disabling fork 284′ so that the pin in the path of arm 282′ on the said total key can connect the associated set of totalizers with the actuators. Link 300 and pin 311 moving therewith come within the range of action of lever 88 so that the elements displaced by the depression of the total key will be returned to normal position at near the end of the operation of the machine. Moved link 299 causes a pin carried thereby to rock bell crank 329 to cause the printing hammers to be fired.

After the types have been positioned arm 111 driven by cam 67 causes the type carriers to be locked in adjusted position and then moves shaft or bar 113 rearwardly, after the said set of itemizing wheels have now been turned to normal at zero position, and such movement of shaft or bar 113 causes a prong of fork 284′ on shaft 113 to contact with the antifriction roller at lower end of arm 288′ and thereby releases the zeroized or normalized set of totalizers from their actuators.

After return of the actuators to normal or home position cam driven arm 120 moves shaft or bar 113 forwardly to restore it to normal position.

Grand total key

The grand total key 302 (see Figs. 1, 15 and 18) tends to cause the set of grand totalizers to yield their total when the machine is operated after said key is depressed. Said key 302 is provided with elongated slots through which pass suitably located frame supported studs to insure approximate rectilinear motion. Rigid with said key is a stud which when the key is depressed rocks bell crank lever 306 of the system including the bell cranks 306, 307 and 308 to rotate sleeve carrying 284″ to disable said fork. Another stud rigid with said key during the downward movement, after the disabling of said fork 284″ contacts with and rocks arm 283″ rigid with shaft 280″ to rock the grand set of totalizers into connection with the respective totalizer wheel actuators so that the totalizer wheels are in engagement with the said actuators during the first motion thereof as is set forth under the heading Totalizer timing in describing totaling. The foot of said key is broadened so as to rock bell crank 295 at about the time the first mentioned pin acts on the above described system of bell cranks of the system or chain including bell cranks 294, 295, 296, 297 and 298 and the links 297 and 300. The bell crank 298 which is fast to a stub shaft 315 releases the zero stop to remove all obstructions from the actuators so that they will be limited in their motions by backward turning of the sets of grand total wheels when the single teeth or pins 249 thereof contact with the upper squared end of the corresponding bell cranks 255 shown in Figs. 19, 20 and 21. Said bell crank also causes the shaft or bar 113 to rotate thus disabling fork 284′ and the associated itemizing set of totalizers prior to the engagement of the grand set of totalizers. Link 300 and pin 319 moving therewith come within the range of action of lever 88 so that the elements moved by said total key will be returned to normal at near the end of operation of the machine. Moving link 297 causes a pin 328 carried thereby to rock bell crank 329 to cause the printing hammers to be fired.

After the types have been positioned arm 111 driven by cam 67 causes the type carriers to be locked in adjusted position and then moves shaft or bar 113 rearwardly, after the grand set of wheels have now been rotated to zero position, and such movement of shaft or bar 113 causes a prong of fork 284″ to contact with antifriction roller at the lower end of arm 288″ and thereby releases the zeroized set of totalizers from their actuators.

After return of the actuators to normal or home position cam driven arm 120 moves shaft or bar 113 forwardly to restore it to normal position.

Subtotal key

The sub-total key 303 (see Figs. 2, 16 and 18) tends to cause the set of grand totalizers or any other totalizers with which it may be associated to yield a sub-total when the machine is operated after the said key has been depressed. Said key is provided with elongated slots through which pass frame supported studs to insure approximate rectilinear motion. Said key is provided with a broadened foot to rock bell crank lever 296 of the system or chain including bell cranks 294, 295, 296, 297 and 298. The bell crank 298 which is fast to a stub shaft 315 releases the zero stop to free the actuators so that they will be stopped on their initial motion by the totalizer wheels turning backwardly until stopped by their transfer mechanisms. Bell crank 294 also rotates shaft or rod 113 to disable fork 284' and hence the itemizing set of totalizers. Link 300 positions pin 311 so that elements moved by the sub-total key will be returned to normal at about the end of the operation of the machine by movement of lever 88. Moved link 299 causes a pin 328 thereon to rock bell crank 329 to enable the printing mechanism. Said key 303 has a pin which interferes with a turned over portion of resiliently positioned curved lever 330 after the said system or chain of bell cranks and links have disabled fork 284'. Said lever is provided with a laterally extending pin 341 which cooperates with a pin 342 rigid with sleeve carrying fork 284" on rod or bar 113, hence full depression of said sub-total key shifts the said sleeve and also the bar or rod 113 rearwardly causing fork 284" to rock shaft 280" through the rigidly attached arm 282" and thus connect the set of totalizer wheels with their respective actuators during the initial motion thereof. When the actuators have been differentially adjusted under control of the respective totalizer wheels the cam controlled arm 111 causes the type carriers to be locked in adjusted position and then moves rearwardly to move the rod or bar 113 correspondingly, but such motion is an idle one inasmuch as the said sub-total key 303 had previously moved said bar so that the grand set of totalizers remain connected with the actuators until they return to home position when cam operated lever 120 moves forwardly and carries with it the shaft or rod 113, thus disconnecting the grand set of totalizers by rocking stub shaft 280" by means of the straddled fork 284". Hence the described operation causes the grand set of totalizers or any other set of totalizers with which said key is associated to tend to yield their totals to the printing mechanism and the said actuators are forced to reinsert the total into the said set of totalizers as has been indicated under the heading Totalizer timing.

Selecting normal inactive totalizers

Under the heading Enabling fork 284 means are described for rotating the sleeve carrying fork 284 (see Figs. 16 and 18). Said fork when enabled straddles arm 282 for the purpose of causing rocking of the associated special set of totalizers into connection and disconnection with the actuators. Said sleeve is rotated by the depression of a selecting key 292 which is guided by suitable frame supported studs so as to have a substantially rectilinear motion. Said key 292 is provided with a notch which may cooperate with the top frame of the machine to hold it locked in depressed position. The lower end of said key is provided with a pin overlying arm 333 of an upwardly spring biased bell crank lever loosely pivoted on stud at the lower end of slidable member 290 which is moved upwardly by depression of said key 292 by means of lever 291. Such movement of said bell crank 333 moves it both vertically and rotationally. Such movement is of sufficient extent to remove pin 334 thereon out of the range of action of the bell crank lever 335 which is rocked on every operation of the machine. When the notch in the shank of key 292 is withdrawn from cooperation with the top cover of the machine the spring attached to bell crank lever 333 forces the key upwardly and pin 334 is immediately below the nose of bell crank lever 335 which is loosely pivoted upon a suitably located frame supported stud and is connected to a rearwardly spring urged link 336 supported near the middle of the machine by an arm 337 loosely pivoted on the pin carrying bell crank lever 294. Said link is provided with a pin 338 lying in the path of movement of lever 88 which is moved as described under the heading Restoring disabled forks to normal. Hence bell crank 335 is rocked on every operation of the machine; and when the key 292 is released such movement will draw member 290 downwardly thus disabling the special fork 284 associated with a special set of totalizers.

Selecting a totalizer common to a set and to a group

Herein the totalizers have been described as arranged in sets and also as arranged in groups. Two sets of totalizers, herein denominated as the set of grand totalizers and as the set of itemizing totalizers whereas the remaining sets are normally biased to non-adding condition. In order to select any set of the latter group of totalizers for operation it is necessary to depress the associated set selecting key 292. Herein certain keys denominated as trapping keys (see keys 235, Fig. 2 and 229 in Figs. 27 and 33) which are adapted to hold certain sets of actuators against operation are keys which may be denominated as disabling keys for groups of totalizers; for when a trapping key is in raised position its associated trapping latch 234' lies above all the forwardly extending arms 226 of a certain set of actuators thereby preventing effective movement of said set of actuators, and thereby preventing operation of the corresponding group of totalizers. Hence if all but one of the said trapping keys are in raised position all but one group of totalizers are disabled. Fig. 36 illustrates a plurality of normally non-adding sets of totalizers, associated with a plurality of groups of totalizers, associated with a plurality of totalizer selecting keys 292 and a plurality of keys 305, which latter when operated enable the printing mechanism to print the accumulation or accumulations of the thereby selected totalizers. If now a certain selecting key 292 is depressed all but one of the totalizers of the associated set are disabled, and that one corresponds to the free set of actuators. Hence any depressed trapping key such as 235 and any depressed selecting key 292 select the totalizer common to the operative set of totalizers and the operative group of totalizers. If now a plurality of selecting keys 292 are depressed and a plurality of trapping keys such as 235 are also depressed all totalizers common to the selected sets and groups will be in active condition. Such selection is frequently useful as is indicated under the heading Some typical accounting problems. Assume the existence of M groups of sets of totalizers with N totalizers in each set, there will then be N group selecting or trapping keys and M set selecting keys so that the total number of selecting keys is only M+N instead of MN as is commonly found in machines of this class. Obviously the keys 29 operate similarly.

Transferring totals

Means has been described for taking totals from any set of totalizers and means has also been described for selecting a special set of totalizers for actuation. The depression of a total key disables the special fork or forks associated with other totalizers normally operative to effect addition, but has no effect upon the forks of totalizers which are normally inactive. Hence, in the absence of special single key mechanism, a total key and a totalizer selecting key can be depressed and the machine operated. Such an operation causes the set of totalizers having their common total key depressed to tend to yield their total to the actuators and the totalizer selecting key causes its set of totalizers to be connected with the actuators which have been positioned under control of the set of totalizers being totaled, hence the selected set of totalizers will measure the differential positions of the displaced actuators or stated in other words the total or totals standing on one set of totalizers is or are transferred to another set of totalizers. Obviously any total on any set of totalizers may be transferred to any set of totalizers which are normally inactive.

Nonadding

Under the heading of Totalizer timing the necessary timing of a set of totalizers to effect non-adding has been described. Non-adding has been incidentally described under the various total key headings when describing the action of a total key on the remaining sets of totalizers. Further certain special sets of totalizers are normally inactive and hence they may be described as normally biased to non-adding so that totalizer controlling keys are necessary to temporarily disable the normal bias. Again under the heading Trapping keys means has been described for disabling a set of actuators so that said actuators cannot transmit movement to the associated group of totalizers. Hence each trapping key constitutes a non add key for the corresponding group of totalizers irrespective of the particular totalizer controlling key in operative position.

Printing special characters

It is desirable to print certain special characters identifiable with the various total keys and selecting keys for sets of totalizers. Each of said keys is provided with a pin 339, see Figs. 24 and 27. In front of the said keys, as viewed in Fig. 24 is a slide 340 suitably supported by frame supported guides which is connected by link 341' to an upwardly extending arm of the skeletonized actuator 107. Said slide 340 is provided with a series of stops 341 arranged differentially to permit said plate to assume various positions under control of a depressed special key so that each special key determines a different extent of movement. Such varying extents of movement are under control of a spring 106, and the general operator 105 as are the totalizer actuators, and such extents of movement are transmitted through an idler lever 342 and a link 343 to a special type carrier 344 which is provided with a series of type which bear indicia corresponding to the different stops 341 of the key stopping plate 340. As shown there are five special keys, but the number may be indefinitely increased by lengthening the elements cut by lines X—X as indicated hereinabove. In the event of such lengthening a corresponding number of special type are provided to identify the added keys. The printing hammer for the special types is fired with every operation of the machine except when blocked up by pawl 322. Such firing does no printing because the plate 340 is normally free to move to its fullest extent with an operation of the general operator and in so doing a space devoid of special type is presented to the front of the corresponding printing hammer 345 hence no printing occurs. Hence any operation of the machine will be recorded and indicated when any of the special keys are depressed except when printing is ineffective and key 31 is depressed.

Polychrome printing

It is frequently desirable to potentially print items entered into certain totalizers in a distinctive color and to print all or certain totals in a different color. As has been described above pins 339 on the various keys (see Fig. 27) are used to determine a special character to be printed in conjunction with certain items and totals. Said pins, or other suitably located pins may contact with removable interponents 346 of different heights which may be optionally attached to a long angled lever 347 pivoted near one end of an arm 348. Said interponents will accordingly differentially position said lever 347 so that one or the other of the lugs 348 on member 102 will be in the path of pin 101 rigid with lever 83 which is moved by cam 68. Hence said cam 68 may rock arm 348 differentially and through link 349 and bell crank 350 (see Fig. 24) fixed to shaft 351 elevate the ribbon spools 352 differentially to position different colored sections of the ribbon on the printing line. Manifestly in view of adjustability of the interponents 346 the machine can be adjusted to effect any reasonable requirement of polychrome printing. If desired the actuator connecting keys 229 may be connected to effect combinations of color printing by extending lever 347 transversely under the arms 353 with suitable provisions for the interchangeable interponents thereon.

Printing mechanism

It is necessary or desirable to record certain amounts entered into the totalizers and all amounts abstracted from said totalizers. The printing mechanism is constructed to do such recording. The printing mechanism consists essentially of a series of type carriers operatively connected to the actuators (see Figs. 3, 4 and 24) and a series of hammers for each individual type carrier.

The rearwardly extending arm 225 of each actuator is connected by a pin and slot connection with an idling lever 342 loosely pivoted upon a suitable frame supported shaft. Said idler levers are connected to the type carriers 344 by intermediate links 343. All the elements are proportioned so that the actuators transmit equal increments of movement to the totalizers and substantially equal increments of movement to the type carriers. A series of intermediate levers including members 354 and 355 are provided for causing the printing of significant zeros. A cam 109 is provided to partially withdraw the hammers 345 from printing position and cam 91 to fully cock the printing hammers. The printing hammers are normally held in retracted position by a pair of latches 322 and 323 as shown in many of the figures (see particularly Fig. 30). After the type carriers have been positioned a series of pawls 356, one for each type carrier, are permitted to drop into suitably located notches on the stems of the type carriers which prevent further upward movement of the said carriers but permit relatively free downward movement; such pawls are necessary because the totalizers are occasionally disconnected from their actuators before printing occurs (see total printing).

The printing mechanism is arranged so that the items entered into a selected group of totalizers are printed at the option of the operator, so that all items, some only, or none will be printed. Such division of the printing mechanism is effected by a plurality of spring urged latches 322 and 323 for holding the substantially horizontal arms of the printing hammers 345 against the tension of their springs 357. Any of said latches may be automatically removed from interference with the corresponding horizontal printing hammer arms under control of certain printing keys. The printing hammers are released after the type carriers have been differentially positioned which is also after the first operation of cam 68 and the first part of operation of cam 67. Hence cams 91 and 109 have been rotated from the positions shown in Fig. 3 to the positions shown in Fig. 4. Recocking cam 91 is under the control of cam 68 on the main shaft (see Fig. 13). Partial recocking cam 107 and pawl controlling cam 358 are directly under the control of cam 67 on the main shaft (see Fig. 14). Releasing of pawls 322 and 323 is under optional control; through the agency of the printing keys 359 and 360 (see Fig. 30) and the various total keys; and of the said cam 67. The printing hammers 345 are held in normal cocked position against the action of their springs 357 by the clockwise resiliently urged latches 322 and 323 overlying an antifriction roller on a substantially horizontal arm of each printing hammer 345. Latch 323 (Figs. 3, 4, 13, 14, 30) is rigid with a frame supported shaft. Mounted on said shaft is a three armed member 119 which may have its upwardly extending arm in the path of pin 116 extending on both sides of link 114 which is moved rearwardly by cam 67 rigid with the main shaft 64 of the machine. Hence when said link moves rearwardly and pin 116 thereon interferes with member 119, said member will be rotated anticlockwise thereby withdrawing the corresponding latch 323 from interference with a group of the substantially horizontal arms of the printing hammers 345 so that they are free to impinge upon the positioned type.

Mounted on said shaft is a sleeve carrying rigid therewith a pawl 322. Connected with said sleeve is a three armed lever 118; which is similar to member 119; whose upper arm may also be in the path of pin 116 so that movement of said link 114 will release that group of printing hammers 345 normally held thereby.

Hereinabove, it has been indicated that the machine may both be lengthened and broadened so as to provide for a larger number of groups and sets of totalizers. In such event it is desirable to preserve the partial non-print function of the printing mechanism with respect to the totalizer groups. One means for accomplishing this function is illustrated in Figs. 31, 32 and 34. In the illustration four partial non-print pawls have been illustrated, however more or less pawls may be provided according to the exigencies that the machine would be designed to meet, as will be evident as the description proceeds. A reference character notation has been adopted for Figures 31, 32, and 34 which when the parenthetical matter is read into the next following refers to the said figures.

Main shaft control of printing mechanism

Proper functioning of the printing mechanism requires that the printing hammers must be withdrawn and held in such position then they should be suddenly released so as to give a percussive blow to the positioned types. Let it be assumed that the printing hammers have struck the type as shown in Fig. 4. Cam 109 partially revolves and in so doing it contacts with antifriction rollers mounted on the substantially horizontal arms of the hammers 345 hence withdrawing them slightly from the position shown in said Fig. 4. Cam 109 is rigid with a frame supported shaft to which is also rigidly affixed on arm 115 (see Fig. 14) which is connected by the long link 114 operated by cam 67 on the main shaft. As stated hereinabove said cam 67 acts before the actuators start to return. Hence cam 67 slightly withdraws the printing hammers shortly after the totalizers have been connected with the actuators during adding or at the same relative time after the totalizers have been disconnected during totaling, then the type carriers are restored to normal. After the totalizers have been disconnected from their actuators and during the time transferring is taking place cam 91 (see Fig. 14) which is rotated by a lever 90 rigid therewith through link 85 connected to the mechanism driven by cam 68 on the main shaft 64 is rotated to the position shown in Fig. 13 thereby positioning the hammers in normal position for subsequent release. Latches 323 and 322 (323' and 322') are resiliently urged against suitable stops to the position indicated in Fig. 30 (Fig. 34) so that the substantially horizontal arms of the printing hammers 345 can pass by said latches and they will snap into their normal holding position as shown. As noted above the printing hammers are released for printing after the totalizers are disconnected during totaling, hence the type carriers must be held in their adjusted positions before such disconnection. For effecting such holding the normally disengaged resiliently urged pawls 356 are permitted to engage suitably located notches in the type carrier under the influence of their respective springs, by a partial rotation of cam 358 which is driven by arm 361 connected by link 362 to arm 115 moving with cam 109, and hence under control of cam 67 on the main shaft 64 (see Fig. 14). Said pawls 358 are provided with suitable guiding flanges straddling the stems of the type carriers.

At near the completion of an operation of the machine slotted link 363 (see Fig. 12) connected to arm 364 rigid with cam 91 moves clockwise thus rocking arm 361 and cam 358 rigidly attached thereto thus disabling pawls 356 and permitting free upward movement of the type carriers 344 at the beginning of the next operation of the machine. Such rocking of arm 361 is possible because of the existence of a suitable clearance slot in link 362 as shown in Fig. 14.

Polychrome printing has been described under the appropriate heading as being effected by the rotation of cam 68 on the main shaft.

Automatic zero printing mechanism

It is desirable that significant zeros should be printed whereas the insignificant zeros should be eliminated. Such control is effected by a series of resiliently urged latches 354 one for each printing hammer 345 loosely pivoted on a suitable frame supported shaft. Said latches are connected by suitable lugs or pins 365 so that if any one of them is rocked all latches corresponding to lower denominational orders will be rocked by the moved latch while the latches corresponding to the higher denominations will not be disturbed. The extreme forward ends of the latches 354 interfere at times with the downwardly extending tails of the printing hammers 345. In describing the upward movement of the type carriers reference was made to the idler arms 342 interposed between the type carriers and the actuators. Each of said idler arms is provided with a suitable antifriction roller for partially rotating resiliently urged lever 355 by cooperation with the downwardly extending arm thereof, each of said levers has an antifriction roller near its upper end which cooperates with a cam surface on the lower edge of the corresponding latch 354. Assuming the latch 354 in a position such as to block the downwardly extending arm of the corresponding printing hammer 345 it is seen that any significant movement the idler lever 342 causes its roller to rock lever 355 and latch 354 as well as all lower denominational latches 354 through lugs or pins 365; to release the corresponding printing hammer for operation if either or both latches 323 and 322 (323′ and 322′) should subsequently be operated. In order to eliminate undue interference during the time the hammers are cammed to cocked position all latches 354 are simultaneously moved so that they will not impede the movement of either the idler levers 342 or of the hammers 345. All the said latches 354 are finally moved to position shown in Fig. 3 by a universal cam member 366 (see Fig. 13) pivotally supported by the main frames. Said member is provided with an upwardly extending arm 367 lying in the path of a projection 368 rigid with cam 91, a suitable spring and arm is provided to urge said arm 367 into contact with projection 368. Hence when the hammers are being restored to the position shown in Fig. 3 by cam 91, member 366 moves all latches 354 against the action of their springs to the position shown in the said figure. Hence at normal hammer cocked position there is a clearance between the downwardly extending tails of the hammers and latches 354 and also between said latches and levers 355. A fixed comb 369 (see Fig. 13) is provided to insure cooperation between the latches 354 and their corresponding hammers. The hammers 345 are also guided by a suitably located comb 370 as shown in Fig. 24.

*Printing keys*

Under the heading Printing mechanism means has been described for releasing the printing hammers for impingement against the positioned type, said means including the two members 119 and 118 (and in addition, thereto members 119′ and 118′) connected with the clockwise resiliently urged wide pawl 323 and the wide sleeve pawl 362 (323′ and 322′) respectively as shown in Fig. 30 (and also in Fig. 34). The connection of said members 119 and 118 (119′ and 118′) with the said shaft and sleeve respectively is one which permits a limited amount of free angular movement relative thereto. Such connections are similar so that the description of the one suffices for both. Member 119 is rigid with a widely notched hub 371 (see Fig. 30) loose on shaft of wide pawl 323 passing through the said notch in hub 371 is a pin 372 rigid with said shaft. A suitable spring extends between the rearwardly extending arm of member 119 and a suitably located frame supported stud which tends to rotate said member clockwise an angular distance determined by the arcuate length of the slot in the hub 371 of said member 119 and pin 372 rigid with said shaft of wide pawl 323. When said member 119 is permitted to rotate under the influence of the said spring the upwardly extending arm of said member 119 is rotated clockwise sufficiently to permit pin 116 on link 114 to pass rearwardly without interfering with said arm of said member 119 hence wide pawl 323 is not withdrawn from engagement with the horizontal arm of the hammers and no printing occurs.

Member 118 is provided with screw 373 on its hub cooperating with a slot at near the end of sleeve pawl 322. Said member 118 is provided with a similar spring which tends to rotate the said member 118 clockwise sufficiently to withdraw its upwardly extending arm from the path of pin 116 on link 114 so that the printing hammers controlled by pawl 322 will not be released, hence preventing printing.

Also connected with the rearwardly extending arm of member 119 is an upwardly resiliently urged key 360 which is provided with a notch adapted to cooperate with the cover of the machine and thus be locked in depressed position (see Fig. 14). When said key is not locked down a spring is free to turn member 119 clockwise so that its upwardly extending arm is out of the path of stud 116 on link 114. When said key is depressed said member is turned anticlockwise sufficiently to cause pin 116 on link 114 to interfere with the forward arm of said member 119 and hence printing.

Member 118 is similarly provided with an upwardly resiliently urged key 359 which when depressed rocks said member anticlockwise sufficiently to cause printing by the hammers controlled by the sleeve supported pawl 322.

Members 118, 118′, 119′ and 119, see Figs. 31, 32 and 34, are provided with inward integral key extensions 373′ which fit into the respective notches 374′ of the corresponding sleeves 322, 322′, 323′ and the shaft 323. The said keys are not broad enough to completely fill the notches 374′ so that each of the members 118, 118′, 119′ and 119 have a slight amount of motion independent of the said sleeves and shafts, such slack motion may be taken out by the depression of the printing keys 359, 359′, 360 and 360′ so that the upper ends of said members may be positively located in the path of pins 116 on long link 114.

The downwardly extending arms of said members 118 and 119 are provided with pins 324 and 325 (324′ and 325′ in Fig. 34) respectively which lie in the path of a lug 327 on arm 326 loosely supported by sleeve of pawl 322 so that when said arm is rotated anticlockwise as described under Total keys enable printing mechanism the members 118 and 119 (118′ and 119′ additionally) are correspondingly rotated sufficiently so that pin 116 (or pins 116) on link 114 will cause printing.

Paper and ribbon feeding

The release of the printing hammers is effected by pin 116 on link 114 (see Fig. 14) rocking one or both members 118 and 119 (any or all members 118, 118′, 119 and 119′) anticlockwise. As shown in Fig. 30, each of said members 118 and 119 is provided with a pin 375 (also 375′ in Fig. 34) respectively which may contact with any prong of a fork 376 rigidly attached to arm 93. Hence movement of link 114 may rock lever 93 through the intermediate mechanism just described. Such rocking of lever 93 is utilized to feed the record strip and the inking ribbon. Connected to the said lever 93 is a link 377 shown in Fig. 14 which is attached to a pawl carrying platen feeding lever 378. The pawl 379 resiliently mounted thereon is adapted to feed the ratchet wheel attached to the platen roller on return movement of said lever. A suitable holding ratchet is provided to resiliently hold the platen in adjusted position. Inasmuch as this mechanism is largely of conventional form it need not be further described. Rigid with link 377 is a pair of pins between which passes a suitably pivotally supported inking ribbon feed lever 380 which is connected at its lower end to a link 381 jointed to the ratchet carrying lever 382 for rotating the ratchet wheel 383 which in turn is suitably geared to the vertically differentially movable ribbon spool shaft 384 which is turned on the return movement of said lever 93. A suitably located hold back pawl prevents retrograde movement of ratchet 383. A suitable form of ribbon reversing mechanism may be included in this mechanism, if desired, though none is hereby described. It is seen from the foregoing description that the paper and inking ribbon are moved during an operation of the machine when and only when the printing hammers are released to impinge on the type.

Link 114 (see Fig. 14) has been described as the means for rocking lever 93, such rocking is possible because pin 92 on link 85 has been previously withdrawn from contact with the lower end of arm 93. After link 114 and pin 116 (or pins 116 as shown in Fig. 34) have reached normal home position link 85 and pin 92 are traveling to home position thus effecting feeding of the ribbon and paper at near the end of a complete operation of the machine.

Money key

Hereinabove it has been indicated that it is sometimes desirable to accumulate arbitrary amounts to the sum of the dependent variables. The mechanisms for effecting this result will now be described.

Referring to Figs. 25, 26, 28 and 33 the key 386 may for want of another term be called the money key. Reference has been made to latches 232 pivotally attached to bell crank levers 233, said latter being differentially controlled by the arbitrary quantity key board. (See Arbitrary quantity keyboard and Transsetting of readings.) Said latches 232 may be manually connected to bifurcated arms 231 on the various transsetting bars and when such a connection is made certain groups of totalizers are under the control of the arbitrary quantity keyboard. Said latches 232 are lowered under control of the key 386. Said key 386 is substantially rectilinearly guided by the casing of the machine and by a frame supported stud passing through a slot in the shank of said key. Said key has a pin pivotally connecting it to the floating lever 393 which is also pivotally connected to the upwardly resiliently urged slide 394. Pin 396 underlying pin 397 on lever 398 constitutes a floating fulcrum for lever 393, and said pin may have either of two positions. The one is that illustrated in Fig. 33, the other when said pin is below the shutter on shaft 399. Because of the two different positions of pin 396 slide 394 has three different positions. First that shown in Fig. 33; second that corresponding to key 386 depressed or pin 396 latched below shutter on shaft 399; and third that corresponding to pin 396 below shutter and key 386 depressed. The functions controlled by the three positions slide 394 are more fully described hereinafter. When the parts are in the position shown Fig. 33 the key 386 may be depressed and locked in depressed position when pin 388 thereon passes below resiliently urged shutter 389, and during such depression slide 394 is forced downward.

Release of money key

The key 386 is not automatically released after an operation of the machine as are certain other keys so manual means for releasing said key are provided. Said key 386 is provided with a pin 388 as shown in Fig. 26 which when said key is depressed passes below the resiliently urged shaft carried shutters 389 and is thus held in depressed position. The shaft carrying shutter 389 has rigidly affixed thereto a pin carrying plate 390. Extending between the pins of said plate is a horn of the bellcrank lever 391 fixed to shaft 399 which is directly actuated by key 392. Hence depression of said key 392 rocks bellcrank 391 which in turn rocks the shaft carrying shutter 389 to release the depressed money key.

Money key releases transsetting bars

In normal rest position the transsetting bars 151, 152, 153 and 154 are locked against operation by means of the latch 150 coacting with the lugs 155 rigid therewith. When the key 386 is depressed slide 394 is forced downwardly, a pin thereon rocks lever 395 which is pivoted near its mid-point to a frame supported stud thereby rocking lever 400 thus lowering push rod 149 until its end is in the path of the flange on latch 150. When the machine operates cam 71 shifts rod 149 rearwardly thus rocking latch 150 thus freeing lugs 155 on the said transsetting bars.

*Money key locks duplicate type carriers*

When the key 386 is in raised position the arbitrary quantity keyboard causes arbitrary numbers to be printed in conjunction with the optionally printed variables. Such printing is under control of idling levers 401 shown in Fig. 22. Underlying said levers 401 is bent lever 402 loosely pivoted on a frame supported stud. The upper leg of said lever 402 is connected by a link 403 to a frame supported locking lever 404. Depression of key 386 (Fig. 33) causes a pin carried thereby to rock lever 406 which is freely carried by a frame supported stud near its mid-point to rock frame supported lever 405 about its pivot to cause pin 407 thereon to cooperate with the locking notch at the top of lever 404 thus locking bent lever 402 in the position shown in Fig. 22 thus disabling the idler levers 401 and preventing printing under their control.

*Money key releases function selecting keys*

Normally the actuators associated with the transsetting bars are under control of the dependent variable selecting keys so that various values of the selected dependent variable may be summed. Since the key 386 transfers the control of said bars to the arbitrary quantity keyboard the function control must be destroyed. As stated hereinabove the key 386 during depression rocks lever 405. Fixed to said lever is an arm 408 which is connected by a link 409 (see Fig. 22) to an arm rigid with the shaft carrying the resiliently urged shutter 213 which normally holds the function selecting keys 211 depressed. Hence depression of the said key 386 releases any keys 211 which may have been depressed thus destroying the function control of the transsetting bars.

*Control of printing by selecting keys*

In some instances it is desirable to effect printing by means of certain totalizer selecting keys. Thus in cash registering applications periodic totals of cash sales is sufficient without a detailed record of all individual cash sales, however it is desirable that all no sale, received on account, and charge sales are recorded. Referring to Fig. 15 a totalizer selecting key 292 rocks a bell crank lever 333 (see Figs. 16 and 18 also) and pin 334 thereon contacts with a projection 385 on a suitably mounted link 384 to rock member 329′ anticlockwise as viewed in Fig. 15. Said member 329′ is provided with a pin for depressing member 96 (see Figs. 16 and 18) to effect a printing. Member 386 corresponds to the upper end of arm 329 in Figs. 16 and 18. In view of the weak resilient connection between members 386 and 329′ the bellcrank lever system 294, 295, 296, 297 and 298 is not disturbed upon actuation of lever 333 by the selecting key 292, and further the total keys can enable the printing mechanism as hereinbefore described.

*Positions of lever #393*

Three positions have been enumerated for the floating lever 393. When said lever is in the position shown in Fig. 33 the latches 232 are disconnected from the transsetting bars, the lever 404 connected to bent lever 402 is free to move and hence the idling printing control levers 401 are free to control the arbitrary character type. Latch 150 is in its effective position blocking lugs 155 thus disabling the transsetting bars. When pin 396 on lever 393 is below the shutter on shaft 399 slide 394 is lowered about half of its full extent, but not sufficiently to connect the latches 232 with the transsetting bars. Such movement of lever 393 rocks lever 395 and thence lever 400 to bring the push rod 149 into position to permit cam 71 to disable latch 150. Lever 406 is however unaffected so that printing of arbitrary characters may be effected. Again if key 386 is depressed and pin 396 is in the position shown in Fig. 33 both levers 395 and 405 are rocked during the depression of said key therefore the transsetting bars will be unlatched by cam 71 during an operation of the machine and the idle printing levers 401 are blocked. Finally when pin 396 is below its shutter on shaft 399 and key 386 is depressed the latches 232 are connected to the transsetting bars and lever 404 is locked, hence the idle printing levers are blocked and the transsetting bars are under control of the arbitrary quantity key board. For convenience the following tabulation is inserted.

| Lever 393 | Transsetting bars | Latches 232 | Latch 150 | Lever 404 |
|---|---|---|---|---|
| Key 386 up | Locked | Ineffective. | Effective. | Free. |
| Pin 396 up Key 386 up | Under control of function keys. | Ineffective. | Ineffective. | Free. |
| Pin 396 down Key 386 down | Free | Ineffective. | Ineffective. | Locked. |
| Pin 396 up Key 386 down | Under control of arbitrary keyboard. | Effective. | Ineffective. | Locked. |

*Total key disable latches 232*

When any total key is depressed when the transsetting bars are under control of the transsetting bars it is necessary to disable the zero stops of the arbitrary quantity keyboard when taking a total. Under the various total key headings it has been described that the system of bell crank levers 306, 307 and 308 are always operated. Lever 307 of this system is fast to the shaft 413, and said shaft carriers a rigidly attached arm 412 which is connected by the link 411 to the irregularily shaped pin carrying lever 398. Said lever 398 is pivoted near its mid-point on a frame carried stud and pin 397 thereon is lowered by a depression of a total key thus forcing pin 396 on lever 393 below its shutter on the shaft 399. Lever 393 overlays a bell crank lever 410 which carries a pin which rocks shaft 248 when lever 398 is actuated. Said shaft is provided with a series of pins which rock pins 247 integral with the various shafts 239 to disable the zero stops 245 of the arbitrary quantity keyboard thus freeing the transsetting bars so that any connected wheel actuators are under the sole control of the meshed totalizers. As has been noted hereinabove key 392 may be depressed to releaes the depressed key 386. Said key 392 is provided with a long notch holding the said key partially depressed. When said key is thus partially depressed the shutter coacting with pin 396 is in an ineffective position hence crippling the control of the arbitrary keyboard over the transsetting bars. Full depression of said key will release key 386 as has been described.

Printing arbitrary amounts

Provision is made for printing the quantities set up on the arbitrary quantity keyboard. Said amounts may be printed in either of a plurality of locations. The location of said printing is determined by the relative positions of lever 393. If the quantity is used as a cipher or ledger member it is printed in one location, if it is computed it is printed in the column or columns identified with the group or groups of totalizers in which it is printed. When the transsetting bars are not under control of the arbitrary keyboard the printing of such quantity is under control of the levers 401 (see Fig. 22) said levers control a set of idling levers and type carriers in exactly the same manner, as may be seen in Fig. 22, as has been described hereinabove under the heading Printing mechanism so that a further description is superfluous. The bell crank levers 233 which are always under the control of the arbitrary quantity keyboard are provided with a stud 414 which overlies the rearwardly extending arm of the idler levers 401. Therefore the differential movement of levers 233 is communicated to levers 401 and thence to the printing mechanism. When the transsetting bars are under control of the arbitrary quantity keyboard the type carriers controlled by the connected wheel actuators are positioned under control of said keyboard and hence they may be printed thereby.

Some typical accounting problems

A few typical accounting problems, and computing problems will be given under this heading, the problems given are merely typical and are not exhaustive of the capabilities of the mechanism, applicant is frank to say that he does not now know the full extent of the applicability of his mechanism and relies on his claims to protect his invention to all uses to which it may be put.

Pay roll accounting

One use to which this mechanism can be put is the computation of pay rolls involving a number of workmen with varying hourly, daily, weekly, etc. wage rates. Assume for example that certain time cards and pay roll rates show the following data

| Workman | In | Out | Rate |
|---|---|---|---|
| 53 | 8.30 A. M. | 4.00 P. M. | $1.25 |
|  | 8.45 A. M. | 4.00 P. M. |  |
|  | 8.15 A. M. | 3.45 P. M. | $1.00 |
| 57 | 8.00 A. M. | 4.00 P. M. |  |

In this case the "in" time is set on the S keys the "out" time in the F keys, and the rate is set by rotating the reel 203 and depressing the proper key 211. Operation of the machine is such that the following might be printed (see Printing keys):

```
53    7.30    9.37
53    7.15    9.05
53   14.45   18.43 T 57    7.30    7.30
57    8.00    8.00
     15.30    3.10
             19.40 T
             36.83 GT
```

In the above case no time has been allowed for luncheon, the machine can readily account for a luncheon period of given length. Assume a luncheon period of 45 minutes the above calculation could appear as

```
53    6.45    6.45
53    6.15    7.81
             15.94 T 57    6.45    6.45
57    7.15    7.15
              3.10
             16.70 T
             32.55 GT
```

Commodity accounting

Assume now, as an example, a coal yard business with the following data:

```
Ledger  411   3 tons soft         7.15
        243   1 ton nut anth.    14.25
        120   2 tons stove anth. 14.50
```

In this case the "in" keys can be wholly dispensed with or they may set at zero as an "in" the record may appear as

```
    411   3    21.45
    243   1    14.25
    120   2    29.00
          6    64.70 T
```

—or—

```
     27  18  57  8143.00 G T
    411   3         21.45
    243       1     14.25
    120       2     29.00
                    64.90 T
          3   1   2
```

In the first instance it was tacitly assumed that a machine of the same size as used in the payroll problem was used whereas the second assumes a machine with at least a set of four totalizers for the itemizing set and a similar number in the grand total set. This is an application calling for plural sets of argument notched disks for segregating the amounts of different grades and varieties of coal as has been suggested under the heading Independent variable notched disks. Manifestly such may be extended to a somewhat more complicated system as indicated in the next example where plural sets of special totalizers are utilized.

*Departmental clerks, accounts*

Assume the following data.

```
    Clerk A    12# sugar      7½¢
          C    2 doz. eggs    37¢
          C    5 cans         23¢
          A    3½# meat       42¢
          B    8# sugar       7½¢
```

Such data may be tabulated as follows:

```
    12                  .90
         2              .74
              5        1.15
                 3.5   1.47
         8              .60
    20   2   5  3.5    4.86 T
    12          3.5    2.37 A
         8              .80 B
              2   5    1.89 C
```

In this instance there is a group of totalizers for each commodity and a set of totalizers for each clerk therefore a grand total will show the grand total quantity of each commodity and a grand total of amounts received, the totals taken from each set shows the total of quantities of commodities sold by each clerk and the amount received by said clerk, thus indicating not only the total amount of money taken in by each clerk by the quantity and kind of merchandise sold by each.

Fig. 35 is a composite example of the work performable by the machine with a series of self explanatory legends thereon.

Similarly, piece-work on the present day method of bonus for increased output per operator, is calculated and itemized and many include range at hour rate for other operations, as for example

```
    200 pieces @ 25¢ _____  $50.00
    Bonus      @ 5 per cent__  2.50
    1½ hrs. @ $1.50 wage for
       setting up machine____  2.25
                               _____
    Total _____      $54.75
```

In the claims I use such terms as function, independent variable or argument, dependent variable, indefinite sum, series, sets, arbitrary quantity, factor, single entry, interpolation, addition theorem for functions, invariant, etc., which are mathematical terms. These terms are used because they are believed to correctly connote the capabilities of the mechanism described in the foregoing specification, further I contemplate that these terms shall have the broad definitions accorded to them in the usual mathematical definitions as exemplified in such texts as Whittaker's Modern Analysis, Goursat-Hedrick Mathematical Analysis, Rice-Interpolation and others of similar import.

Whereas, I have described my invention by reference to specific forms thereof, it will be understood that many changes and modifications may be made without departing from the spirit of the invention.

I claim:

1. A calculating machine comprising mechanism including sets of keys for mechanically performing a computation, means including a set of keys for deriving a function of the result of said mechanically performed computation, a plurality of totalizers, mechanism for controlling the operation of said totalizers for accumulating respectively the results of successive mechanically performed computations and successively derived corresponding functions, and mechanism associated with said controlling mechanism for selectively introducing values into said totalizers.

2. A calculating machine comprising mechanism including sets of keys for mechanically performing a computation, means including a set of keys for deriving a function of the result of said mechanically performed computation, a plurality of totalizers, mechanism for controlling the operation of said totalizers for accumulating respectively said results of successive mechanically performed computations and successively derived corresponding said functions, mechanism associated with said controlling mechanism for selectively introducing values into said totalizers, and means for optionally actuating said totalizers to thereby accumulate at will both or either the respective computation results and the respective corresponding functions.

3. A calculating machine comprising mechanism including sets of keys for mechanically performing a computation, means including a set of keys for deriving a function of the result of said mechanically performed computation, a plurality of totalizers, mechanism for controlling the operation of said totalizers, for accumulating respectively said results of successive mechanically performed computations and successively derived corresponding said functions, mechanism associated with said controlling mechanism for selectively introducing values into said totalizers, and means for optionally actuating said totalizers to thereby accumulate at will both or either the respective computation results and the respective corresponding functions, said optional means including separate keys for selectively controlling the actuation of said plurality of totalizers respectively.

4. A calculating machine comprising mechanism including sets of keys for mechanically performing a computation, means including a set of keys for deriving a function of the result of said mechanically performed computation, a plurality of sets of totalizers, each set comprising a plurality of separately accumulating totalizer units, said totalizer units being arranged in corresponding order for accumulating respectively the results of successive mechanically performed computations and successively derived corresponding functions, a mechanism for controlling the operation of said sets of totalizers for introducing values into said sets of totalizers, and means for selecting any set or sets of said sets of totalizers for optionally accumulating either or both values introduced by said value-introducing mechanism and values derived by said computation performing mechanism.

5. A calculating machine comprising mechanism including sets of keys for mechanically performing a computation, means including a set of keys for deriving a function of the result of said mechanically performed computation, a plurality of sets of totalizers, each set comprising a plurality of separately accumulating totalizer units, said totalizer units being arranged in corresponding order for accumulating respectively said results of successive mechanically performed computations and successively derived corresponding said functions, mechanism for controlling the operation of said sets of totalizers for selectively introducing values into said sets of totalizers respectively, means for selecting any set or sets of said sets of totalizers for optionally accumulating either or both values introduced by said value-introducing mechanism and values derived by said computation performing mechanism, and means for optionally controlling the actuation of said sets of totalizers selectively to thereby at will accumulate both or either the respective computation results and the respective corresponding functions and the introduced values.

6. A calculating machine comprising mechanism including sets of keys for mechanically performing a computation, means including a set of keys for deriving a function of the result of said mechanically performed computation, a plurality of sets of totalizers, each set comprising a plurality of separately accumulating totalizer units, said totalizer units being arranged in corresponding order for accumulating respectively said results of successive mechanically performed computations and successively derived corresponding said functions, a mechanism for controlling the operation of said sets of totalizers respectively for introducing values in said totalizers, keys for selecting any set or sets of said sets of totalizers for accumulating values introduced by said value-introducing mechanism and values derived by said computation performing mechanism, and keys for optionally controlling the actuation of said sets of totalizers selectively to thereby at will accumulate both or either the respective computation results and the respective corresponding functions and the introduced values.

7. A calculating machine comprising a mechanism including sets of keys for mechanically performing a computation, means including a set of keys for deriving a function of the result of said mechanically performed computation, separately accumulated totalizers for accumulating respectively said results of successive mechanically performed computations and successively derived corresponding said functions, mechanism for controlling the operation of said totalizers for selectively introducing values into said totalizers, printing mechanism, and key means for optionally controlling the printing of accumulations of said successive computation results and of said successive corresponding results and of said introduced values.

8. A calculating machine comprising mechanism including sets of keys for mechanically performing computation, means including a set of keys for deriving a function of the result of said mechanically performed computation, totalizers for accumulating respectively said results of successive mechanically performed computations and successively derived corresponding functions, mechanism including key means for controlling the operation of said totalizers for introducing values selectively into said totalizers, printing mechanism, and key means for optionally controlling the printing selectively either or both the accumulation of said totalizers.

9. A calculating machine comprising mechanism including sets of keys for mechanically performing computation, means including a set of keys for deriving a function of the result of said mechanically performed computation, totalizers for accumulating respectively said results of successive mechanically performed computations and successively derived corresponding functions, mechanism for controlling the operation of said totalizers for introducing values, printing mechanism, key means for optionally controlling the printing selectively of either the accumulation of the results of successive mechanically performed computation or the accumulation of successive derived corresponding functions.

10. A calculating machine comprising mechanism including sets of keys for mechanically performing computation, means including a set of keys for deriving a function of the result of said mechanically performed computation, totalizers for accumulating respectively said results of successive mechanically performed computations and successively derived corresponding functions, mechanism for controlling the operation of said totalizers for introducing values in one or more of said totalizers, printing mechanism, and key means for optionally controlling the printing of either the accumulation of the results of successive mechanically performed computations or the accumulation of successively derived corresponding functions.

11. A calculating machine comprising a keyboard, mechanism having a keyboard separate from said first-named keyboard for introducing values, a plurality of sets of totalizers, each set comprising a plurality of separately accumulating totalizers in a predetermined order, means controlling the actuation of said accumulating totalizers by said first-named keyboard, means associated with a part of said actuation controlling means for controlling actuation of said plurality of sets of totalizers by said second-named keyboard, printing mechanism and keys controlling the printing and non-printing of said totalizers selectively by sets.

12. A calculating machine comprising a keyboard, mechanism having a keyboard separate from said keyboard for introducing values, a plurality of sets of totalizers, each set comprising a plurality of separately accumulating totalizers in a predetermined order, means controlling the actuation of said accumulating totalizers by said first-named keyboard, means associated with a part of said last-named means for controlling actuation of said plurality of sets of totalizers by said mechanism, printing mechanism and keys controlling the printing and non-printing of said totalizers selectively by order irrespective of the printing and non-printing positions of said printing controlling keys.

In testimony whereof I have signed this specification this 17th day of August, 1926.

MICHELE GUGLIELMO de SIMONE.